(12) United States Patent
Hamerly et al.

(10) Patent No.: US 12,174,018 B2
(45) Date of Patent: Dec. 24, 2024

(54) SELF-CONFIGURATION AND ERROR CORRECTION IN LINEAR PHOTONIC CIRCUITS

(71) Applicants: Massachusetts Institute of Technology, Cambridge, MA (US); NTT Research, Incorporated, Sunnyvale, CA (US)

(72) Inventors: Ryan Hamerly, Cambridge, MA (US); Saumil Bandyopadhyay, Cambridge, MA (US); Dirk Robert Englund, Brookline, MA (US)

(73) Assignees: Massachusetts Institute of Technology, Cambridge, MA (US); NTT Research, Incorporated, Sunnyvale, CA (US)

( * ) Notice: Subject to any disclaimer, the term of this patent is extended or adjusted under 35 U.S.C. 154(b) by 255 days.

(21) Appl. No.: 17/711,640

(22) Filed: Apr. 1, 2022

(65) Prior Publication Data
US 2022/0397383 A1 Dec. 15, 2022

Related U.S. Application Data

(60) Provisional application No. 63/196,301, filed on Jun. 3, 2021.

(51) Int. Cl.
*G01B 9/02055* (2022.01)
*G01B 9/02015* (2022.01)

(52) U.S. Cl.
CPC ....... *G01B 9/0207* (2013.01); *G01B 9/02027* (2013.01)

(58) Field of Classification Search
CPC .. G01B 9/0207; G01B 9/02027; G06N 3/048; G06N 3/082; G06N 3/09; G06N 10/40; G06N 3/0675; G02F 2201/16; G02F 1/212
See application file for complete search history.

(56) References Cited

U.S. PATENT DOCUMENTS

| | | | | |
|---|---|---|---|---|
| 5,278,923 A | * | 1/1994 | Nazarathy | G02F 1/3136 385/2 |
| 5,943,458 A | * | 8/1999 | Miller | G02F 1/3517 356/477 |

(Continued)

OTHER PUBLICATIONS

Akopyan et al. "Truenorth: Design and tool flow of a 65 mw 1 million neuron programmable neurosynaptic chip." IEEE Transactions on Computer-Aided Design of Integrated Circuits and Systems 34.10 (2015): 1537-1557.

(Continued)

*Primary Examiner* — Tung S Lau
(74) *Attorney, Agent, or Firm* — Smith Baluch LLP

(57) ABSTRACT

Component errors prevent linear photonic circuits from being scaled to large sizes. These errors can be compensated by programming the components in an order corresponding to nulling operations on a target matrix X through Givens rotations $X \to T^\dagger X$, $X \to X T^\dagger$. Nulling is implemented on hardware through measurements with feedback, in a way that builds up the target matrix even in the presence of hardware errors. This programming works with unknown errors and without internal sources or detectors in the circuit. Modifying the photonic circuit architecture can reduce the effect of errors still further, in some cases even rendering the hardware asymptotically perfect in the large-size limit. These modifications include adding a third directional coupler or crossing after each Mach-Zehnder interferometer in the circuit and a photonic implementation of the generalized FFT fractal. The configured photonic circuit can be used for machine learning, quantum photonics, prototyping, optical switching/multicast networks, microwave photonics, or signal processing.

19 Claims, 31 Drawing Sheets

(56) References Cited

U.S. PATENT DOCUMENTS

| | | | |
|---|---|---|---|
| 10,034,069 B2* | 7/2018 | Rickman | H04J 14/02 |
| 10,645,474 B2* | 5/2020 | Roth | H04Q 11/0005 |
| 2004/0197041 A1* | 10/2004 | Lu | G02B 6/2935 385/39 |
| 2017/0031101 A1* | 2/2017 | Miller | G02B 6/29395 |
| 2018/0335574 A1* | 11/2018 | Steinbrecher | H04Q 11/0005 |
| 2022/0327369 A1* | 10/2022 | Fan | G06N 3/084 |

OTHER PUBLICATIONS

Bandyopadhyay et al. "Hardware error correction for programmable photonics." arXiv preprint arXiv:2103.04993 (2021), 23 pages.
Bandyopadhyay et al., "Hardware error correction for programmable photonics," Optica 8, 1247-1255 (2021), 9 pages.
Bell et al. "Further Compactifying Linear Optical Unitaries." arXiv preprint arXiv:2104.07561 (2021, 6 pages.
Bernstein et al. "Freely scalable and reconfigurable optical hardware for deep learning." Scientific Reports 11.1 (2021): 1-12.
Billah et al. "Hybrid integration of silicon photonics circuits and InP lasers by photonic wire bonding." Optica 5.7 (2018): 876-883.
Bogaerts et al. "Programmable photonic circuits." Nature 586.7828 (2020): 207-216.
Brown et al. "Arbitrarily accurate composite pulse sequences." Physical Review A 70.5 (2004): 052318, 4 pages.
Bulmer et al. "Drive-noise tolerant optical switching inspired by composite pulses." Optics Express 28.6 (2020): 8646-8657.
Burgwal et al. "Using an imperfect photonic network to implement random unitaries." Optics Express 25.23 (2017): 28236-28245.
Capmany et al. "Microwave photonic signal processing." Journal of Lightwave Technology 31.4 (2012): 571-586.
Carolan et al. "Universal linear optics." Science 349.6249 (2015): 711-716.
Chen et al. "Low-loss multimode-interference-based crossings for silicon wire waveguides." IEEE Photonics Technology Letters 18.21 (2006): 2260-2262.
Clements et al. "Optimal design for universal multiport interferometers." Optica 3.12 (2016): 1460-1465.
Cooley et al. "An algorithm for the machine calculation of complex Fourier series." Mathematics of Computation 19.90 (1965): 297-301.
Dietrich et al. "In situ 3D nanoprinting of free-form coupling elements for hybrid photonic integration." Nature Photonics 12.4 (2018): 241-247.
Dumais et al. "Three-mode synthesis of slab Gaussian beam in ultra-low-loss in-plane nanophotonic silicon waveguide crossing." 2017 IEEE 14th International Conference on Group IV Photonics (GFP). IEEE, 2017, 2 pages.
Fang et al. "Design of optical neural networks with component imprecisions." Optics Express 27.10 (2019): 14009-14029.
Feldmann et al. "All-optical spiking neurosynaptic networks with self-learning capabilities." Nature 569.7755 (2019): 208-214.
Flamini et al. "Benchmarking integrated linear-optical architectures for quantum information processing." Scientific Reports 7.1 (2017): 1-10.
Fldzhyan et al. "Optimal design of error-tolerant reprogrammable multiport interferometers." Optics Letters 45.9 (2020): 2632-2635.
Friedmann et al. "Reward-based learning under hardware constraints-using a RISC processor embedded in a neuromorphic substrate." Frontiers in Neuroscience 7 (2013): 160, 17 pages.
Fukazawa et al. "Low loss intersection of Si photonic wire waveguides." Japanese Journal of Applied Physics 43.2R (2004): 3 pages.
Gill et al. "CMOS-compatible Si-ring-assisted Mach—Zehnder interferometer with internal bandwidth equalization." IEEE Journal of Selected Topics in Quantum Electronics 16.1 (2009): 45-52.
Grillanda et al. "Non-invasive monitoring and control in silicon photonics using CMOS integrated electronics." Optica 1.3 (2014): 129-136.
Gu et al. "Towards area-efficient optical neural networks: an FFT-based architecture." 2020 25th Asia and South Pacific Design Automation Conference (ASP-DAC). IEEE, 2020, 6 pages.
Haffner et al. "Nano-opto-electro-mechanical switches operated at CMOS-level voltages." Science 366.6467 (2019): 860-864.
Hamerly "Meshes: Tools for modeling photonic beamsplitter mesh networks," accessed Oct. 28, 2022 online at: https:// github.com/QPG-MIT/meshes, 2020, 1 page.
Hamerly et al. "Accurate Self-Configuration of Rectangular Multiport Interferometers." arXiv e-prints (2021): arXiv-2106, 8 pages.
Hamerly et al. "Design of asymptotically perfect linear photonic circuits." AI and Optical Data Sciences III. vol. 12019. SPIE, 2022, 7 pages.
Hamerly et al. "Infinitely scalable multiport interferometers." arXiv preprint arXiv:2109.05367 (2021), 9 pages.
Hamerly et al. "Large-scale optical neural networks based on photoelectric multiplication." Physical Review X 9.2 (2019): 021032, 12 pages.
Hamerly et al. "Robust Zero-Change Self-Configuration of the Rectangular Mesh." 2021 Optical Fiber Communications Conference and Exhibition (OFC). IEEE, 2021, 3 pages.
Hamerly et al. "Stability of self-configuring large multiport interferometers." Physical Review Applied 18.2 (2022): 024018, 14 pages.
Harris et al. "Accelerating Artificial Intelligence with Silicon Photonics." 2020 Optical Fiber Communications Conference and Exhibition (OFC). IEEE, 2020, 4 pages.
Harris et al. "Efficient, compact and low loss thermo-optic phase shifter in silicon." Optics Express 22.9 (2014): 10487-10493.
Harris et al. "Linear programmable nanophotonic processors." Optica 5.12 (2018): 1623-1631.
Hinton et al. "Improving neural networks by preventing co-adaptation of feature detectors." arXiv preprint arXiv:1207.0580 (2012).
Hughes et al. "Training of photonic neural networks through in situ backpropagation and gradient measurement." Optica 5.7 (2018): 864-871.
Jones et al. "Ultra-low crosstalk, CMOS compatible waveguide crossings for densely integrated photonic interconnection networks." Optics Express 21.10 (2013): 12002-12013.
Jouppi et al. "In-datacenter performance analysis of a tensor processing unit." Proceedings of the 44th Annual International Symposium on Computer Architecture. 2017, 12 pages.
Knill et al. "A scheme for efficient quantum computation with linear optics." Nature 409.6816 (2001): 46-52.
Kumar et al. "Mitigating linear optics imperfections via port allocation and compilation." arXiv preprint arXiv:2103.03183 (2021), 13 pages.
Lecun et al. "Gradient-based learning applied to document recognition." Proceedings of the IEEE 86.11 (1998): 2278-2324.
Leinse et al. "A novel high-speed polymeric EO modulator based on a combination of a microring resonator and an MZI." IEEE Photonics Technology Letters 17.10 (2005): 2074-2076.
Li et al. "Fast and reliable storage using a 5 bit, nonvolatile photonic memory cell." Optica 6.1 (2019): 1-6.
Lin et al. "A 7-nm 4-GHz Arm[1]-core-based CoWoS[1] chiplet design for high-performance computing." IEEE Journal of Solid-State Circuits 55.4 (2020): 956-966.
Lindenmann et al. "Photonic wire bonding: a novel concept for chip-scale interconnects." Optics Express 20.16 (2012): 17667-17677.
Lopez-Pastor et al. "Arbitrary optical wave evolution with Fourier transforms and phase masks." arXiv e-prints (2019): arXiv-1912.
Lu et al. "Broadband silicon photonic directional coupler using asymmetric-waveguide based phase control." Optics Express 23.3 (2015): 3795-3808.
Ma et al. "Ultralow loss single layer submicron silicon waveguide crossing for SOI optical interconnect." Optics Express 21.24 (2013): 29374-29382.
Maese-Novo et al. "Wavelength independent multimode interference coupler." Optics Express 21.6 (2013): 7033-7040.
Marpaung et al. "Integrated microwave photonics." Laser & Photonics Reviews 7.4 (2013): 506-538.

(56) References Cited

OTHER PUBLICATIONS

Mennea et al. "Modular linear optical circuits." Optica 5.9 (2018): 1087-1090.
Mikkelsen et al. "Dimensional variation tolerant silicon-on-insulator directional couplers." Optics Express 22.3 (2014): 3145-3150.
Miller "Perfect optics with imperfect components." Optica 2.8 (2015): 747-750.
Miller "Self-aligning universal beam coupler." Optics Express 21.5 (2013): 6360-6370.
Miller "Self-configuring universal linear optical component." Photonics Research 1.1 (2013): 1-15.
Miller "Setting up meshes of interferometers-reversed local light interference method." Optics Express 25.23 (2017): 29233-29248.
Morino et al. "Reduction of wavelength dependence of coupling characteristics using Si optical waveguide curved directional coupler." Journal of lightwave technology 32.12 (2014): 2188-2192.
Mower et al. "High-fidelity quantum state evolution in imperfect photonic integrated circuits." Physical Review A 92.3 (2015): 032322, 8 pages.
Pai "Neurophox: a simulation framework for unitary neural networks and photonic devices," accessed online on Oct. 28, 2022, at https://github.com/solgaardlab/neurophox, 2020, 4 pages.
Pai et al. "Matrix optimization on universal unitary photonic devices." Physical Review Applied 11.6 (2019): 064044, 18 bages.
Pai et al. "Parallel programming of an arbitrary feedforward photonic network." IEEE Journal of Selected Topics in Quantum Electronics 26.5 (2020): 1-13.
Perez et al. "Multipurpose silicon photonics signal processor core." Nature Communications 8.1 (2017): 1-9.
Polcari "Generalizing the Butterfly Structure of the FFT." Advanced Research in Naval Engineering. Springer, Cham, 2018. 35-52.
Prabhu et al. "Accelerating recurrent Ising machines in photonic integrated circuits." Optica 7.5 (2020): 551-558.
Qiang et al. "Large-scale silicon quantum photonics implementing arbitrary two-qubit processing." Nature Photonics 12.9 (2018): 534-539.
Ramey "Silicon photonics for artificial intelligence acceleration: Hotchips 32." 2020 IEEE Hot Chips 32 Symposium (HCS). IEEE, 2020, 26 pages.
Reck et al. "Experimental realization of any discrete unitary operator." Physical Review Letters 73.1 (1994): 58, 6 pages.
Russell et al. "Direct dialling of Haar random unitary matrices." New Journal of Physics 19.3 (2017): 033007, 9 pages.
Sacher et al. "Monolithically integrated multilayer silicon nitride-on-silicon waveguide platforms for 3-D photonic circuits and devices." Proceedings of the IEEE 106.12 (2018): 2232-2245.
Saygin et al. "Robust architecture for programmable universal unitaries." Physical Review Letters 124.1 (2020): 010501, 6 pages.
Shao et al. "Simba: Scaling deep-learning inference with multi-chip-module-based architecture." Proceedings of the 52nd Annual IEEE/ACM International Symposium on Microarchitecture. 2019, 14 pages.
Sharstri et al. "Photonics for artificial intelligence and neuromorphic computing." Nature Photonics 15.2 (2021): 102-114.
Shen et al. "Deep learning with coherent nanophotonic circuits." Nature Photonics 11.7 (2017): 441-446.
Soldano et al. "Optical multi-mode interference devices based on self-imaging: principles and applications." Journal of Lightwave Technology 13.4 (1995): 615-627.
Spring et al. "Boson sampling on a photonic chip." Science 339. 6121 (2013): 798-801.
Steinbrecher et al. "Quantum optical neural networks." npj Quantum Information 5.1 (2019): 1-9.
Su et al. "Multi-chip technologies to unleash computing performance gains over the next decade." 2017 IEEE International Electron Devices Meeting (IEDM). IEEE, 2017, 8 pages.
Suzuki et al. "Low-insertion-loss and power-efficient 32×32 silicon photonics switch with extremely high-$\Delta$ silica PLC connector." Journal of Lightwave Technology 37.1 (2018): 116-122.
Suzuki et al. "Ultra-high-extinction-ratio 2×2 silicon optical switch with variable splitter." Optics Express 23.7 (2015): 9086-9092.
Szameit et al. "Discrete optics in femtosecond-laser-written photonic structures." Journal of Physics B: Atomic, Molecular and Optical Physics 43.16 (2010): 163001, 26 pages.
Taballione et al. "8×8 reconfigurable quantum photonic processor based on silicon nitride waveguides." Optics Express 27.19 (2019): 26842-26857.
Tait et al. "Multi-channel control for microring weight banks." Optics Express 24.8 (2016): 8895-8906.
Tait et al. "Neuromorphic photonic networks using silicon photonic weight banks." Scientific Reports 7.1 (2017): 1-10.
Tanaka et al. "Pruning neural networks without any data by iteratively conserving synaptic flow." arXiv preprint arXiv:2006.05467 (2020), 14 pages.
Tanomura et al. "Robust integrated optical unitary converter using multiport directional couplers." Journal of Lightwave Technology 38.1 (2020): 60-66.
Tillmann et al. "Experimental boson sampling." Nature Photonics 7.7 (2013): 540-544.
Wang et al. "Compact broadband directional couplers using subwavelength gratings." IEEE Photonics Journal 8.3 (2016): 1-8.
Wang et al. "High-efficiency multiphoton boson sampling." Nature Photonics 11.6 (2017): 361-365.
Wang et al. "Tolerant, broadband tunable 2×2 coupler circuit." Optics Express 28.4 (2020): 5555-5566.
Wang et al. "Toward scalable boson sampling with photon loss." Physical Review Letters 120.23 (2018): 230502, 6 pages.
Williamson et al. "Reprogrammable electro-optic nonlinear activation functions for optical neural networks." IEEE Journal of Selected Topics in Quantum Electronics 26.1 (2019): 1-12.
Wu et al. "State-of-the-art and perspectives on silicon waveguide crossings: A review." Micromachines 11.3 (2020): 326, 16 pages.
Ye et al. "Ultra-compact broadband 2×2 3 dB power splitter using a subwavelength-grating-assisted asymmetric directional coupler." Journal of Lightwave Technology 38.8 (2020): 2370-2375.
Zhong et al. "Quantum computational advantage using photons." Science 370.6523 (2020): 1460-1463.
Zhuang et al. "Programmable photonic signal processor chip for radiofrequency applications." Optica 2.10 (2015): 854-859.
Zimmer et al. "A 0.11 pj/op, 0.32-128 tops, scalable multi-chip-module-based deep neural network accelerator with ground-reference signaling in 16nm." 2019 Symposium on VLSI Circuits. IEEE, 2019, 2 pages.

\* cited by examiner

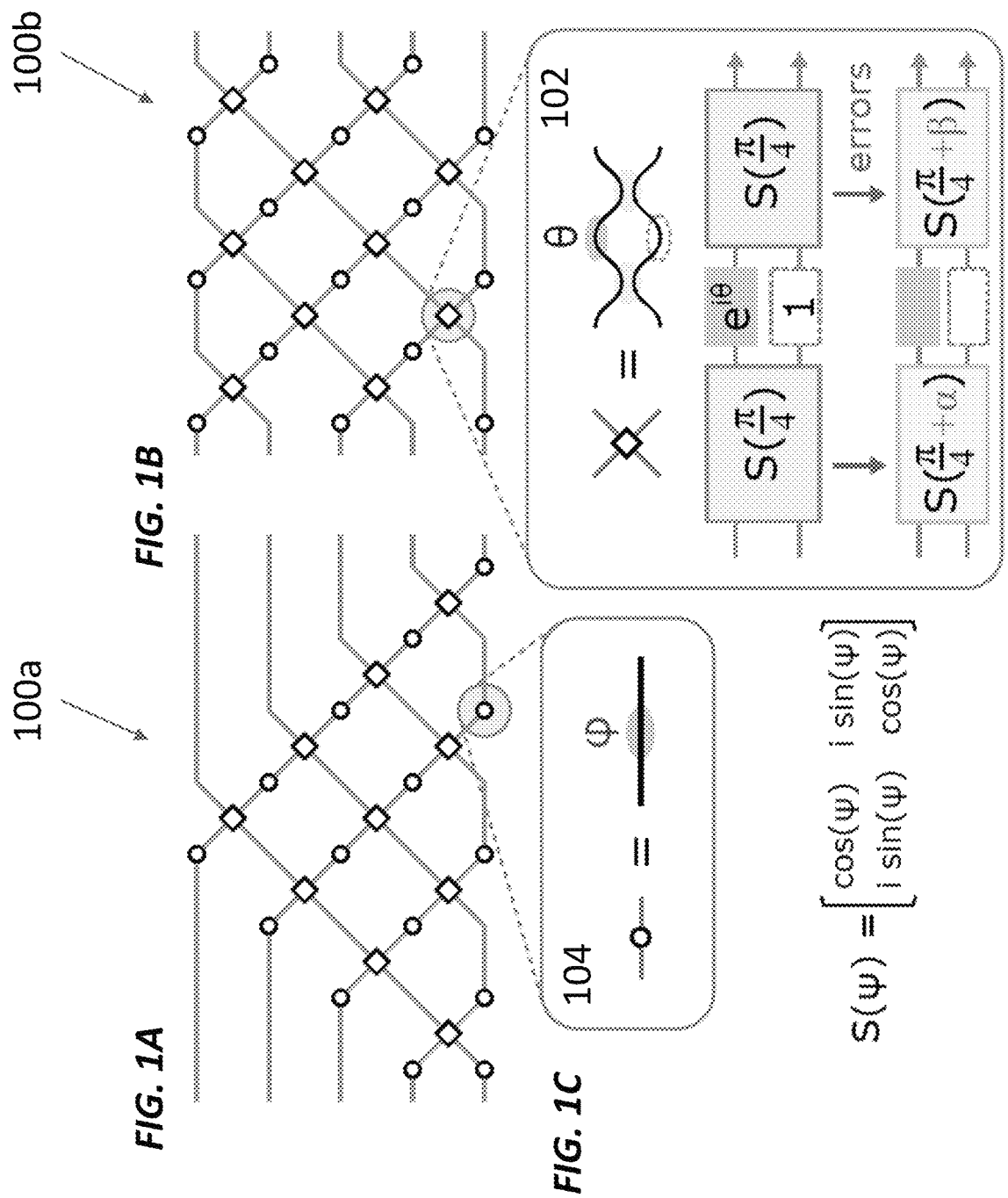

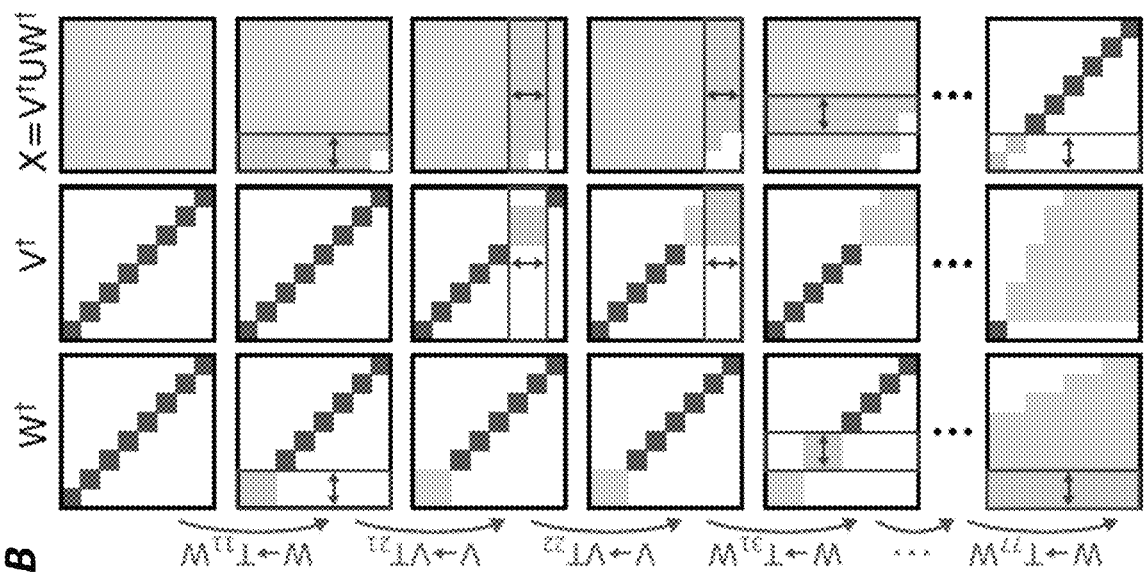
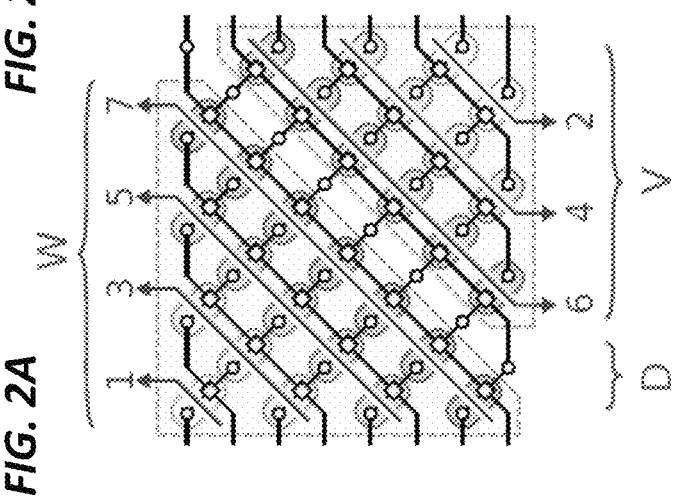
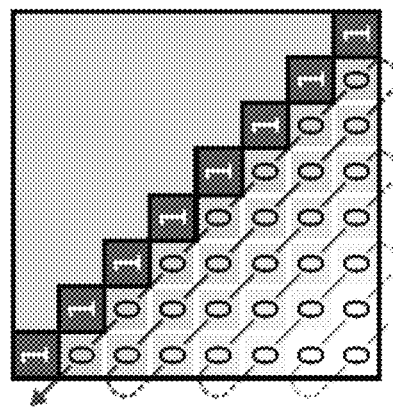
FIG. 2A
FIG. 2B
FIG. 2C

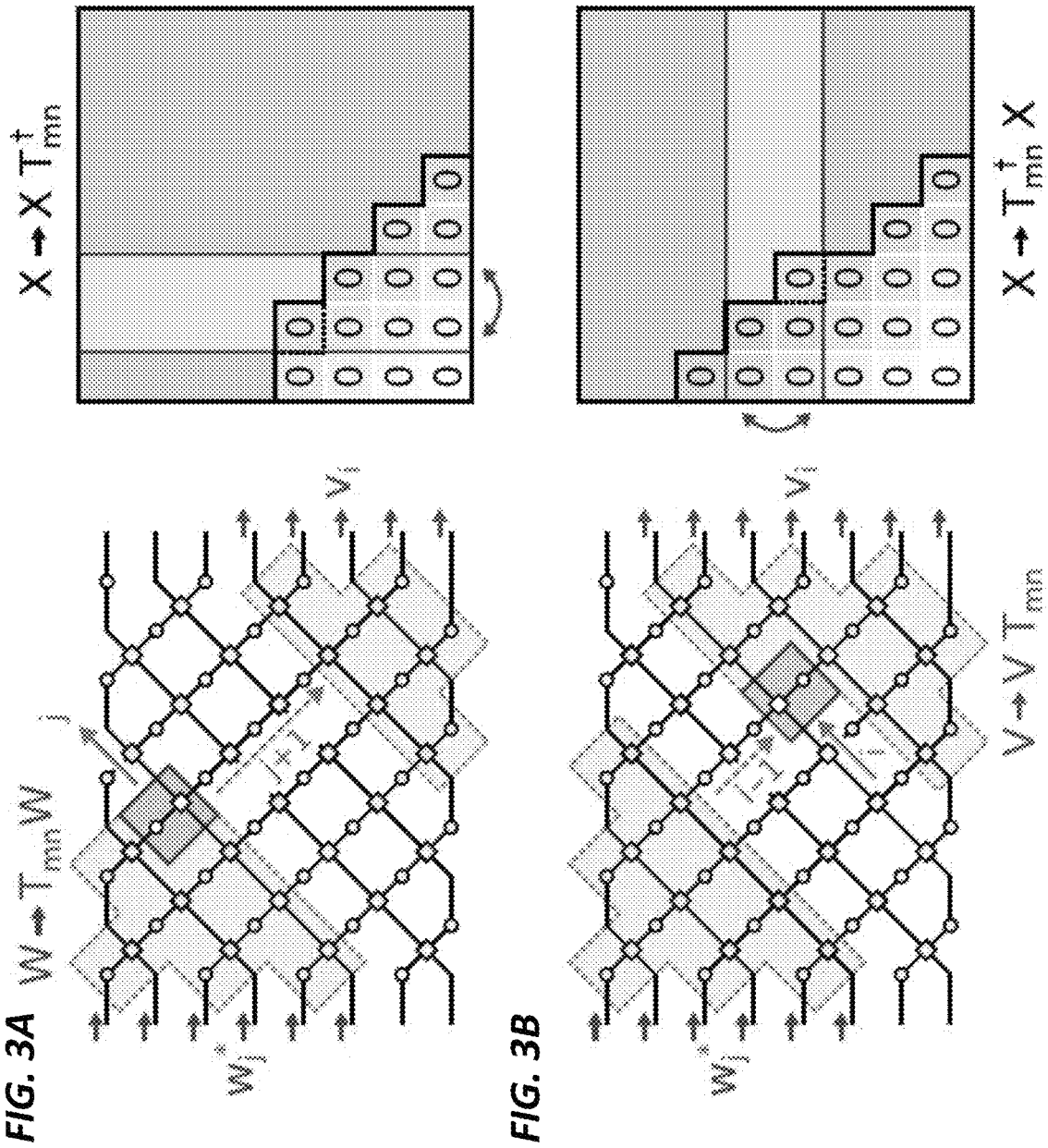

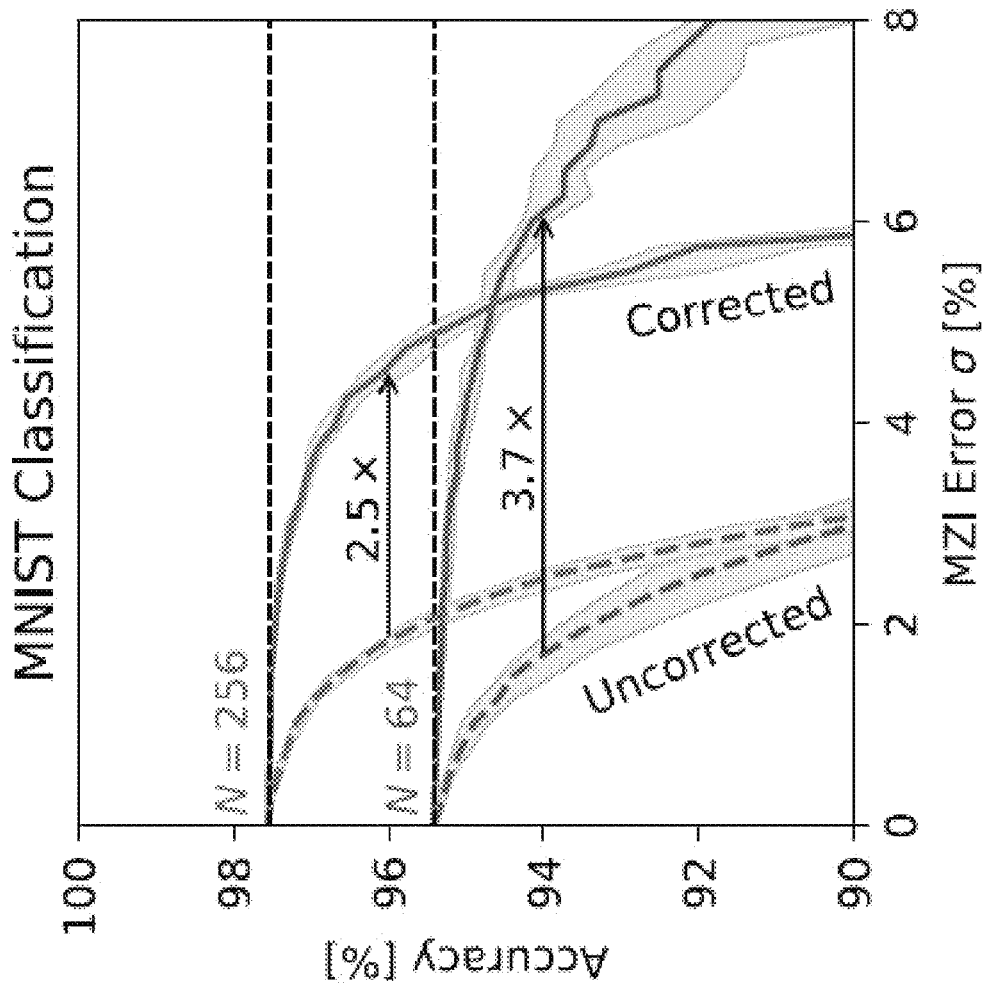
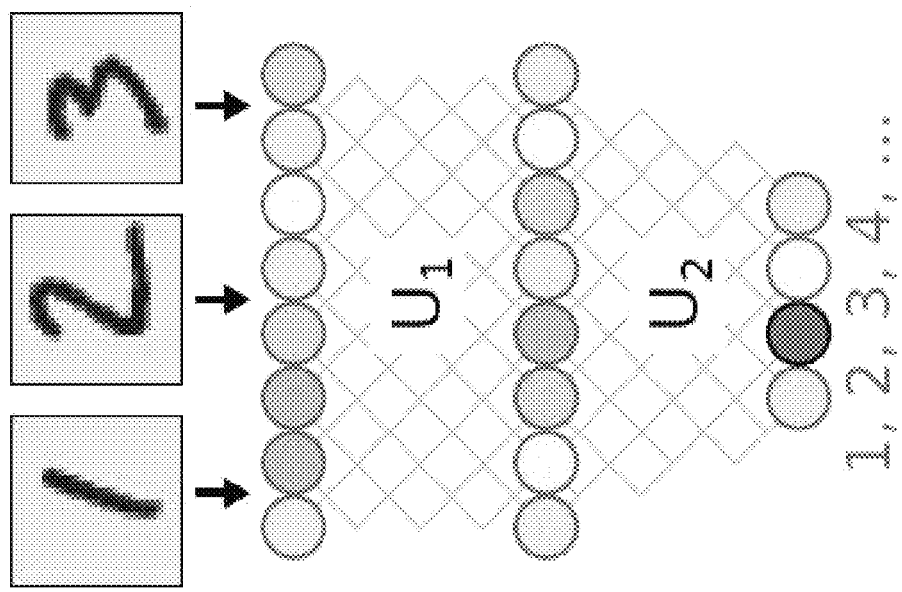
FIG. 5A
FIG. 5B

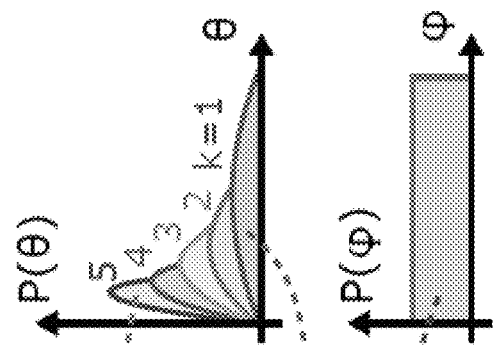
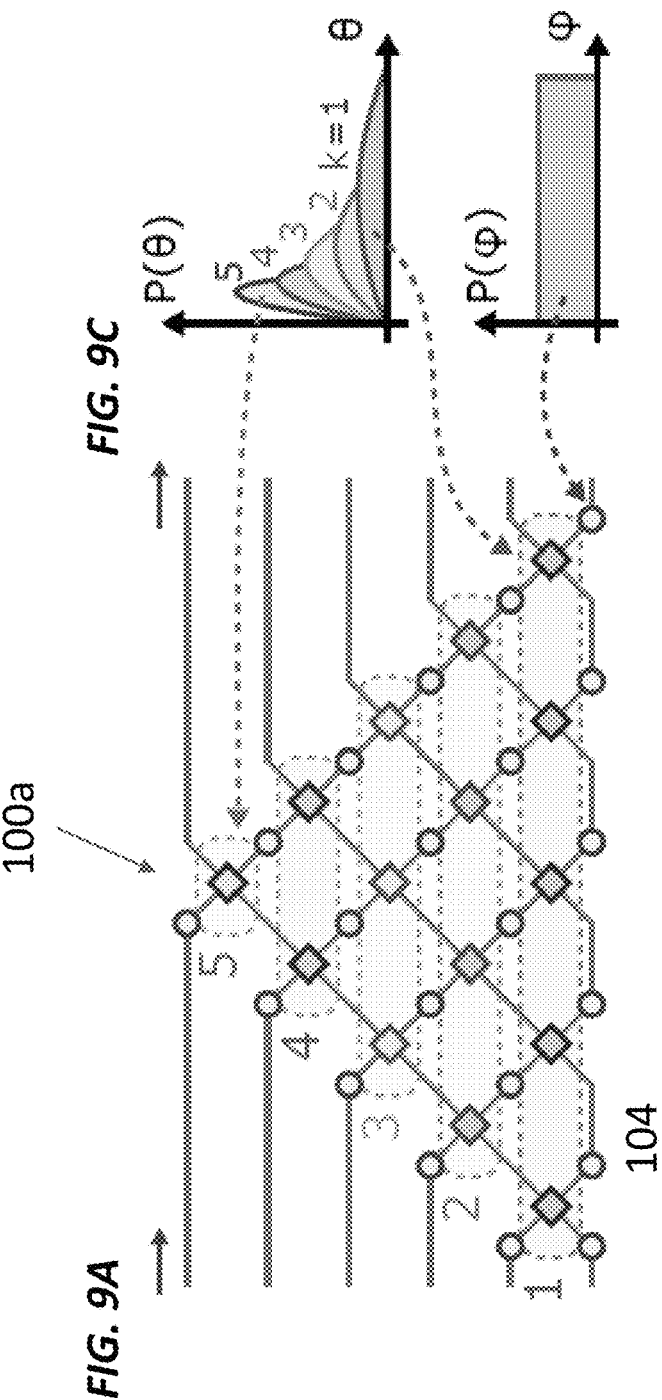
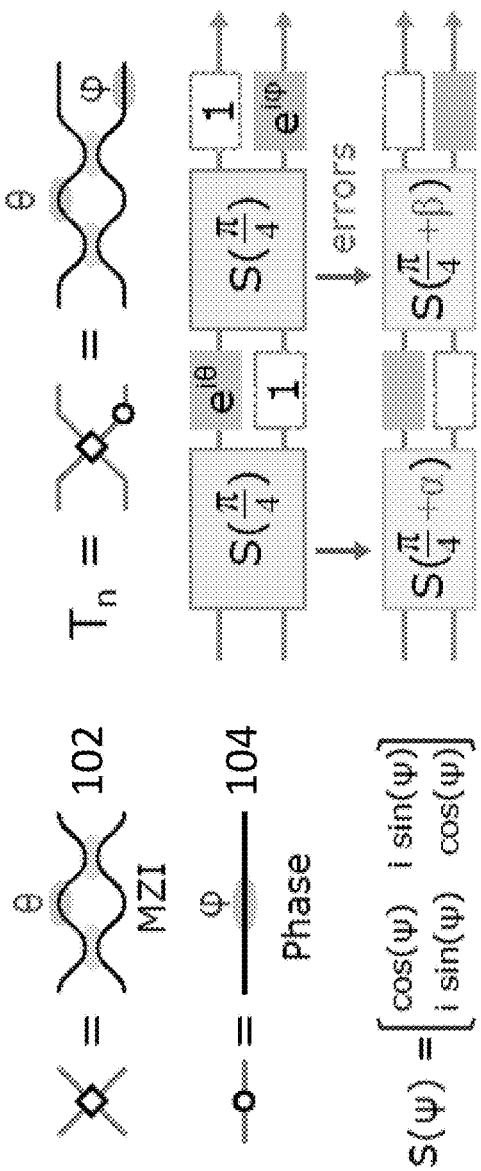

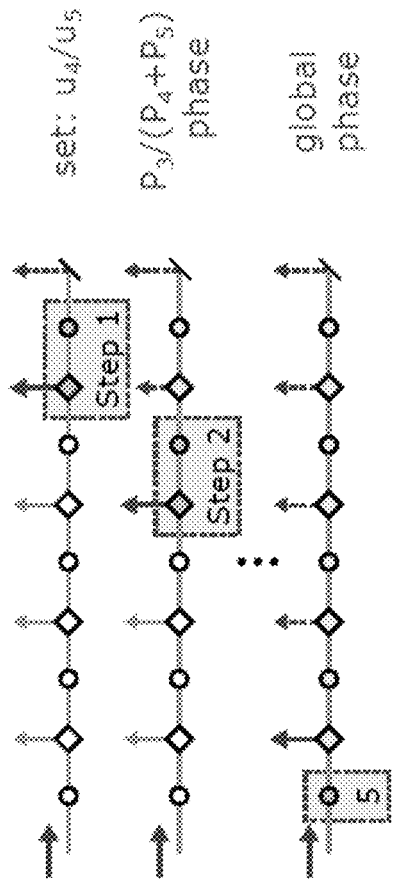
FIG. 12A
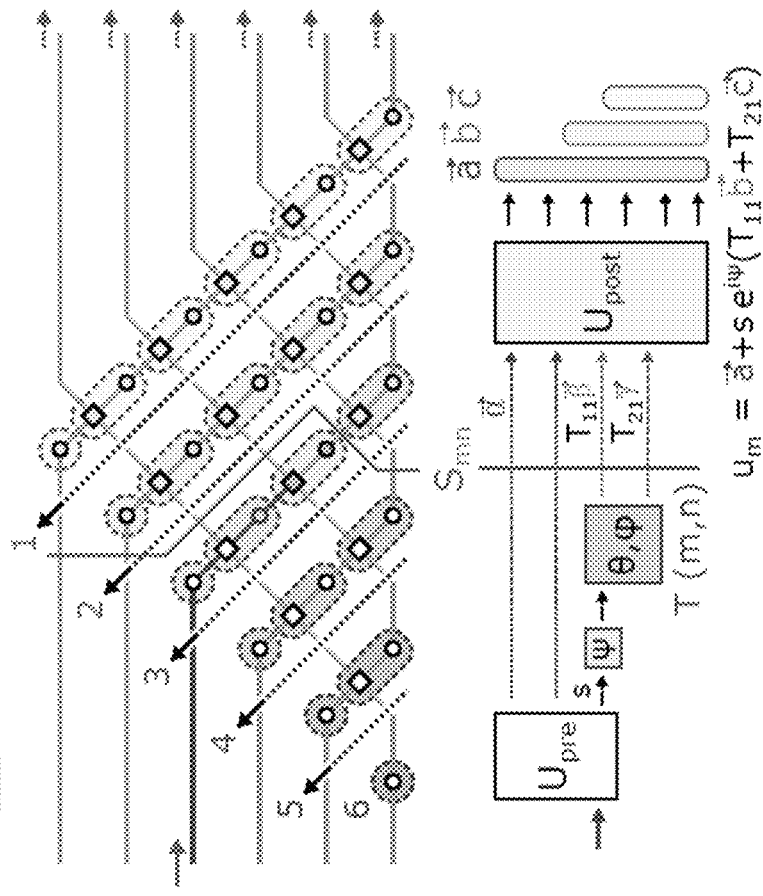
FIG. 12B
FIG. 12C

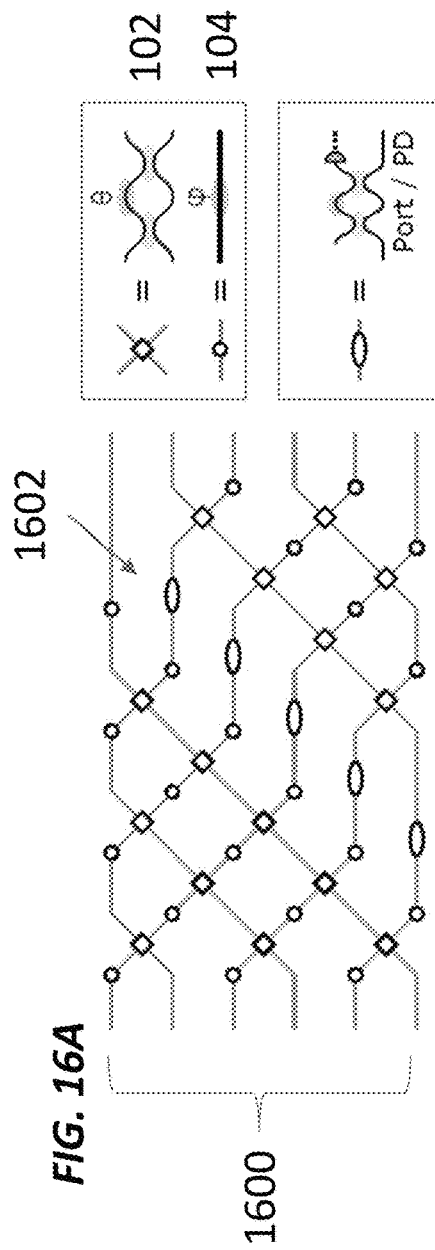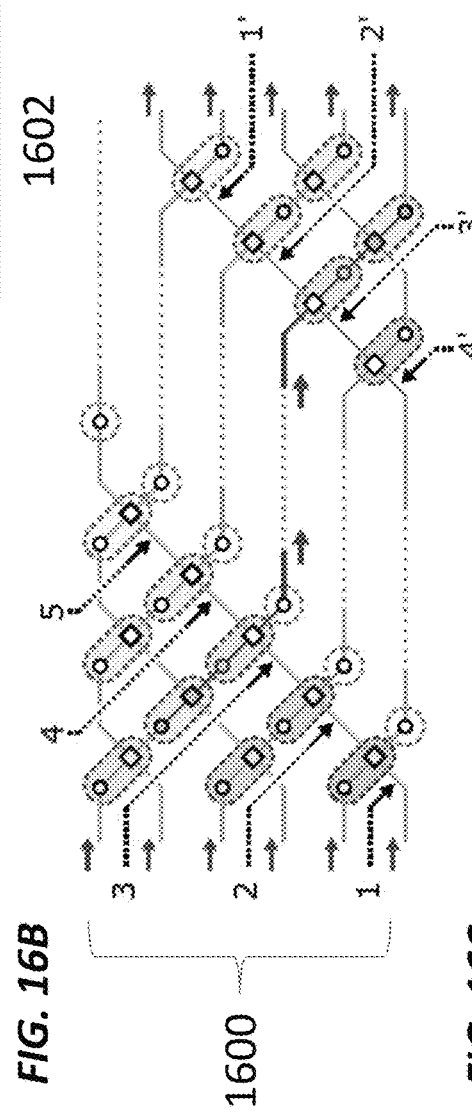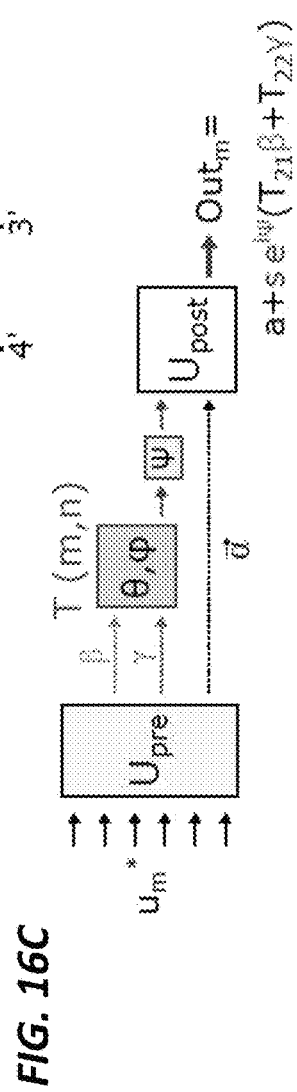
FIG. 16A
FIG. 16B
FIG. 16C

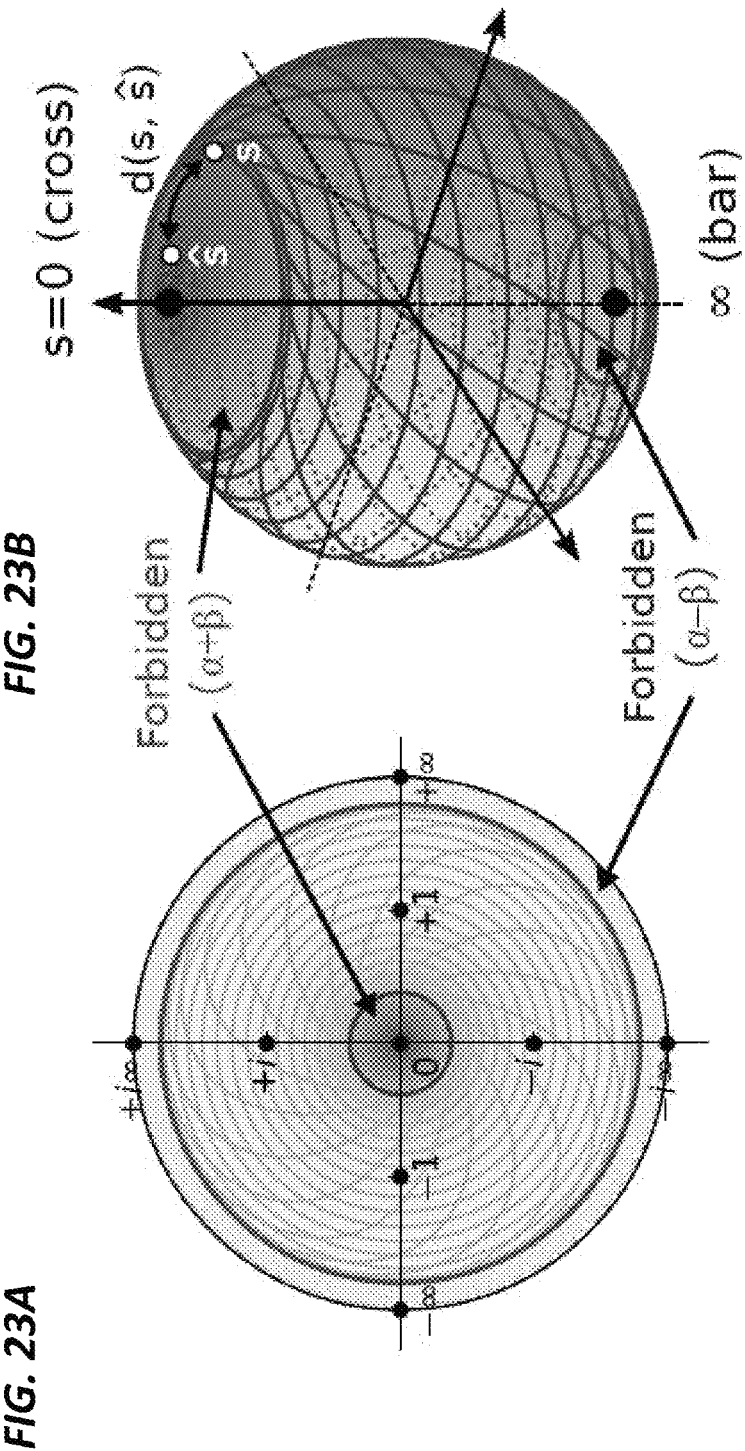
FIG. 23A
FIG. 23B
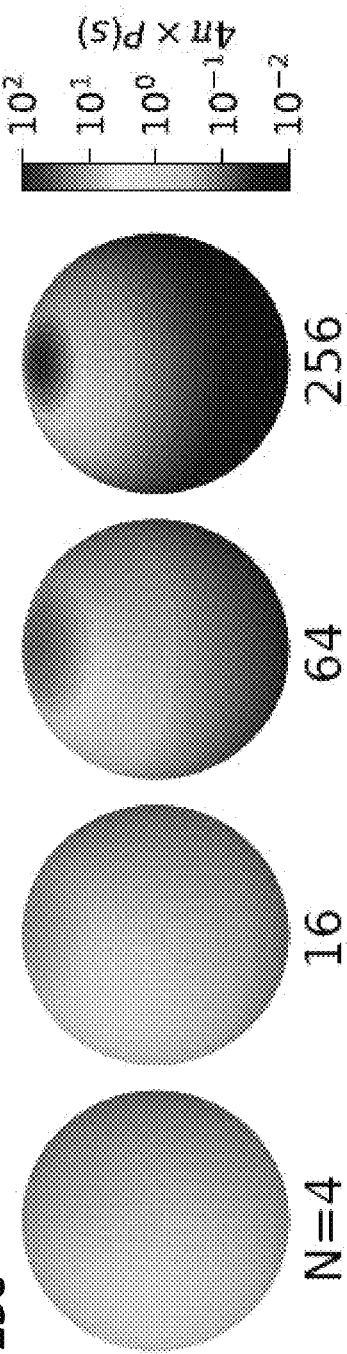
FIG. 23C

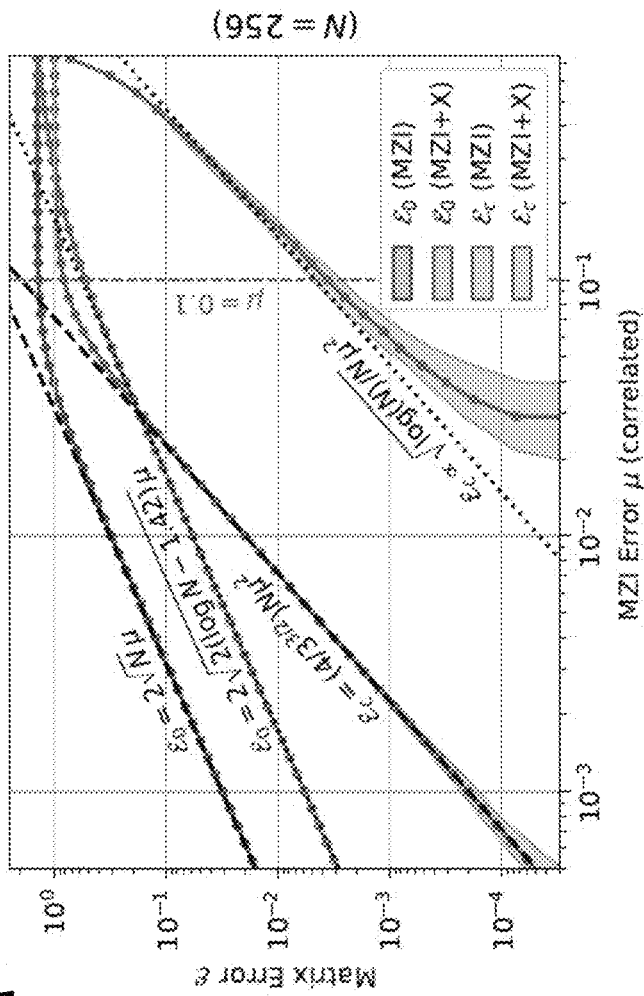
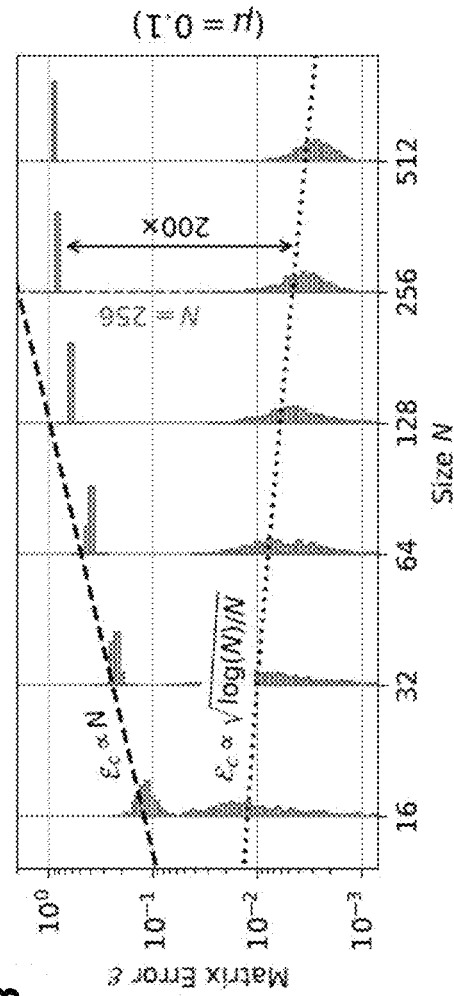
FIG. 28A
FIG. 28B

SELF-CONFIGURATION AND ERROR CORRECTION IN LINEAR PHOTONIC CIRCUITS

CROSS REFERENCE TO RELATED APPLICATION(S)

This application claims the priority benefit, under 35 U.S.C. 119(e), of U.S. Application No. 63/196,301, which was filed on Jun. 3, 2021, and is incorporated herein by reference in its entirety for all purposes.

GOVERNMENT SUPPORT

This invention was made with government support under FA9550-20-1-0113 awarded by the Air Force Office of Scientific Research. The government has certain rights in this invention.

BACKGROUND

Many emerging technologies in photonics rely on multiport interferometers. A multiport interferometer is a linear input-output circuits whose transfer matrix is programmed by the user. A major challenge for multiport interferometers is the presence of hardware errors (e.g., fabrication imperfections) that lead to deviations from ideal behavior. Since hardware errors cascade as light propagates through a circuit, their effects are especially severe on large circuits, and limit the scalability of many photonic systems. To address this problem, many error correction techniques have been proposed, including global optimization, local correction, and progressive self-configuration. However, all of these approaches require accurate pre-calibration of the errors, additional components, or both accurate pre-calibration and additional components.

SUMMARY

We disclose programming methods for multiport interferometers, based on measurement-assisted matrix diagonalization, that correct for hardware errors in a near-optimal fashion without extra hardware complexity or pre-calibration, as well as multiport interferometers programmed or configured according to these methods. In addition, we present modified circuit architectures that further improve scaling: (1) a design based on modified tunable couplers to span a wider range of splitting ratios, and (2) a design based on the generalized FFT butterfly. These new architectures, coupled with error-tolerant programming methods, significantly relax the scaling constraints that hardware errors pose for linear photonic circuits.

One method involves configuring a multiport interferometer comprising a mesh of Mach-Zehnder interferometers characterized by a transfer matrix U=VDW and hardware component errors, where W is a first matrix representing a first portion of the mesh of Mach-Zehnder interferometers, V is a second matrix representing a second portion of the mesh of Mach-Zehnder interferometers, and D is a phase screen. This method includes, for each Mach-Zehnder interferometer in the mesh of Mach-Zehnder interferometers, performing Givens rotations that diagonalize a matrix $X=V^{\dagger}UW^{\dagger}$, iteratively updating the first matrix based on the Givens rotations, and for each column of the first matrix, setting a variable internal phase and a variable external phase of a corresponding Mach-Zehnder interferometer in the mesh of Mach-Zehnder interferometers to direct light to a predetermined port of the corresponding Mach-Zehnder interferometer.

The mesh of Mach-Zehnder interferometers can be a rectangular mesh of Mach-Zehnder interferometers, in which case the method may also include iteratively updating the second matrix based on the Givens rotations and, for each column of the second matrix, setting the variable internal phase and the variable external phase to direct light to a given port of that Mach-Zehnder interferometer. Alternatively, the mesh of Mach-Zehnder interferometers can be a triangular mesh of Mach-Zehnder interferometers and one of the first matrix or the second matrix is equal to the identity matrix I. Each Mach-Zehnder interferometer in the mesh of Mach-Zehnder interferometers can include three beam splitters or two beam splitters and a waveguide crossing.

Performing the Givens rotations can include performing a first Givens rotation that zeros a first element of the matrix X.

Setting the variable internal phase and the variable external phase can involve inputting a signal to the mesh of Mach-Zehnder interferometers representing a corresponding column of one of the first matrix or the second matrix, measuring an output of the mesh of Mach-Zehnder interferometers, and setting the variable internal phase shift and the variable external phase shift based on the output. Inputting the first signal to the mesh of Mach-Zehnder interferometers can comprise directing 100% of the signal coupled to that Mach-Zehnder interferometer out of one port of that Mach-Zehnder interferometer.

Setting the variable internal and external phases may include selecting them such that an inner product of the output and of a corresponding column of a matrix V representing a second portion of the mesh of Mach-Zehnder interferometers equals zero.

Each Mach-Zehnder interferometer in the mesh of Mach-Zehnder interferometers to an approximate cross state before performing the Givens rotations.

The method may also include other steps for each column in the second matrix after setting the variable internal and external phases for each Mach-Zehnder interferometer. These steps include injecting a third signal representing a corresponding column of the second matrix, measuring a third output of the mesh of Mach-Zehnder interferometers, and adjusting the variable internal phase shifts of the Mach-Zehnder interferometers based on the third output.

Another method of configuring a multiport interferometer comprising a mesh of Mach-Zehnder interferometers includes setting an internal phase of a first Mach-Zehnder interferometer in a diagonal of Mach-Zehnder interferometers to produce a desired power ratio at an output of the mesh of Mach-Zehnder interferometers. This method also includes setting an internal phase of at least one second Mach-Zehnder interferometer in the diagonal of Mach-Zehnder interferometers to align phases of partial output vectors at the output of the mesh of Mach-Zehnder interferometers. And it includes setting an internal phase of a last Mach-Zehnder interferometer in the diagonal of Mach-Zehnder interferometers to produce a desired global phase at the output of the mesh of Mach-Zehnder interferometers.

Setting the internal phase of the first Mach-Zehnder interferometer can involved measuring, at the output of the mesh of Mach-Zehnder interferometers, a combination of light that bypasses the first Mach-Zehnder interferometer, light that exits a first output port of the first Mach-Zehnder interferometer, and light that exits a second output port of the first Mach-Zehnder interferometer.

The mesh of Mach-Zehnder interferometers can be a triangular mesh or a rectangular mesh with a diagonal of drop ports. The mesh of Mach-Zehnder interferometers can include N Mach-Zehnder interferometers characterized by an error with a magnitude $\sigma$, in which case the method corrects the error with a stability following an asymptotic form proportional to $N\sigma^2$. The mesh of Mach-Zehnder interferometers can also include N Mach-Zehnder interferometers and be characterized by a transfer matrix U and a normalized matrix error $\varepsilon = \langle \|U\| \rangle_{rms}/\sqrt{N}$, in which case the method suppresses the normalized matrix error by a factor of $\varepsilon^2/\sqrt{6}$.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A illustrates a multiport interferometer in the form of a Reck (triangular) 5×5 Mach-Zehnder interferometer (MZI) mesh.

FIG. 1B illustrates a multiport interferometer in the form of a Clements 5×5 MZI mesh.

FIG. 1C illustrates tunable building blocks—MZIs and phase shifters—of a multiport interferometer and the effect of errors on the MZI transfer function.

FIG. 2A illustrates a Clements mesh undergoing self-configuration and error correction.

FIG. 2B illustrates how the matrices V, W are built up in a sequence of Givens rotations to diagonalize $X = V^\dagger U W^\dagger$ for the Clements mesh in FIG. 2A.

FIG. 2C shows the order of matrix elements representing the Clements mesh in FIG. 2A zeroed by the self-configuration and error correction process.

FIGS. 3A and 3B illustrate procedures for setting the phase for crossings in the W and V matrices, respectively, when programming a physical Clements mesh in the presence of errors.

FIG. 5A illustrates a two-layer deep neural network (DNN) with synaptic connections represented by Clements meshes classifying characters from the MNIST data set.

FIG. 5B is a plot of the simulated classification accuracy as a function of network size N and hardware MZI error $\sigma$ for the DNN of FIG. 5A.

FIG. 9A shows a triangular (Reck) universal multiport interferometer.

FIG. 9B shows constituent components and a 2×2 unit cell $T_n$ of the triangular universal multiport interferometer of FIG. 9A and the effect of errors on the transfer matrix.

FIG. 9C is a plot of the distribution of splitting angles $\theta$ and phase shifts $\phi$ over the Haar measure.

FIG. 12A illustrates programming a 1:N splitter in a ratio method for configuring an MZI mesh.

FIG. 12B illustrates the MZI order for programming an N×N Reck triangle according to the ratio method.

FIG. 12C illustrates the output field decomposed into three components according to the path of the light during configuration of MZI (m, n) in the ratio method of configuring an MZI mesh.

FIG. 16A illustrates a modified Clements mesh with a row of drop ports and detectors along the diagonal.

FIG. 16B illustrates a Clements mesh divided along the diagonal, showing the order or MZI configuration each triangle, according to the ratio self-configuration method (reciprocal variant used for the first triangle).

FIG. 16C illustrates the flow of light through an MZI being configured using a reciprocal ratio method.

FIG. 23A is a plot of the allowed range of $s=T_{11}/T_{12}$; regions near s=0 and s=∞ are forbidden due to imperfections. Contours are lines of constant (θ,φ), with α=0.23, β=0.07.

FIG. 23B is a Riemann sphere plot of the allowed range of $s=T_{11}/T_{12}$ equivalent to the plot in FIG. 23A.

FIG. 23C illustrates the probability density P(s) as a function of mesh size.

FIG. 28A is a plot of matrix error as a function of μ for a mesh made of N=256 MZI+Crossing devices.

FIG. 28B is a plot of matrix error for a mesh made of MZI+Crossing devices as a function of mesh size N for fixed μ.

DETAILED DESCRIPTION

1. Self-Configuring Multiport Interferometers

Figure 4A:
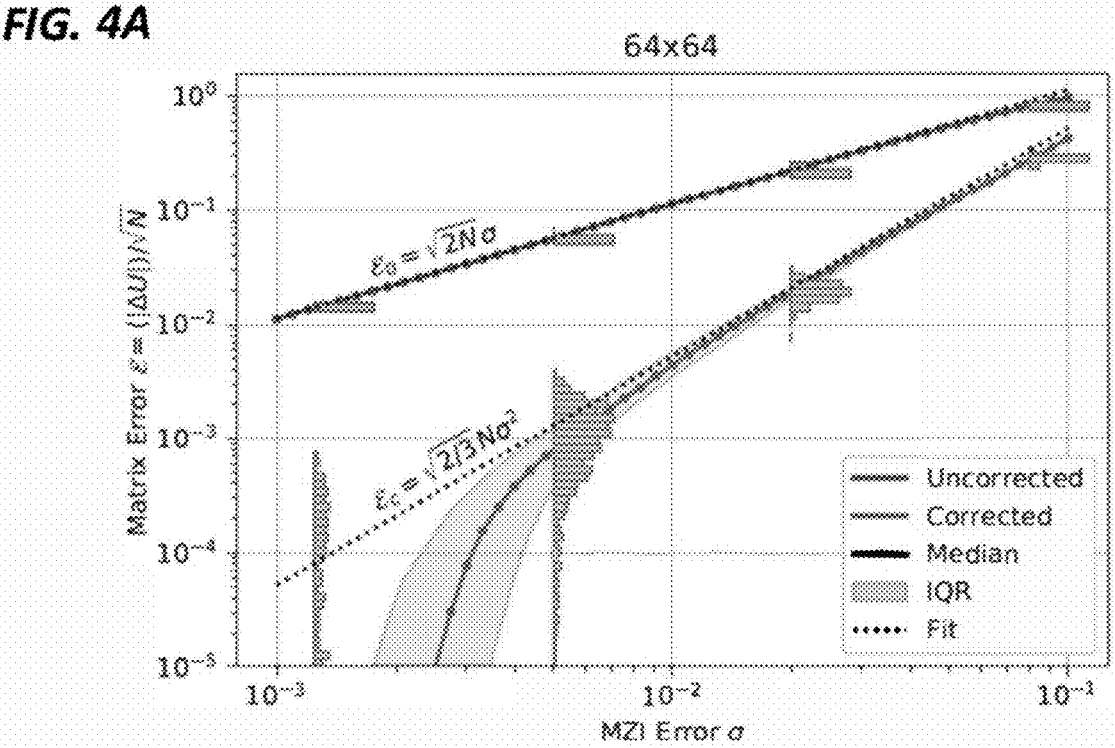
FIG. 4A is a plot of the corrected and uncorrected matrix error as a function of $\sigma$ in a 64×64 Clements mesh.

1.1. Accurate Self-Configuration of Rectangular Multiport Interferometers

Multiport interferometers based on integrated beam splitter meshes are widely used in photonic technologies. While rectangular meshes of integrated beam splitters are favored for their compactness and uniformity, their geometry resists conventional self-configuration approaches, which are useful for programming large meshes in the presence of fabrication error. A configuration process related to the 2×2 block decomposition of a unitary matrix overcomes this limitation. This configuration process is robust to errors, requires no prior knowledge of the process variations, and relies on external sources and detectors. Self-configuration using this technique reduces the effect of fabrication errors by the same quadratic factor observed in triangular meshes. This relaxes a significant limit to the size of multiport interferometers, removing a major roadblock to the scaling of optical quantum and machine-learning hardware.

FIGS. 1A and 1B show universal multiport interferometers, each of which functions as a linear optical input-output device with a programmable transfer matrix. Universal multiport interferometers are especially useful due their generality and broad range of applications, including quantum computing, machine learning acceleration, and microwave photonics.

Both multiport interferometers are scalable meshes of integrated Mach-Zehnder interferometers (MZIs) 104 (diamonds), each of which has a variable or tunable internal phase shift θ and a variable or tunable external phase shift φ. FIG. 1A shows a scalable triangular mesh 100a, also called a Reck mesh or Reck triangle. FIG. 1B shows a rectangular mesh 100b, also called a Clements mesh or Clements rectangle, which is more compact and has greater path-length uniformity and lower sensitivity to loss than a Reck mesh. The MZIs 102 in each mesh 100a, 100b can be characterized by transfer matrices that describe how light at the input ports is coupled to the output ports. The MZIs 102 act as beam splitters with tunable or variable beam splitting ratios controlled by the tunable or variable internal phase shifts and are connected to each other via waveguides. Phase shifters 104 (circles) along some of the waveguides can control or adjust the relative phases (the variable or tunable external phases) of the inputs to and outputs from the different MZIs 102.

A major challenge to scaling MZI meshes like those in FIGS. 1A and 1B is the presence of component errors due to fabrication imperfections. For each mesh 100a/100b, the MZIs 102, phase shifters 104, and waveguides can be fabricated or integrated into the same chip or substrate. The tunable portions of the MZIs 102 and the phase shifters 104 can be implemented as thermo-optic, electro-optic, MEMS, or any other suitable type of tunable phase-shifting device. Unfortunately, the fixed beam splitters in each MZI 102 may have splitting ratios that deviate from 50:50 or the waveguides may impose additional loss or have non-uniform optical path lengths. These errors compound, limiting the maximum achievable size of the MZI mesh absent correction.

FIG. 1C illustrate how errors cause each MZI's transfer matrix to deviate from its programmed value. Since each overall circuit is a cascade of MZIs with O(N) depth, the total error in the transfer matrix scales as $O(\sqrt{N})$, where N is the circuit size (assuming uncorrelated errors). At large mesh sizes, these errors (if left uncorrected) place unreasonable constraints on fabrication tolerances, ultimately limiting the scaling of multiport interferometers. Error-correction techniques are therefore critical for large-scale programmable photonics. Global optimization and in-situ training are promising in principle, but computationally inefficient and device-specific. Local per-MZI correction is also effective but requires prior characterization of the device errors. A number of efficient "self-configuring" processes have been proposed, but these generally work only for triangular meshes and require large numbers of internal power monitors, a significant addition in hardware complexity.

FIGS. 2A-2C illustrate a self-configuration process for correcting or compensating fabrication errors in MZI meshes. This process is naturally adapted to the Clements mesh (e.g., as shown in FIG. 1B) and requires no additional hardware complexity beyond external sources and (coherent) detectors. This process proceeds by configuring the diagonals of the mesh, starting at the corners, in a manner that progressively zeroes out the elements of a target matrix through a sequence of Givens rotations. Numerical experiments on imperfect MZI meshes show that this process is stable and robust, and reduces errors by at least a quadratic factor (while sufficiently small errors are corrected exactly), consistent with the behavior observed for triangular meshes. This significantly relaxes the scaling constraints posed by fabrication imperfections in realistic MZI meshes.

The self-configuration process in FIGS. 2A-2C is based on the diagonalization of a unitary using 2×2 Givens rotations. As shown in FIG. 2A, the mesh is divided along the rising diagonal so that its transfer matrix becomes U=VDW, where D is a phase screen and V and W represent the lower right and upper left triangles, respectively, and are given by:

$$V=(T_{21}, T_{22})(T_{41} \ldots T_{44}) \ldots (T_{N-2,1} \ldots T_{N-2,N-2})$$

$$W=(T_{N-1,N-1} \ldots T_{N-1,1}) \ldots (T_{31} \ldots T_{31})(T_{11}) \quad (1)$$

where $T_{mn}$ is the 2×2 block unitary corresponding to the $n^{th}$ crossing (MZI/phase-shift pair) of the $m^{th}$ diagonal. Following the order in FIG. 2A, the matrices (V, W) are "built up" one block at a time while keeping track of $X=V^{\dagger}UW^{\dagger}$.

FIG. 2B shows the first few steps of this process. Updates to $W \to T_{mn}W$ right-multiply $X \to XT_{mn}^{\dagger}$, and the phases of $T_{mn}$ are chosen to zero an element in the lower-left corner of X. Likewise, updates to $V \to VT_{mn}$ left-multiply $X \to T_{mn}^{\dagger}X$. Following the order in FIG. 2C, this procedure zeroes the elements in the lower-left triangle of X, enforcing diagonality. The remaining phases are read off from the diagonal elements.

While the process in FIGS. 2A-2C correctly sets the phases (θ,φ) for an ideal Clements mesh, it does not work in the presence of errors because the relationship between (θ,φ) and $T_{mn}$ also depends on the splitting angle imperfections (α,β) (FIG. 1C), which are unknown. Fortunately, the following self-configuration process can be used to program a Clements mesh in the presence of errors:

1. Initialize the MZIs to approximate the cross state (θ=0). An ideal cross state is not possible with errors, but an approximation will be fine.
2. Configure the crossings in the order given by FIG. 2A. For each crossing in W [resp. V]:
   a. Perform the Givens rotation $X \to XT_{mn}^{\dagger}$ [resp. $X \to T_{mn}^{\dagger}X$] that zeroes the next element of $X_{ij}$ in the sequence FIG. 2C (note (i,j)≠(m, n)). There is one Givens rotation per step, and it is performed on W for the MZIs in the upper left triangle and on V for the MZIs in the lower right triangle.
   b. Update $W \to T_{mn}W$ [resp. $V \to VT_{mn}$]
   c. Send input $\vec{a}_{in}\vec{w}_{j}^{*}$ (the $j^{th}$ column of $W^{\dagger}$) into the device as shown in FIGS. 3A and 3B, described below. The output $\vec{a}_{out}(\theta,\phi)$ depends on the phases being configured. Set (θ,φ) to zero the inner product $\langle \vec{v}_{i} | \vec{a}_{out}(\theta,\phi) \rangle$, where $\vec{v}_{i}$ is the $i^{th}$ column of V. Put differently, this step involves inputting light with a particular amplitude pattern $(\vec{a}_{in})$ into the mesh; reading the resulting output vector $(\vec{a}_{out})$, which is a function of the internal and external phases (θ,φ) of the MZI being configured; and adjusting the internal and external phases (θ,φ) of the MZI being configured to zero the dot product between the output vector and the $i^{th}$ column of V.
3. Finally, set the diagonal: for each i, inject $\vec{a}_{in}=\vec{w}_{i}^{*}$ and adjust φ to satisfy $\langle \vec{v}_{i} | \vec{a}_{out}(\phi) \rangle = e^{i*arg(X_{ii})}$, where $X_{ii}$ is the corresponding diagonal entry of matrix X.

The self-configuration process given immediately above can also be described as follows. First (step 1 above), the MZIs in the mesh of MZIs are initialized to approximately the cross state. Next (step 2 above), loop over a sequence of measurement-assisted nulling steps, with one loop per MZI in the mesh of MZIs. In the first loop over this sequence, first (step 2a), we find a target rotation $T_{11}$ that zeroes the upper right element of a target matrix X. On a computer, update the matrix W by right multiplication (step 2b). Program the corresponding MZI through a physical measurement that involves injecting an optical signal encoded with a vector w* (the last column of the complex conjugate matrix W*) into the mesh and adjusting the phases of the corresponding MZI to null a particular signal (the inner product $\langle \vec{v}_{i} | \vec{a}_{out}(\theta,\phi) \rangle$). This is a measurement-assisted form of matrix diagonalization. In effect, this physically zeros an off-diagonal element of the target matrix X in hardware, in a manner that is robust to imperfections in the mesh of MZIs.

In other words, in step 2, loop through the MZIs (crossings in the mesh) along the diagonals in the order shown in FIG. 2A, starting with the upper left ascending diagonal, the lower right descending diagonal, then alternating with left ascending and right descending diagonals until all of the MZIs have been configured. For a rectangular mesh, the diagonals are parallel and can be divided into two triangles, with the matrix W representing the upper left triangle (odd loops) and the matrix V representing the lower right triangle (even loops). This involves, at each step, performing a Givens rotation on X, updating matrix W, and injecting the next column of the complex conjugate matrix W into the mesh and adjusting the phases of the corresponding MZI to null the measured inner product, as mentioned above. The loop repeats until all off-diagonal elements are zeroed and the target matrix X is diagonalized, after which the phases of the output phase shifters in the mesh of MZIs can be read off by inspection.

Steps 2a and 2b of the process above are a restatement of the Clements factorization given in FIGS. 2A-2C. However, this is performed merely to keep track of matrices (V, W); the phases ($\theta,\phi$) provided by the process are not used. Instead, Step 2(c) above uses physical measurements find the correct phases in the presence of hardware errors. This step, which corresponds to zeroing the matrix element $X_{ij}=v_i^* U w_j^*$ of the physical hardware, is visualized in FIGS. 3A and 3B:

1. FIG. 3A illustrates configuring W, with an input $\vec{a}_{in} = \vec{w}_j^*$ and program ($\theta,\phi$) to direct all the light to intermediate output j (solid arrow), zeroing the power that goes to j+1 (dashed arrow). There is no access to these intermediate outputs, but j+1 connects to the input i of V; therefore $\langle \vec{v}_i | \vec{a}_{out} \rangle$ is a valid proxy for this field and zeroing it correctly configures the shaded block at right to match W.

2. FIG. 3B illustrates configuring V, with $\vec{v}_i$ to be the output from light at intermediate port i (solid arrow); therefore, the output from light at port i−1 (dashed arrow) should be orthogonal to $\vec{v}_i$. This field is excited by inputting $\vec{w}_j^*$; any errors in the unconfigured mesh will hit downstream inputs k≤i−1, but will not pollute input i. Therefore zeroing $\langle \vec{v}_i | \vec{a}_{out} \rangle$ correctly configures the shaded triangular block of the mesh to match V, provided W is properly configured.

This self-configuration process can be extended to triangular meshes as described below.

To test this self-configuration process, we performed numerical experiments on Clements meshes of size up to 128×128. The tests were implemented in PYTHON and are available as part of the MESHES package. Consider an error model based on imperfections in splitter angles $\alpha,\beta$ (as shown in FIG. 1C), as these dominate fabrication errors in MZI-based silicon photonic circuits. For simplicity, consider the case of uncorrelated Gaussian errors so that the error magnitude can be characterized by a single variable $\sigma = \langle \alpha \rangle_{rms} = \langle \beta \rangle_{rms}$ (the case of correlated errors is treated below; the qualitative results are the same because most correlations cancel out in ensemble averaging). Target matrices are sampled uniformly over the Haar measure. As a figure of merit, we consider the normalized matrix error $\varepsilon = \langle \|U\| \rangle_{rms}/\sqrt{N}$. For unitary matrices, $\varepsilon \in [0,2]$ corresponds to the average relative error of a given matrix element $U_{ij}$.

In the uncorrected case, each MZI introduces a mean error $\langle \|U\| \rangle_{rms} = \sqrt{2}\sigma$. These errors add in quadrature, leading to an overall normalized error $\varepsilon_0 = \sqrt{2N}\sigma$, which grows with mesh size. This is understandable given that a circuit depth that grows as O(N), with each layer contributing $O(\sigma)$ error and the layers adding in quadrature. FIG. 4A plots the error as a function of $\sigma$ for a 64×64 mesh, both without error correction (upper trace) and with the self-configuration process above (lower trace). The self-configuration process improves the matrix fidelity, but there are two distinct regimes: for small $\sigma$, the error approaches machine precision, as errors can be corrected exactly, and for large $\sigma$, the corrected error asymptotes to a finite value:

$$\varepsilon_c = \sqrt{2/3} N\sigma^2 = \frac{1}{\sqrt{6}} \varepsilon_0^2. \quad (2)$$

This form can be derived rigorously from the distribution of MZI splitting angles over the Haar measure, where errors arise solely from MZIs whose target splitting ratios cannot be realized in the imperfect hardware. Since $\varepsilon_c \propto \varepsilon_0^2$, self-calibration leads to a quadratic suppression of errors: the smaller the initial error, the greater the benefit of error correction.

Figure 4B:
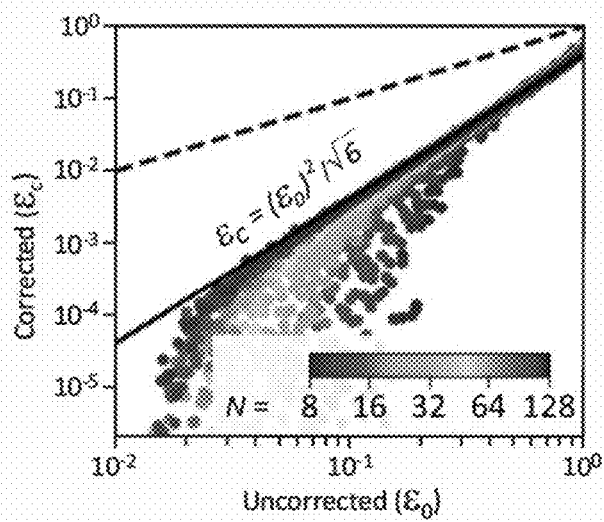
FIG. 4B is a plot showing the corrected error scaling with mesh size, with quadratic suppression of errors due to correction.
Figure 4C:
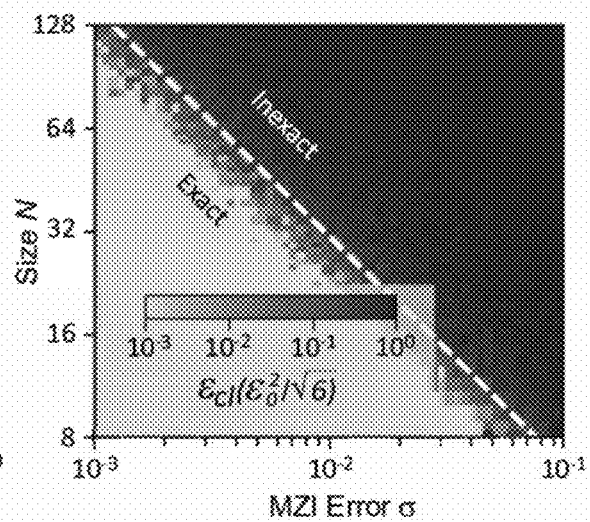
FIG. 4C is a plot illustrating the boundary between the regimes of exact and inexact error correction.

FIGS. 4B and 4C are plots that test the scalability of the self-configuration process by varying the mesh size N. FIG. 4B shows that, as expected, as the mesh size grows, the corrected error asymptotes to a quadratic factor. By plotting $\varepsilon_c/(\varepsilon_0^2/\sqrt{6})$, FIG. 4C shows the boundary between the exactly correctable small-error regime ($\varepsilon_c$=0) and the inexact large-error regime. The regimes meet where the coverage cov(N) of U(N) dips below unity; we have previously shown that cov(N)~$e^{-N^3\sigma^2/3}$; therefore, the boundary lies at roughly $N^3\sigma^2$=3 (dashed curve in FIG. 4C).

To illustrate the benefits of this error reduction, consider as an example deep neural network (DNN) inference on optical hardware. DNNs process data in a sequence of layers, each of which includes (linear) synaptic connections (diagonal lines) and (nonlinear) neuron activations (circles) as shown in FIG. 5A). One exciting possibility is to use photonics to accelerate DNN processing: encode the input in optical amplitudes, use a programmable MZI mesh to implement the synaptic weights, and perform the activations with an all-optical (or electro-optic) nonlinearity. A major challenge is that useful learning tasks often use large mesh sizes (N>100), which are particularly susceptible to fabrication error; accurate DNN inference might take unrealistic process tolerances in the hardware. This challenge has spurred investigations into alternative proposals, which have their own limitations.

FIG. 5B illustrates advantage of error correction in an MZI-mesh DNN accelerator. Here, input images are preprocessed by a Fourier transform and fed into a two-layer DNN, with electro-optic neuron activations. Models with inner layer sizes N=64 and N=256 were trained on the MNIST digit dataset using the Neurophox package. (Details and code are available below.) These pre-trained models were then simulated numerically on imperfect Clements meshes to calculate the classification accuracy. Applying the self-configuration processes increases the error tolerance of these DNNs by a factor of two or more. Directional couplers in silicon typically exhibit a $\sigma \approx 2\%$ in this regime, the uncorrected DNNs show significant degradation, while error correction restores them to their canonical accuracy. Error correction may even allow the use of broadband multi-mode interference couplers, which typically exhibit larger hardware errors.

The self-configuration process for rectangular MZI meshes given above uses external sources and (coherent) detectors and does not rely on an accurate characterization of device errors. This method is based on the diagonalization of a unitary matrix by Givens rotations, with a specific set of measurements performed to ensure that the Givens rotations are properly implemented in the hardware. For sufficiently small hardware errors, this self-configuration process leads to perfect realization of the target matrix. For large errors, it achieves the same quadratic reduction $\varepsilon \to \varepsilon^2/\sqrt{6}$ observed for local correction processes and self-configuration on triangular meshes. The self-configuration technique increases the robustness of optically accelerated DNNs to hardware error, particularly in the region around a $\sigma \approx 2\%$ characteristic of directional couplers in silicon.

1.2. Accurate Self-Configuration for Triangular (Reck) Meshes

One aspect of self-configuring a Clements mesh is realizing that it can be divided into two triangles with a phase screen in the center: U=VDW. By configuring one diagonal at a time, alternating between V and W, it is possible to zero all the elements of the target matrix $X = V^\dagger U W^\dagger$, thus realizing the desired unitary. This procedure is simplified when configuring a Reck mesh, which can be expressed in terms of a single triangle:

$$U = D(\Pi_{mn} T_{mn}) \text{ or } (\Pi_{mn} T_{mn}) D \text{ for } W \text{ or } V, \text{ respectively.}$$

Figures 6A, 6B:
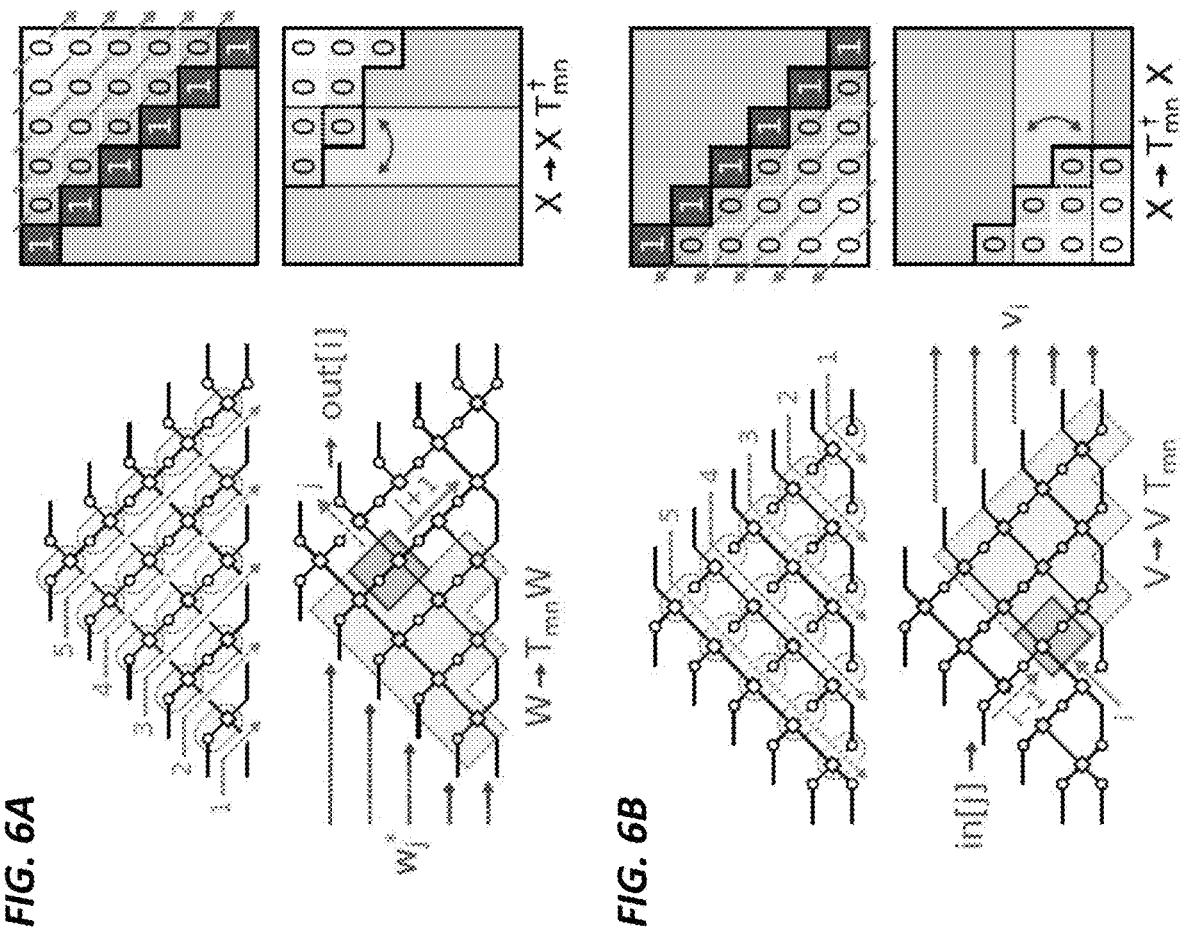
FIG. 6A illustrates a self-configuration procedure for a triangular Reck mesh with an output phase screen
FIG. 6B illustrates a self-configuration procedure for a triangular Reck mesh with an input phase screen.

The first case U=DW corresponds to a mesh with an output phase screen, as shown in FIG. 6A, while the mesh for U=VD has an input phase screen, as shown in FIG. 6B. The self-configuration process above simplifies by substituting V=I [resp. W=I]. This leads to two cases:

1. For the first case, shown in FIG. 6A, the process works downstream from the leftmost MZI. For example, we can work down the falling diagonals, with the order given in the figure. Each step adds an MZI to $W \to T_{mn} W$, which updates the target matrix $X \to X T_{mn}^\dagger$ to zero an element in the upper triangle. With input field $\vec{a}_{in} = \vec{w}_h^*$ (the $j^{th}$ column of $W^\dagger$), the parameters $(\theta, \phi)$ are set to zero the field at output i, where (i,j) is the index of the element $X_{ij}$ being zeroed.

2. For the second case, shown in FIG. 6B, the process works upstream from the rightmost MZI, which performs the update $V \to T_{mn} V$, $X \to T_{mn}^\dagger X$. With light sent into the $i^{th}$ input, $(\theta, \phi)$ are chosen to zero the dot product between the output field and $v_i$ (the $i^{th}$ column of V).

After the crossings are configured, the phases of D can be obtained by inspection.

The MZI order in FIGS. 6A and 6B is not unique. Any order that preserves causality (the set of configured and unconfigured MZIs should be causally separated) should produce a valid self-configuration.

Like the self-configuration of the Clements mesh, the self-configuration process for the Reck mesh above is designed, at each time step, to properly set the configured MZIs in the shaded rectangular [resp. triangular] block to realize W [resp. V]. The process in FIG. 6A is closely related to the Reversed Local Light Interference Method (RELLIM). However, there are at least two differences. First, RELLIM inputs columns of $U^\dagger$, while our scheme inputs columns of $W^\dagger$. As the MZIs are configured, W changes. Second, RELLIM assumes the existence of internal power detectors after each MZI (or the ability to pre-calibrate the downstream mesh so that internal fields can be read off from the outputs). By inputting a row of the target Wt, light will exit the rectangular block along only the $j^{th}$ and $(j+1)^{th}$ channels (provided that the upstream MZIs are correctly set). The former, which is set to zero by varying $(\theta, \phi)$, is read off directly from the $i^{th}$ output.

The self-configuration processes in FIGS. 6A and 6B are reciprocals of each other and can also be related to the "ratio method" described below, since the process of zeroing matrix elements never depends on absolute amplitudes, only on their ratios. Moreover, the ratio method is also robust in the presence of large errors and achieves the same quadratic error reduction. However, when configuring each MZI, the ratio method uses a sweep of the upstream phase shifter in order to subtract the common amplitude d, a procedure that is not necessary here.

Figure 7:
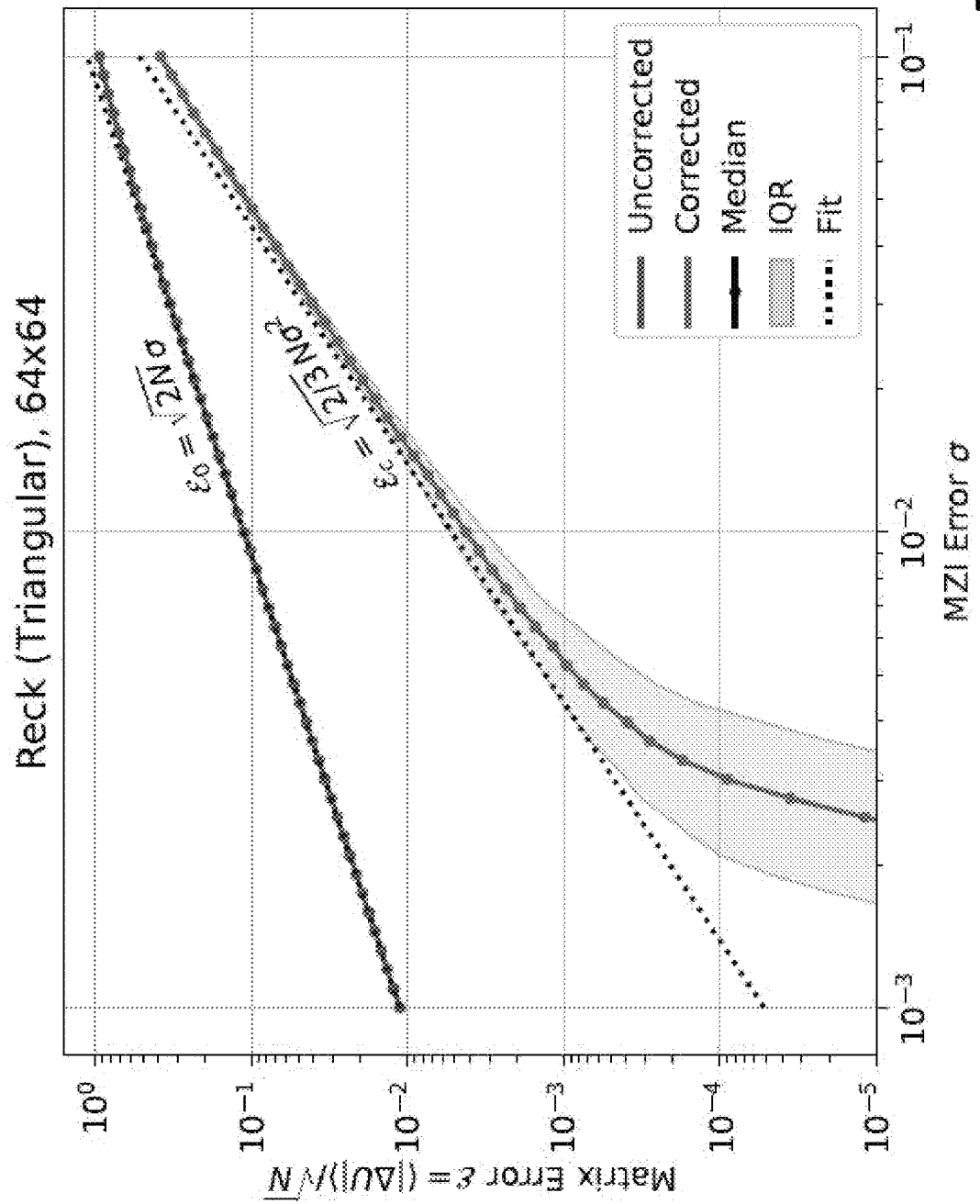
FIG. 7 is a plot of corrected and uncorrected matrix error (lower and upper traces, respectively) as a function of MZI error $\sigma$ for a 64×64 Reck mesh.

FIG. 7 plots the matrix error $\varepsilon = \|\Delta U\|/\sqrt{N}$ as a function of MZI error $\sigma$ for the Reck mesh. The result is identical to the case of the Clements mesh, shown in FIG. 4, following the curves $\varepsilon_0 = \sqrt{2N}\sigma$, $\varepsilon_c = \sqrt{2/3}N\sigma^2$ predicted by theory. Over the Haar measure, the distribution of MZI splitting angles is the same for both mesh geometries up to a reordering of the MZIs; therefore, this correspondence is unsurprising.

The self-configuration processes for Reck and Clements can be mapped to a general-purpose subroutine that self-configures any MZI mesh of the form U=VDW, provided that the geometry admits a matrix diagonalization by way of Givens rotations.

1.3. Correlated Errors

In realistic MZI meshes, the beam splitter errors $\alpha_n$, $\beta_n$ tend to be strongly correlated, since the process variations that lead to errors (waveguide thickness and spacing, partial etch depth, slab height) usually have correlation lengths much longer than the size of an MZI. In general, the matrix error $\langle \|\Delta U\|^2 \rangle$ depends both on the error amplitudes ($\langle \alpha_n^2 \rangle$, $\langle \beta_n^2 \rangle$) as well as their correlations ($\langle \alpha_m \alpha_n \rangle$, etc.). For an individual matrix U, the dependence on correlations can be significant. However, in an ensemble average over the Haar measure, this dependence becomes very small for most inter-MZI correlations because of the random phase shifts between pairs of MZIs. Only intra-MZI correlations $\langle \alpha_n/\beta_n \rangle$ have a significant effect on the ensemble-averaged matrix error.

Consider the extreme case of full correlation $\alpha_n = \beta_n = \mu$. This case is realized, for instance, when the dominant error source arises from operating the mesh away from the coupler design wavelength. The coverage, uncorrected error, and corrected error are calculated to be:

$$\text{cov}(N) = e^{-(2/3)N^3 \mu^2}$$

$$\varepsilon_0 = 2\sqrt{N}\mu$$

$$\varepsilon_c = \sqrt{8/9} N \mu^2$$

Figure 8:
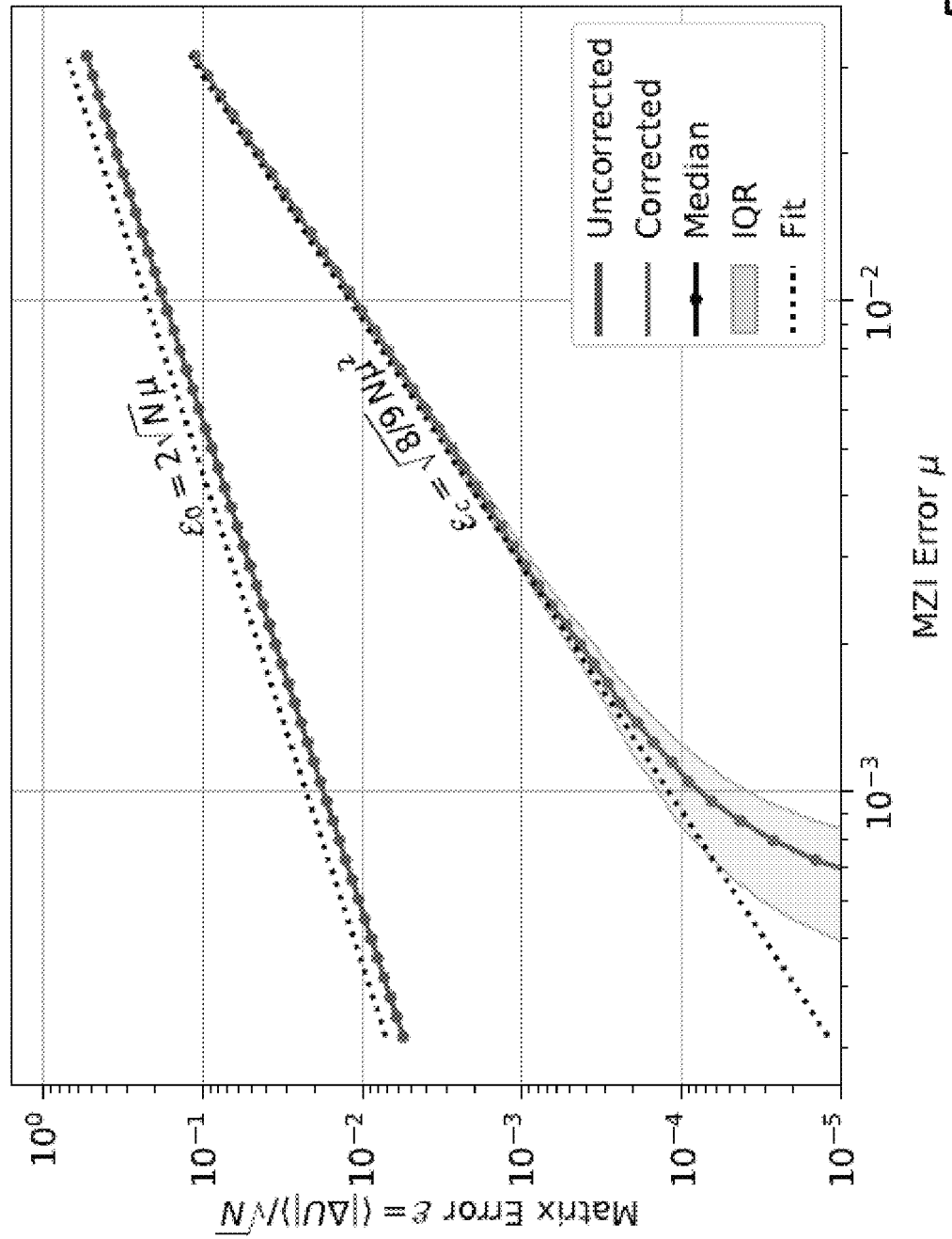
FIG. 8 is a plot of corrected and uncorrected matrix error (lower and upper traces, respectively) as a function of correlated MZI error amplitude $\mu$, 128×128 Clements mesh.

FIG. 8 plots $\varepsilon_0$ and $\varepsilon_c$ against the error amplitude $\mu$ for a 128×128 Clements mesh. Small residual dependences on correlation (proportional to $\theta_m \theta_n$) lead to a slight deviation in $\varepsilon_0$, while the theoretical curve for $\varepsilon_c$ matches very accurately. The behavior is qualitatively very close to that in the uncorrelated case.

1.4. Neural Network Model

In the optical neural network model described above with respect to FIGS. 5A and 5B, images from the MNIST digit dataset are preprocessed with a Fourier transform, which is cropped to a $\sqrt{N} \times \sqrt{N}$ window, where N is a model parameter that quantifies the size of the neural network. The light from this window (N input neurons) is fed into a two-layer optically accelerated DNN. This DNN consists of a single inner layer and two N×N unitary circuits, represented by Clements meshes.

The activation function at the inner layer is realized with an electro-optic nonlinearity: a fraction of each output field is fed into a detector that drives a Mach-Zehnder modulator, while the remaining light passes through the modulator. This implements the activation function:

$$f(E)=\sqrt{1-\alpha}e^{-i(g|E|^2+\phi-\pi)/2}\cos(\tfrac{1}{2}(g|E|^2+\phi))$$

where $\alpha$ is the power tap fraction, g is the modulator phase induced per unit optical power, and $\phi$ is the phase in the absence of power. Here, we choose $\alpha=0.1$, $g=\pi/20$, and $\phi=\pi$, which causes f(E) to approximate the form of a leaky ReLU in the right power regime.

2. Stability of Self-Configuring Large Multiport Interferometers

As explained above, realistic multiport interferometers (beam splitter meshes) are sensitive to component imperfections, and this sensitivity increases with mesh size (number of ports). Self-configuration techniques like those disclosed above can be employed to correct these imperfections, but not all self-configuration techniques are equal. This section highlights the benefits of stability in self-configuration. Naïve approaches based on sequentially setting matrix elements tend to be unstable and to perform poorly for large meshes, while techniques based on power ratios perform well in (all) cases, even in the presence of large errors. A self-configuration process for triangular meshes based on this sight uses only external detectors and works without prior knowledge of the component imperfections. This self-configuration process extends to the rectangular mesh by adding a single array of detectors along the diagonal.

Photonic technologies increasingly rely on programmable and reconfigurable circuits. One component in such circuits is the universal multiport interferometer, which, as described above, is an optical device with N>2 inputs and outputs, whose linear input-output relation (transfer matrix) is set by the user. Multiport interferometers are indispensable in applications ranging from linear optical quantum computing and radio-frequency (RF) photonics to signal processing and machine learning acceleration. They also play a useful role in proposed photonic field-programmable gate arrays. Interferometer size (i.e., number of ports) is one figure of merit for these applications. Scaling up multiport interferometers is an active field in research. Recent advances in silicon photonics are promising, allowing the scale-up from small proof-of-concept designs to large (and therefore technologically useful) systems.

Again, component imperfections are a major challenge to scaling the size of multiport interferometers. This is because large multiport interferometers are usually based on dense meshes of tunable beam splitters, whose circuit depth grows with size. Most non-recirculating designs are variants of the triangular Reck or rectangular Clements beam splitter mesh, both of which encode an N×N unitary transfer matrix into a compact mesh of programmable MZIs. These circuits have O(N) depth, meaning that component errors cascade as light propagates down the mesh. The upshot is that scaling in size should be accompanied by scaling in precision to preserve the accuracy of the input-output map. This challenge tends to be most acute for optical machine learning applications, which rely on very large mesh sizes for performance, where fabrication errors from even state-of-the-art technology are predicted to significantly degrade optical neural network (ONN) accuracy in hardware.

Several self-configuration techniques can suppress the effect of component imprecisions. For machine learning applications, the MZI phase shifts can be learned by in situ training, but this involves extra hardware (inline power detectors) and the learned weights are specific to the given device. Alternatively, if the chip has been pre-calibrated so the imperfections are known, global optimization can be used to find the phase shifts offline; however, this approach is time-consuming and typically requires that the hardware imperfections be known to high accuracy. MZI errors can also be eliminated by pairing MZIs, though this doubles the loss and chip area. Finally, for triangular meshes, the MZIs of each diagonal can be configured sequentially. This approach, however, also uses $O(N^2)$ inline power detectors (or pre-calibrated MZIs that can be configured to a perfect "bar" or "cross" state). In short, these other configuration schemes rely on either (i) additional hardware complexity, such as inline detectors or MZI pairing, or (ii) accurate pre-calibration of the mesh's component errors.

The self-configuration processes disclosed here can use only external detectors and do not rely on prior calibration of the MZI mesh. Not all self-configuration processes are created equal, and stability distinguishes good self-configuration processes from bad ones: for example, a straightforward approach based on sequentially matching matrix elements works in principle but performs poorly in the presence of large errors. Based on this insight, we propose a self-configuration process based on orthogonality and power ratios that performs well in all cases, even in the presence of large errors. This scheme is directly applicable to triangular meshes but can also be extended to a rectangular mesh with the addition of a single array of inline power detectors along the diagonal.

2.5. Statistics of Imperfect Meshes

Two common multiport interferometer designs are the Reck triangle, shown in FIG. 9A, and the Clements rectangle. In both cases, the circuit can be laid out on a regular grid of 2×2 elements without any waveguide crossings, a major advantage compared to competing designs. The input-output matrix of the mesh is accordingly a product:

$$U=(\Sigma_n T_n)D,$$

where D is a phase mask and the $T_n$ are 2×2 block matrices representing a phase shifter cascaded into an MZI crossing as shown in FIG. 9B:

$$T_n = \underbrace{\begin{bmatrix} 1 & 0 \\ 0 & e^{i\phi_n} \end{bmatrix}}_{P_2(\phi_n)} \underbrace{\begin{bmatrix} \cos(\pi/4+\beta_n) & i\sin(\pi/4+\beta_n) \\ i\sin(\pi/4+\beta_n) & \cos(\pi/4+\beta_n) \end{bmatrix}}_{S(\pi/4+\beta_n)} \times$$

$$\underbrace{\begin{bmatrix} e^{i\theta_n} & 0 \\ 0 & 1 \end{bmatrix}}_{P_1(\theta_n)} \underbrace{\begin{bmatrix} \cos(\pi/4+\alpha_n) & i\sin(\pi/4+\alpha_n) \\ i\sin(\pi/4+\alpha_n) & \cos(\pi/4+\alpha_n) \end{bmatrix}}_{S(\pi/4+a_n)}$$

Here $(\theta_n, \phi_n)$ are the phases programmed by the user, e.g., through thermo-optic, or MEMS phase shifters, while $(\pi/4+\alpha_n, \pi/4+\beta_n)$ are the coupler angles, a property of the circuit and its imperfections $(\alpha_n, \beta_n)$. These angles are $\pi/4$ in an ideal MZI, which enables perfect contrast on each MZI output. In such a device, the phase shifts can be found by a procedure that diagonalizes U with a sequence of 2×2 rotations. (Another convention is to place the phase mask at the end, $U=D\Pi_n T_n$, and put the phase shifter $\phi_n$ at the beginning of the unit cell: $T_n=S(\pi/4+\beta_n)P_1(\theta_n)S(\pi/4+\alpha_n)P_1(\phi_n)$).

2.6. Component Errors

Component errors (deviations from design) may perturb the input-output matrix. The magnitude of this perturbation ΔU can be quantified by the Frobenius norm $\|\Delta U\|^2 = \sum_{ij} |\Delta U_{ij}|^2$ and normalized to define an error measure:

$$\mathcal{E} = \frac{1}{\sqrt{N}} \langle \|\Delta U\| \rangle_{rms} \in [0, 2]$$

This metric can be interpreted as an average relative error per entry in the matrix U; for small ε, the quantity (1−ε) plays a role similar to the fidelity of a quantum operation, an analogy that can be made rigorous in the case of linear optical quantum computing. To first order, the effect of component errors is linear:

$$\Delta U = \sum_n \left[ \left(\frac{\partial U}{\partial \alpha_n}\right) \alpha_n + \left(\frac{\partial U}{\partial \beta_n}\right) \beta_n \right]$$

Applying the equations above yields $\partial U/\partial \alpha_n = U_{pre} S'(\pi/4) U_{post}$ (and likewise for $\partial U/\partial \beta_n$). Since we are interested here in the magnitude $\|\Delta U\|$ and matrices ($U_{pre}$, $U_{post}$) are unitary, it follows that:

$$\left\|\frac{\partial U}{\partial \alpha_n}\right\| = \left\|\frac{\partial U}{\partial \beta_n}\right\| = \|S'(\pi/4)\| = \sqrt{2}$$

Thus, the mesh is equally sensitive to all beam splitters, irrespective of geometry.

At this point, it becomes helpful to introduce an error model, since perturbations from nearby crossings may lead to correlated errors in U. While real imperfections are correlated, this adds significant complexity to the math that obfuscates the insights. Moreover, while correlations may affect the error measure of a particular matrix, when considering ensembles of matrices, they are expected to average to zero. Therefore, we assume an uncorrelated error model where $\langle (\alpha_n)\rangle_{rms} = \langle \beta_n \rangle_{rms} = \sigma$ for a given error amplitude σ.

Under the uncorrelated model, the error terms in the equation above for ΔU add in quadrature over the N(N−1) couplers to give:

$$\varepsilon = \sqrt{2(N-1)} \sigma \sim (2N)^{1/2} \sigma$$

Since the depth of the circuit is O(N), and independent errors in each layer add in quadrature, it is not surprising that $\varepsilon \geq N^{1/2}$. Component precision should therefore increase as meshes are scaled up in order to maintain a desired matrix accuracy.

2.7. Error Correction

As mentioned above, if the beam splitter imperfections ($\alpha_n, \beta_n$) are known, correction schemes can be used to program a unitary to relatively good accuracy. 2×2 unitaries with the same power splitting ratio are equivalent up to external phase shifts. In the presence of imperfections, the MZI does not achieve perfect contrast in both output ports. The range of splitting angles is truncated to:

$$2|\alpha+\beta| \leq \theta \leq \pi - 2|\alpha-\beta|$$

If this inequality is satisfied, a perfect MZI $T(\theta_n, \phi_n)$ can be replaced by an imperfect MZI with external phase shifts:

$$\exists \theta'_n, \phi'_n, \chi'_n, \psi'_n :$$

$$T(\theta_n, \phi_n) = T(\theta'_n, \phi'_n \mid \alpha_n, \beta_n) \begin{bmatrix} e^{i\chi'_n} & 0 \\ 0 & e^{i\psi'_n} \end{bmatrix}$$

(The extra phase shifts can be absorbed into the neighboring MZIs so that the number of physical phase shifters on the mesh does not increase.) Provided that the inequality is satisfied for all MZIs in the ideal Reck/Clements decomposition, this procedure can lead to a perfect representation of the matrix. The fraction of unitary matrices realizable by an imperfect mesh is called the coverage, cov(N, σ). If some MZIs do not satisfy the inequality above, we pick the closest possible internal phase setting for the MZI, $\vec{\theta}_n \in \{\theta_{min}, \theta_{max}\}$, which leads to an error in the matrix:

$$\|\Delta U\|_{MZI} = \left\| \begin{bmatrix} \cos(\theta_n/2) & i \sin(\theta_n/2) \\ i \sin(\theta_n/2) & \cos(\theta_n/2) \end{bmatrix} - \begin{bmatrix} \cos(\hat{\theta}_n/2) & i \sin(\hat{\theta}_n/2) \\ i \sin(\hat{\theta}_n/2) & \cos(\hat{\theta}_n/2) \end{bmatrix} \right\|$$

$$= 2^{-1/2} |\theta_n - \hat{\theta}_n| + O\left((\theta_n - \hat{\theta}_n)^3\right)$$

Not all unitaries are equally easy to express on an MZI mesh. For this reason, when analyzing the efficiency of an error correction scheme, it helps to specify the probability distribution of U. Here, we consider random unitaries under the Haar measure, a distribution that samples uniformly from the space of unitary matrices. Under this measure, the phase shifts $\theta_n \in [0,\pi)$ and $\phi_n \in [0,2\pi)$ are uncorrelated and distributed according to:

$$P(\phi) = \frac{1}{2\pi} \text{ (uniform over \% complete brackets([0, } 2\pi)\% \text{ complete brackets])}$$

$$P(\theta \mid k) = k \sin(\theta/2) \cos(\theta/2)^{2k-1}$$

where k is the row index of the Reck mesh, starting from k=1 at the bottom as labeled in FIG. 9A. The phase shifts of the Clements mesh follow the same distribution with a different layout of crossings.

FIG. 9C shows a distribution of splitting angles θ and phase shifts φ over the Haar measure. The distribution clusters tightly around θ=0 for MZIs with large k. Therefore, coverage and accuracy in large meshes is primarily limited by the small θ values. P(θ|k) can be linearized for small θ, so the probability of a single MZI breaking the bound given by the inequality is approximately $$p_{unsat}(k) = \int_0^{2|\alpha+\beta|} P(\theta \mid k) d\theta \approx k(\alpha+\beta)^2$$

For an N×N unitary, there are (N−k) MZIs of rank k. The coverage is equal to the probability, under the Haar measure, that all $\theta_n$ are realizable. Since the $\theta_n$ are uncorrelated, this is a product of the probabilities for each MZI:

$$COV(N) = \prod_k (1 - p_{unsat}(k))^{N-k} \approx \exp\left[-\underbrace{\sum_k k(N-k)((\alpha+\beta)^2)}_{n_{unsat}}\right] \approx e^{-N^3\sigma^2/3}$$

Figure 10A:
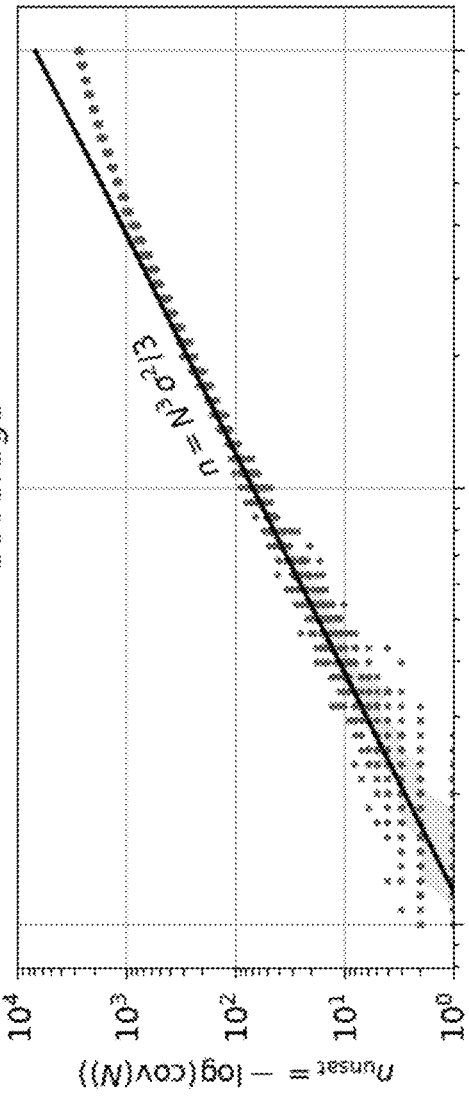
FIG. 10A is a plot of the number of unsatisfied MZIs for Haar-random unitaries with imperfect meshes, N=128.

This is vanishingly small for large MZI meshes: for example, taking a reasonable value of σ=0.02, even a 32×32 mesh has a coverage around 1%. FIG. 10A shows that the number of "unsatisfiable" MZIs that break the inequality condition increases rapidly with error and problem size.

Even if most unitaries cannot be realized exactly, they can be approximated to much better accuracy than the uncorrected result. Each MZI with an unrealizable $\theta_n$ will lead to a matrix error. Over the Haar measure, the average error induced by a particular MZI is thus:

$$\langle \|\Delta U\|^2 \rangle MZI, k = \int P(\theta|k) \|\Delta U(\theta)\|^2 d\theta \approx$$

$$\int_0^{2|\alpha+\beta|} \frac{k\theta}{2} \frac{(2|\alpha+\beta|-\theta)^2}{2} d\theta = \frac{k}{3}(\alpha+\beta)^4$$

Assuming the errors are uncorrelated (see below for the correlated case), they add in quadrature: $\langle \|\Delta U\|^2\rangle = \Sigma_k(N-k)$ $\langle \|\Delta U\|^2\rangle_k \approx 1/18\ N^3 \langle (\alpha+\beta)^4\rangle = 2/3 N^3\sigma^4$. The corrected normalized error is therefore:

$$\varepsilon_{corr} = \sqrt{2/3 N}\sigma^2$$

Figure 10B:
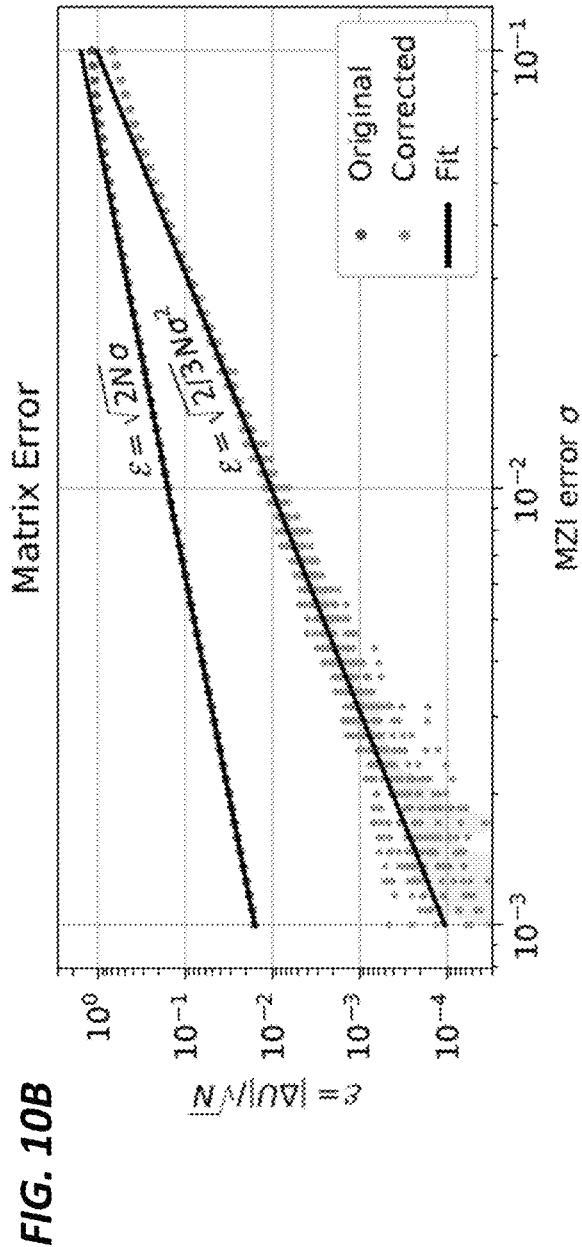
FIG. 10B is a plot of the matrix error $\varepsilon = \|\Delta U\|/\sqrt{N}$ with and without correction for Haar-random unitaries with imperfect meshes, N=128, demonstrating the accuracy enhancement of the local correction process.

This is plotted in FIG. 10B. Recall that the uncorrected error scales as $\varepsilon \propto \sqrt{N}\sigma$. This means that $\varepsilon_{corr} \propto \varepsilon^2$, i.e., correction allows for an effective "squaring" of the error. If the errors are very large to begin with, error correction may not provide much benefit. For most fabricated circuits, however, the uncorrected error ε is reasonably small (though not small enough for many applications), and error correction can give a significant boost in accuracy.

2.8. Direct Self-Configuration Process

In many circumstances, the error correction procedure in the section immediately above cannot be applied because the errors in an MZI mesh are not known to sufficient accuracy. Nevertheless, for triangular meshes, "progressive" self-configuration strategies can still be used. As noted above, many other self-configuration processes rely on inline photodetectors or pre-calibration, which limits their usefulness in many systems. Here, we disclose a simple "direct" self-configuration method, also called the direct method or process, that is based on sequentially setting matrix elements. This direct self-configuration method can be run on uncalibrated hardware with only external detectors; and a "ratio" method based on setting power ratios.

Figure 11A:
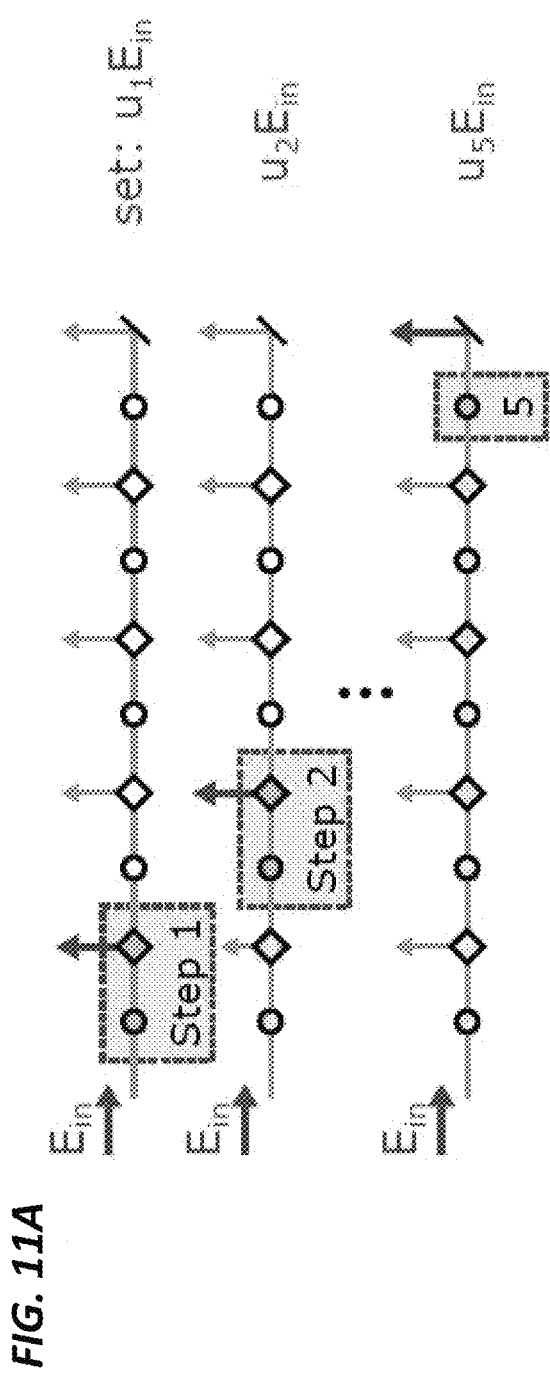
FIG. 11A illustrates a process for programming a 1:N splitter, starting at the input MZI and working down to the last output.

One way to program a triangular mesh is to set the MZI phases one at a time to match the target matrix elements $\vec{U}_{ij}$. This can be understood by considering first the case of a tunable 1:N splitter and later generalizing to an N×N unitary. FIG. 11A shows the "direct" self-configuration method for programming a 1:N splitter, which we wish to set to a target splitting vector $\hat{u}$, $\|\vec{u}\|=1$. Given a coherent input $E_{in}$, the procedure includes N steps, starting from the input of the splitter and working towards the final output. In the first N−1 steps, a pair of phases (θ,ϕ) (corresponding to an MZI and phase shifter (shown in FIG. 9A) are tuned to set the $m^{th}$ (complex) output amplitude $\vec{u}_m E_{in}$. The two degrees of freedom are sufficient to set the real and imaginary components of $\hat{u}_m$ independently. In the final step, there is a single degree of freedom (a phase shift ϕ); however, since $\hat{u}$ has unit norm, at this stage its amplitude is already constrained and only the phase is free; therefore, provided the preceding elements $\vec{u}_m$ are set properly, the last target splitting vector $\hat{u}_N$ can be set with just one phase shift.

Figure 11B:
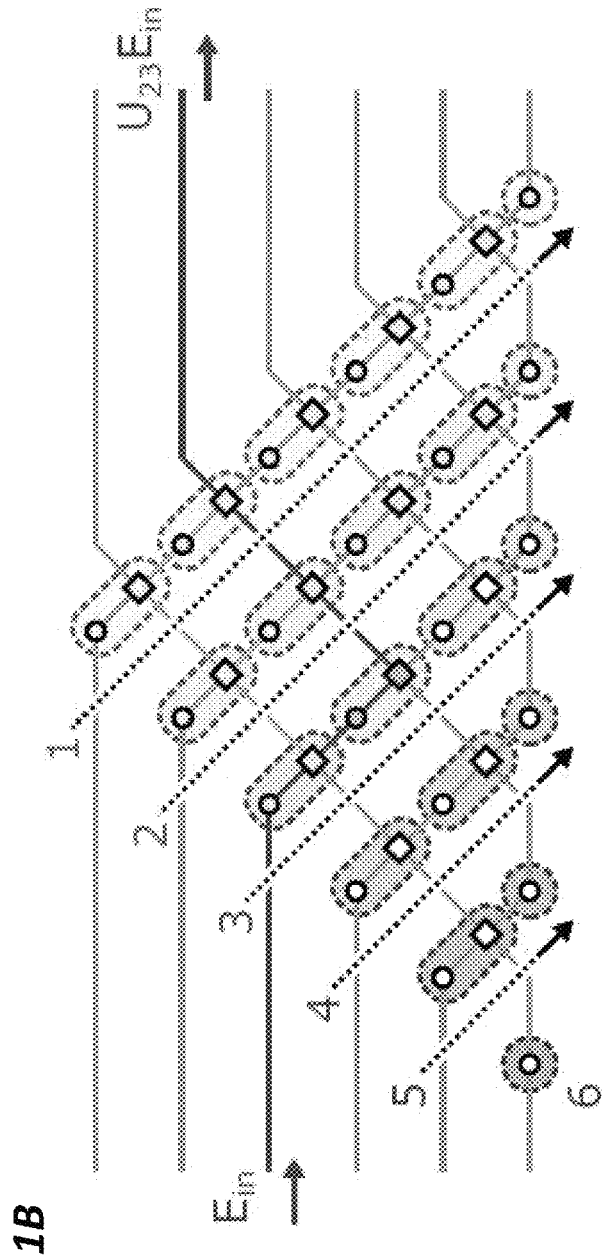
FIG. 11B illustrates a direct method of programming a Reck triangle, which involves starting at the top diagonal and working down, applying the process in FIG. 11A to each diagonal.

FIG. 11B shows the direct self-configuration method for programming a Reck triangle, which can be divided into N diagonals, each functioning as a tunable one-to-many splitter, with the output of each diagonal fed into the inputs of its upper-right neighbor. The triangle is configured from the top diagonal to the bottom, working down each diagonal. Each MZI element $(\theta_{mn}, \phi_{mn})$ (the $n^{th}$ element of the $m^{th}$ diagonal, starting from the top) is configured to set the matrix element $\hat{U}_{nm}$ between output n and input m. In this way, the lower diagonal of U is correctly configured—which, given the unitarity of $\hat{U}$, correctly configures the entire matrix.

This direct self-configuration process works for triangular matrices. Triangularity guarantees that tuning steps do not disturb the matrix elements that have already been set, provided that the order above is followed. To apply the direct self-configuration to a Clements matrix, the Clements matrix can be divided into two triangles, which can be separately configured as explained below.

2.9. Ratio Self-Configuration Process

The ratio self-configuration process, also called the ratio method or process, is based on setting power ratios and can be applied to Reck and Clements meshes. Like the direct self-configuration process, it can be run on uncalibrated hardware with only external detectors. The ratio method is robust in the presence of large errors, which makes it especially useful for configuring large multiport interferometers.

FIG. 12A illustrates the ratio self-configuration process in the case of a 1:N splitter. In this case, the splitter phases are configured in reverse order to set the power ratios (and relative phases) of the outputs. As before, let $\vec{u}$ be the target vector and $\vec{u}$ be the output of the physical splitter. The configuration steps are as follows:

Step 1: Set splitter angle θ to match the power ratio $|u_{N-1}/u_N|=|\hat{u}_{N-1}/\hat{u}_N|$. Next, set phase shift ϕ to match the relative phase $\arg(u_{N-1}/u_N)=\arg(\hat{u}_{N-1}/\hat{u}_N)$ between the last two outputs.

Intermediate Steps: Here, we configure the phase shifts corresponding to the $n^{th}$ output, 1≤n<N. These are set to align the partial output vectors: $\vec{u}_{n:N} \| \hat{u}_{n:N}$ (here $\hat{a}_{n:N}=[a_n, \ldots, a_N]$ denotes the slice of a vector â over a given index set, the darker outputs in FIG. 12A. The splitter angle θ is set to match the power ratios $P_n/(P_{n+1}+ \ldots +P_N)$, while the phase shift is used to compensate any relative phases. Overall, this corresponds to increasing or maximizing the inner product $$\max_{\theta,\phi} |\langle \vec{u}_{n:N}|\hat{u}_{n:N}\rangle|.$$

Without errors, this is equivalent to matching the amplitude and phase of $u_n/u_{n+1}$ as all downstream ratios have already been configured; however, using all the outputs in the configuration is more robust to errors (especially when $u_{n+1}$ is small).

Step N: Set the final phase shift to align the phase of $\vec{u}$ with $\hat{u}$.

The Reck triangle is configured one diagonal at a time in the order shown in FIG. 12B. Here, each MZI (m, n) is indexed according to its diagonal (m) and position relative to the triangle base (n). When configuring an MZI along the $m^{th}$ diagonal, light enters port m so that only the top port of the MZI is excited. All MZIs downstream from (m, n) have been tuned, while upstream MZIs are untuned, and a space-like separator $S_{mn}$ divides the configured and unconfigured parts of the mesh. We can write the unitary of this circuit as $U=U_{post}TU_{pre}$, where $T=[[T_{11}, T_{12}], [T_{21}, T_{22}]]$ is the MZI transfer function, which depends on the phases $(\theta_{mn},\phi_{mn})$. FIG. 12C shows that the output field is a sum of three contributions:

1. Light that bypasses the MZI (m, n). At surface $S_{mn}$, this is denoted by $\vec{\alpha}$, and at the output it is $\vec{a}=U_{post}\vec{\alpha}$.
2. Light that enters (m, n) and leaves through its top port. The input light has an unknown amplitude s $e^{i\psi}$ ($\psi$ set by the upstream phase shifter), but only relative amplitudes matter when configuring (m, n). The output to the top port is s $e^{i\psi}T_{11}$. At surface $S_{mn}$, the field is denoted by the vector s $e^{i\psi}T_{11}\vec{\beta}$, where $\vec{\beta}=\hat{e}_{N-n}$ is the one-hot vector for waveguide (N–n) (the top output of (m, n)). Thus, the output field is s $e^{i\psi}T_{11}\hat{b}$, where $\hat{b}=U_{post}\vec{\beta}$.
3. Light that enters (m, n) and leaves through the bottom port. Analogous to the top port, we have s $e^{i\psi}T_{21}\vec{\gamma}$ at $S_{mn}$ ($\vec{\gamma}=\hat{e}_{N-n+1}$), and s $e^{i\psi}T_{21}\vec{c}$ at the output ($\vec{c}=U_{post}\vec{\gamma}$).

Summing these terms, the output from port m is:

$$\vec{u}_m = \vec{a} + s\, e^{i\psi}(T_{11}\vec{b}+T_{21}\vec{c})$$

The goal of the ratio self-configuration method is to configure the MZI so that this output best approximates $\hat{u}_m$, the $m^{th}$ column of target matrix $\hat{U}$. This is done by minimizing the $L_2$ norm $\|\vec{u}_m - \hat{u}_m\|$. Since T and $U_{post}$ are unitary, then $\vec{a} \perp \vec{b} \perp \vec{c}$ and $|T_{11}|^2+|T_{21}|^2=1$. Applying these relations yields:

$$\|\vec{u}_m - \hat{u}_m\|^2 = \underbrace{\|\hat{u}_m - \vec{a}\|^2 + |s|^2}_{const} - 2\,\mathrm{Re}\left[se^{i\psi}\left(T_{11}\langle\hat{u}_m|\vec{b}\rangle + T_{21}\langle\hat{u}_m|\vec{c}\rangle\right)\right]$$

The first two terms drop out as constants since they do not depend on the optimization variables $\theta_{mn},\phi_{mn}$ (which determine $(T_{11}, T_{21})$). Since each MZI is preceded by a phase shifter, the phase of $\psi$ is also freely tunable; it can be helpful to perform the following maximization:

$$\max_{\theta,\phi}\max_\psi \mathrm{Re}[s\,e^{i\psi}(T_{11}\langle\hat{u}_m|\vec{b}\rangle+T_{21}\langle\hat{u}_m|\vec{c}\rangle)]$$

$$\propto \max_{\theta,\phi}|T_{11}\langle\hat{u}_m|\vec{b}\rangle+T_{21}\langle\hat{u}_m|\vec{c}\rangle|$$

subject to the constraint $|T_{11}|^2+|T_{21}|^2=1$. This is just optimizing a dot product, which amounts to setting the amplitude ratio:

$$\frac{T_{11}}{T_{21}} = \frac{\langle\vec{b}|\hat{u}_m\rangle}{\langle\vec{c}|\hat{u}_m\rangle}$$

We may not be able to measure $T_{11}$, $T_{21}$, $\vec{b}$, or $\vec{c}$ directly in an experiment. Instead, we proceed as follows: first sweep the value of $\psi$ to obtain $\vec{a}$, which is the value of $u_i$ averaged over opposite phases $\psi$:

$$\vec{a} = \frac{\vec{u}_m(\psi=0) + \vec{u}_m(\psi=\pi)}{2} = \frac{1}{2\pi}\int \vec{u}_m(\psi)d\psi$$

Next, once $\vec{a}$ is found, set $(\theta,\phi)$ to maximize the quantity:

$$\max_{\theta,\phi}|\,\hat{u}_m|\vec{u}_m(\theta,\phi) - \vec{a}\rangle\,|$$

which is independent of $\psi$, but relies only on external output measurements. This can be done because we are measuring the output $\hat{u}_m(\theta,\phi)$ and have knowledge of $\hat{a}$ and the target vector $\hat{u}_m$, so can be implemented in a control loop that varies $(\theta,\phi)$ until the quantity is maximized.

This method of self-configuring, self-calibrating, and/or error correction multiport interferometers based on power ratios works without any internal detectors or knowledge of the component imperfections. This ratio self-configuration method, or ratio method, is applicable to any triangular mesh, but can be extended to rectangular meshes by adding a single diagonal of drop ports, a small amount of additional complexity as the mesh size grows large. The accuracy of this method is guaranteed by the algorithmic stability of unitary matrix diagonalization and follows the asymptotic form $\varepsilon_{corr} \propto N\sigma^2$ over the Haar measure with independent Gaussian component errors as explained below. Employing this ratio self-configuration method suppresses matrix errors by a quadratic factor: $\varepsilon_{corr}=\varepsilon^2/\sqrt{6}$, allowing MZI meshes to scale to large sizes (e.g., N>64) without unreasonable demands on fabrication tolerance.

2.10. Direct Versus Ratio Self-Configuration Performance Comparison

To compare the direct and ratio self-configuration processes, we simulate the self-calibration of Reck meshes in the presence of component errors. Here, the target unitaries $\hat{U}$ are sampled from the Haar measure, with random, Gaussian-distributed errors in the beam splitter angles. We consider mesh sizes in the range $8 \leq N \leq 64$ to analyze the scaling of the algorithms with mesh size. Error correction should allow perfect configuration when errors are low enough (coverage is order unity), and an error reduction of $\varepsilon_{corr} \propto \varepsilon^2$ in the uncorrectable case.

Figure 13A:
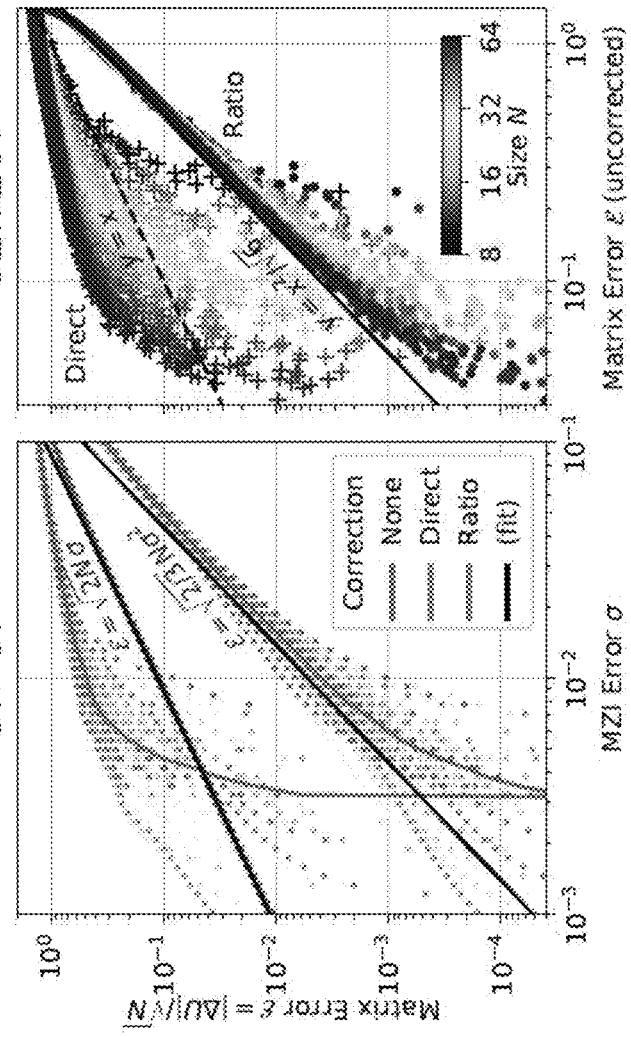
FIG. 13A is a plot of matrix error $\varepsilon$ vs. MZI error $\sigma$ for a Reck/triangular mesh of N=64 MZIs (dots represent individual instances; the line traces the median).

FIG. 13A shows the scaling of error metric $\varepsilon$ with $\sigma$ for a 64×64 Reck mesh. As expected, the uncorrected error increases linearly with $\sigma$. For sufficiently small $\sigma$, the corrected error diverges to zero for both methods. However, the direct self-configuration method suffers a hard performance cutoff around $\sigma=0.005$. For realistic $\sigma \geq 0.01$, the direct self-configuration method actually performs worse than no correction at all! In contrast, the ratio self-configuration method performs well at both small and large $\sigma$. Above the cutoff, it roughly follows the trend $\varepsilon=\sqrt{2/3}N\sigma^2$. Again, the ratio self-configuration method requires no prior knowledge of the MZI imperfections and can be configured using only output detectors.

Combining the two fits in FIG. 13A yields the following expression:

$$\varepsilon_{corr}=\varepsilon^2/\sqrt{6}$$

Figure 13B:
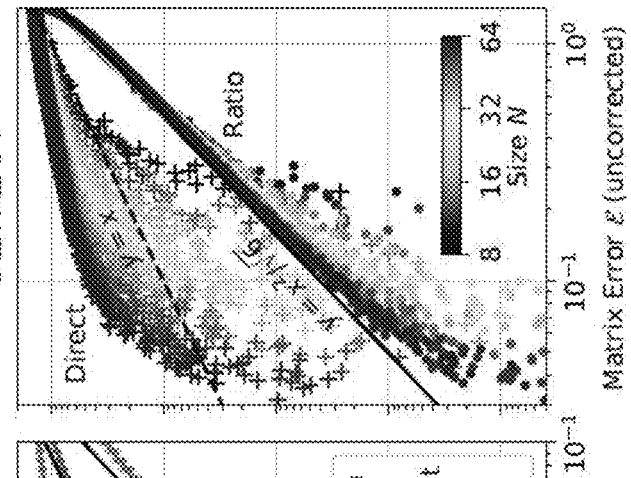
FIG. 13B is a plot of uncorrected vs. corrected error for a Reck mesh with 8≤N≤64 MZIs.

This relation is independent of N, and can be used to test the scaling of the algorithms as the matrix dimension increases. FIG. 13B plots $\varepsilon_{corr}$ against $\varepsilon$ for $8 \leq N \leq 64$. There is a sharp drop for both schemes corresponding to perfect correction, but the threshold for such perfect correction decreases with N. This is a serious challenge for the direct self-configuration method, since $\varepsilon_{corr} > \varepsilon$ in the imperfect correction regime. On the contrary, the ratio self-configuration method shows an improvement for the whole range of N, with the data asymptoting, suggesting that the approach is scalable.

Figure 13C:
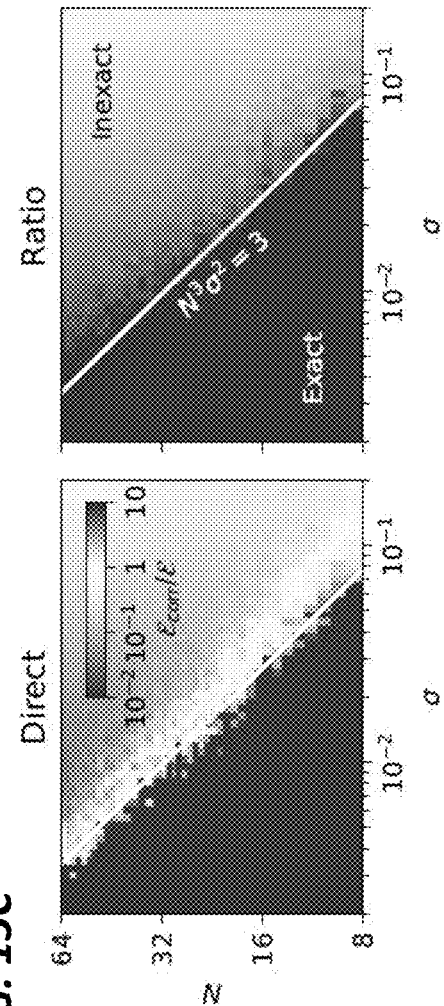
FIG. 13C is a plot of the correction factor $\varepsilon_{corr}/\varepsilon$ as a function of $\sigma$ and N, for the direct and ratio self-configuration methods (left and right, respectively).

FIG. 13C plots the same data in (N,σ) space. For both the direct and ratio methods (left and right, respectively), there is a transition when the coverage of the mesh drops below unity. Since $\text{cov}(N) \sim e^{-N^3\sigma^2/3}$, this transition occurs roughly at $N^3\sigma^2=3$ (white curve). Both methods work in the exact regime, but only the ratio method is successful when errors are large enough that U cannot be represented exactly.

Figure 14:
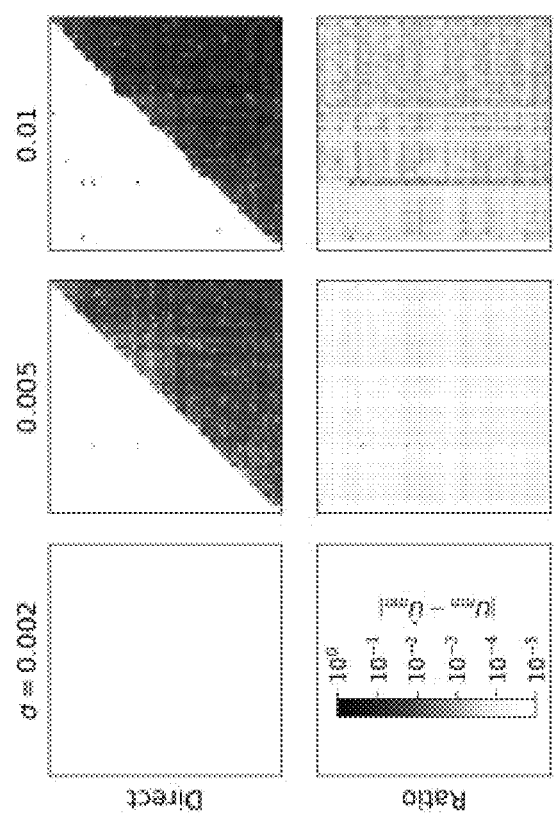
FIG. 14 is a plot of matrix element errors $|U_{mn} - \hat{U}_{mn}|$ for a 64×64 Reck mesh as a function of MZI error $\sigma$ and calibration method.

FIG. 14 shows the structure of the error matrix $|U-\hat{U}|$ that sheds light on why direct method performs poorly in the uncorrectable error regime. The direct method only guarantees $U_{mn}=\hat{U}_{mn}$ for the upper-left triangle of entries m+n<N. If these are exactly satisfied, the matrices will be equal. However, even small errors are pushed to the lower-right triangle, where they cascade as the mesh is configured column by column. This instability leads, in general, to a matrix that is only well configured for at most half of its entries.

Figure 15:
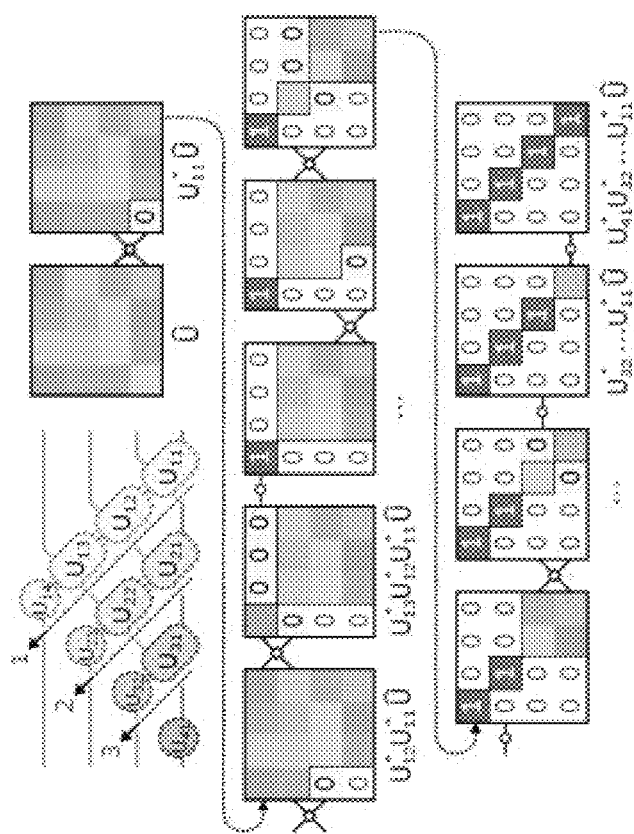
FIG. 15 illustrates how configuration of MZI mesh corresponds to diagonalizing a unitary matrix with 2×2 blocks.

When following the ratio method, errors do not build up. To understand the stability of the ratio method, it is helpful to relate the method to the 2×2 block decomposition of a unitary matrix as shown in FIG. 15. Given a target matrix $\hat{U}$, we wish to find 2×2 blocks $U_{mn}$ such that $U_{N1}^\dagger \ldots U_{12}^\dagger U_{11}^\dagger \hat{U}=I$. We start by configuring block $U_{11}$, which mixes the last two rows to zero out the lower-right element of the matrix. Next, $U_{12}$ is configured to zero the element directly above. The procedure is repeated until all elements in the lower diagonal have been zeroed, at which point the matrix equals the identity.

Because of MZI errors, not all off-diagonal terms can be zeroed. If a term cannot be zeroed, it leaves a residual term $(\oplus\alpha_{mn}-\beta_{mn}|-\theta_{mn})$ below the diagonal, where $\theta_{mn}$ is the target splitting ratio for MZI (m, n), which is unrealizable since $|\alpha_{mn}-\beta_{mn}|>\theta_{mn}$. Let $V^{(mn)}=U_{mn}^\dagger \ldots U_{12}^\dagger U_{11}^\dagger \hat{U}$ be the matrix after configuring $U_{mn}$ and define $$\varepsilon_{mn} = \sum_{i=1}^{m-1}\sum_{j=i+1}^{N} |V_{ij}^{(mn)}|^2 + \sum_{j=N-n}^{N} |V_{mj}^{(mn)}|^2$$

which is the sum of squares of all elements $V_{ij}^{(mn)}$ in the zero region below the diagonal (lighter shading in FIG. 15). Each imperfect configuration step adds a new element to this region, incrementing $\varepsilon_{mn}$ by $(|\alpha_{mn}-\beta_{mn}|-\theta_{mn})^2$, the norm of the new element added. The existing matrix elements are mixed around, but the norm for them does not change because the mixing is unitary. Therefore, errors do not grow in the ratio method; they just get mixed into other matrix elements. This is a difference between the direct and ratio schemes. The final matrix will be close to the identity and therefore takes the form $V^{(N1)} \approx I+iH$ for some Hermitian H. Therefore, $\|U-\hat{U}\|^2 \approx 2\varepsilon_{N1}$, giving:

$$\varepsilon_{corr}^2 = \frac{2\langle\varepsilon_{N1}\rangle}{N}$$
$$= \frac{2}{N}\sum_{mn}\langle\max(|\alpha_{mn}-\beta_{mn}|-\theta_{mn},0)^2\rangle$$
$$= \frac{2N^2\sigma^4}{3}$$

which is the same result as for the local scheme disclosed in Saumil Bandyopadhyay, Ryan Hamerly, and Dirk Englund, "Hardware error correction for programmable photonics," *Optica* 8, 1247-1255 (2021).

2.11. Rectangular Mesh

Compared to the Reck triangle, the rectangular Clements mesh has advantages of increased compactness, reduced circuit depth, and relative insensitivity to fixed component losses. However, it cannot be written as a cascade of diagonals, so the direct and ratio self-configuration techniques cannot be used. However, a simple modification to a Clements mesh 1600—placing a diagonal of tunable drop ports and detectors 1602—suffices to make the mesh programmable as shown in FIG. 16A. The diagonal elements effectively split the mesh into two triangles, each which can be programmed independently.

First, following the Clements representation of an ideal MZI mesh, the target matrix is decomposed into two components $\hat{U}=\hat{U}_2\widehat{U_1}$ for the left and right triangles. Next, the diagonal ports are set to the "cross" state to collect all of the light along the diagonal. This allows the left triangle to be programmed to $\hat{U}_1$ as shown in FIG. 16B, achieved by a reciprocal form of the ratio method described below. Finally, the diagonal switches are used to isolate the inputs of the right triangle; this allows it to be programmed to $\hat{U}_2$ (up to an input phase) by the ratio method described above.

In the reciprocal form of the ratio method, instead of sending light into a single port and matching the output vector to a column of $\hat{U}$, we send in a column $u_m^*$ of $\hat{U}^\dagger$ as input and try to direct all the power to a single output. This is analogous to the Reverse Local Light Interference Method (RELLIM) but does not require internal detectors. The MZIs are programmed along falling diagonals, but the order is reversed (bottom to top, down each diagonal).

When configuring MZI (m, n), the upstream components have been configured, while downstream components have not. The input-output relation is the product $v=U_{post}TU_{pre}\hat{u}_m$, where $U_{pre}$ has been configured but $U_{post}$ has not. FIG. 16C shows that the light at output m can take one of three paths: (1) bypassing the MZI, (2) entering the top port of the MZI, or (3) entering the bottom port of the MZI, leading to a sum:

$$v_m = a+s\, e^{i\psi}(T_{21}\beta+T_{22}\gamma)$$

The MZI should be configured to direct its output power to the bottom port $(T_{21}/T_{22}=(\beta/\gamma)^*)$. In RELLIM, this is accomplished with the use of internal detectors. However, external detectors can also be used, even if the downstream MZIs have not been calibrated to a "cross" state. As above, first the phase is swept and the value of a is extracted from the average:

$$a = \frac{v_m(\psi=0)+v_m(\psi=\pi)}{2} = \frac{1}{2\pi}\int v_m(\psi)d\psi$$

Next, the phases of the MZI are set to maximize:

$$\max_{\theta,\phi}|v_m-a|$$

Figure 17A:
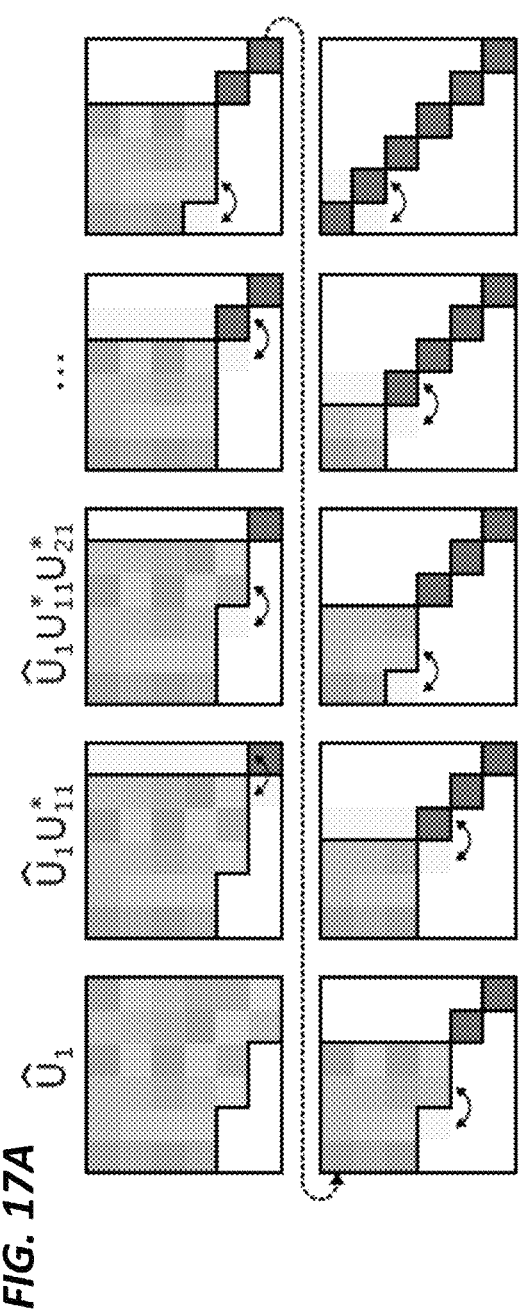
FIG. 17A illustrates using the reciprocal ratio method to zero matrix elements when configuring the upper-left triangular mesh in FIG. 16B to match $\hat{U}_1$.
Figure 17B:
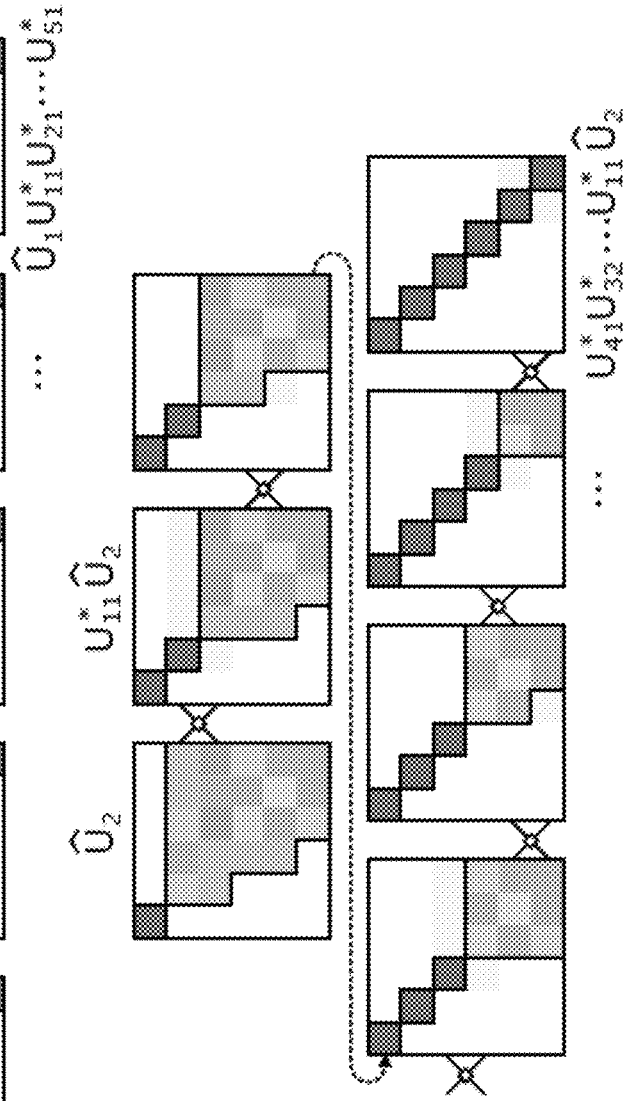
FIG. 17B illustrates using the ratio method to zero matrix elements when configuring the lower-right triangular mesh in FIG. 16B to match $\hat{U}_2$.

Like the Reck mesh self-configuration scheme, this configuration method is resistant to errors by visualizing how each configuration step zeroes out entries in the target matrix. Each matrix has $\approx \frac{3}{4}\, N^2$ free entries and $\approx \frac{1}{4}\, N^2$ zeroes below the diagonal. Each mesh is self-configured to eliminate the remaining nonzero elements in the lower triangle, which takes $\approx \frac{1}{4}\, N^2$ steps, half the number of steps as the Reck triangle. FIG. 17A shows each step in the reciprocal ratio method, in which the target matrix is right-multiplied by a 2×2 block to zero out a matrix entry; after $\approx \frac{1}{4}\, N^2$ steps, the upper triangle of FIG. 16B is configured and $\hat{U}_1$ has been diagonalized. Likewise, FIG. 17B shows that in the ratio method configures the lower triangle and diagonalizes $\hat{U}_2$. The remaining phase shifts along the diagonal can be set by inspection.

Figure 18A:
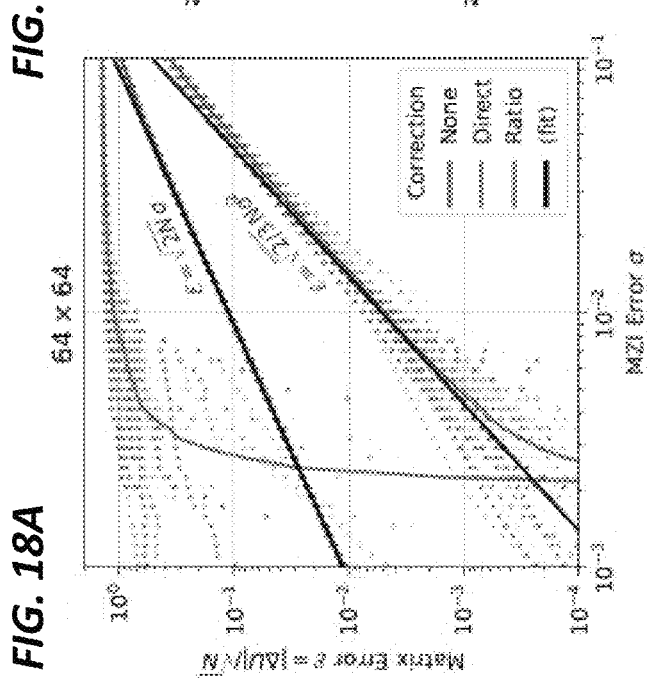
FIG. 18A is a plot of the matrix error versus MZI error for a self-configured 64×64 Clements mesh.
Figure 18B:
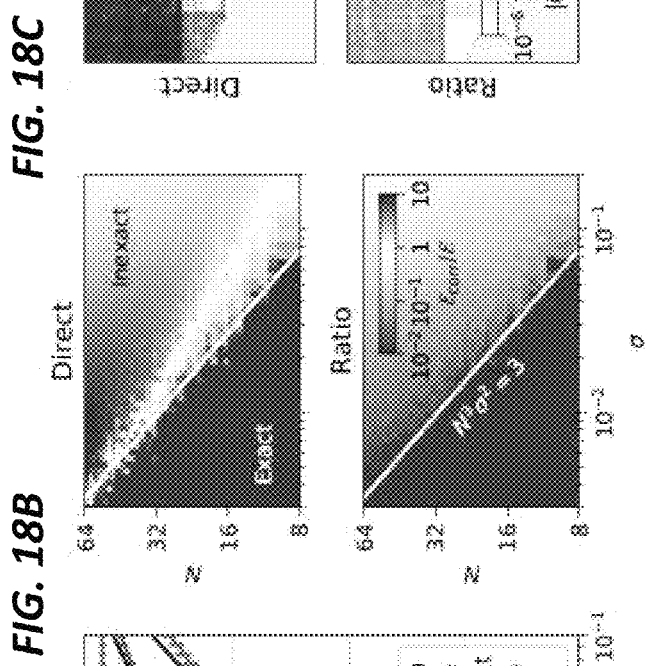
FIG. 18B is a plot of the ratio of the correction factor for a self-configured 64×64 Clements mesh.
Figure 18C:
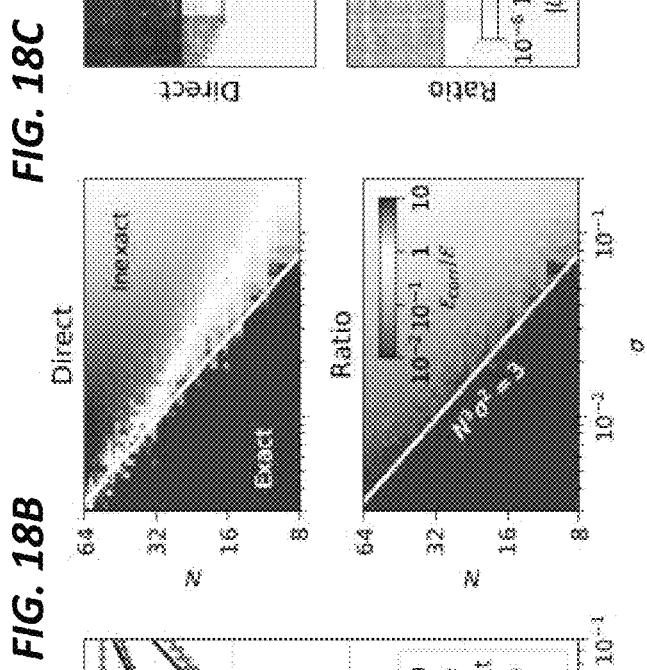
FIG. 18C is a plot of the matrix element errors for $\hat{U}_1$ and $\hat{U}_2$ employing the direct (top row) and ratio (bottom row) methods of self-configuring a 64×64 Clements mesh.

FIGS. 18A-18C shows plots of the accuracy of meshes self-configured using the ratio and direct methods. FIG. 18A shows that the ratio method successfully corrects MZI errors and follows the same relation $\varepsilon = \sqrt{2/3}\, N\sigma^2$ observed for the RECK triangle. The direct method can also be used to configure the sub-triangles in FIG. 16B but shows poor performance in the large-$\sigma$ regime where MZI errors cannot be exactly corrected. FIG. 18B shows that the boundary between the exact and inexact correction regime is the same owing to the fact that the MZI splitting angles in Reck and Clements meshes have the same statistics over the Haar measure. FIG. 18C shows the matrix imperfections, which can cascade of errors in the direct method (top row), which cause certain parts of the matrix to be well-configured while other parts are not. This cascading effect is avoided in the ratio method for the same reasons applicable to the Reck mesh.

2.12. Correlated Errors

Above, we assumed an uncorrelated error model, where $\alpha_n$ and $\beta_n$ are independent random variables sampled from a zero-mean Gaussian with standard deviation $\sigma$. In practice, the fabrication imperfections that lead to splitter errors have a long correlation length, so errors tend to be strongly correlated. In this section, we show that: (1) averaged over the Haar measure, inter-MZI correlations cancel out, so only correlations within each MZI (i.e., between $\alpha_n$ and $\beta_n$) affect the result; and (2) for most unitaries, the effect of the symmetric error $\alpha_n + \beta_n$ is dominant.

The first-order error metric given above can be expanded to second order, accounting for all correlations:

$$\varepsilon^2 = \frac{1}{N}\sum_{mn}\left(\left\langle\frac{\partial U}{\partial \alpha_m}\bigg|\frac{\partial U}{\partial \alpha_n}\right\rangle\langle\alpha_m\alpha_n\rangle + \right.$$

$$\left.\left\langle\frac{\partial U}{\partial \alpha_m}\bigg|\frac{\partial U}{\partial \beta_n}\right\rangle\langle\alpha_m\beta_n\rangle + \left\langle\frac{\partial U}{\partial \beta_m}\bigg|\frac{\partial U}{\partial \alpha_n}\right\rangle\langle\beta_m\alpha_n\rangle + \left\langle\frac{\partial U}{\partial \beta_m}\bigg|\frac{\partial U}{\partial \beta_n}\right\rangle\langle\beta_m\beta_n\rangle\right)$$

with the matrix inner product $\langle V|W\rangle = \text{tr}(V^\dagger W)$.

Figure 19A:
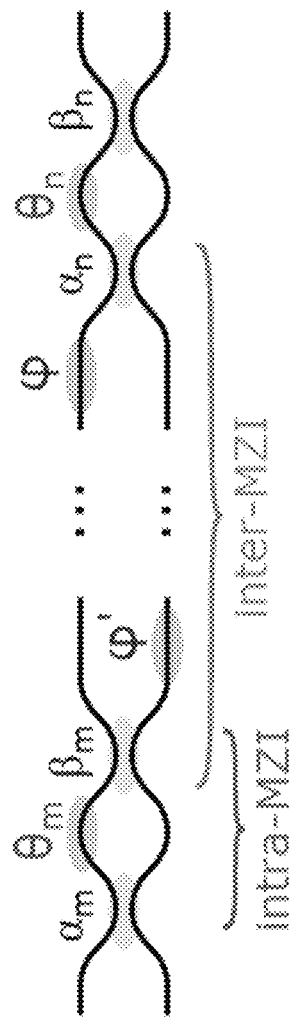
FIG. 19A illustrates intra- and inter-MZI beam splitter error correlations.

FIG. 19A shows that correlations can be classified into two types: intra-MZI and inter-MZI. Averaged over the Haar measure, inter-MZI correlations are zero or at least very small. Consider an arbitrary inter-MZI pair of splitters ($p \in \{\alpha_m, \beta_m\}$, $q \in \{\alpha_n, \beta_n\}$). The unitary takes the form:

$$U = \quad (37)$$

$$U_{post}S\left(\frac{\pi}{4}+q\right)U_q\begin{bmatrix}e^{i\phi} & 0 \\ 0 & 1\end{bmatrix}U_{int}\begin{bmatrix}1 & 0 \\ 0 & e^{i\phi'}\end{bmatrix}U_p S\left(\frac{\pi}{4}+p\right)U_{pre} + P(p) + Q(q)$$

where S is the symmetric splitter matrix:

$$S(\psi) = e^{i\psi\sigma_x} = \begin{Bmatrix}\cos\psi & i\sin\psi \\ i\sin\psi & \cos\psi\end{Bmatrix}$$

$$S'(\psi) = iS(\psi)\sigma_x = i\sigma_x S(\psi)$$

and $\sigma_x = [[0,1],[1,0]]$ is the Pauli matrix.

The terms P(p) and Q (q) above correspond to paths of light that pass through at most one splitter. These are mutually orthogonal and do not contribute to the correlation in the second-order error metric. Error correlations arise only from the first term, corresponding to paths of light that pass through both splitters p and q. The resulting inner product is independent of $U_{pre}$ and $U_{post}$ and takes the form (at p=q=0):

$$\left\langle\frac{\partial U}{\partial p}\bigg|\frac{\partial U}{\partial q}\right\rangle = \left\langle S\left(\frac{\pi}{4}\right)U_q\begin{bmatrix}e^{i\phi} & 0 \\ 0 & 1\end{bmatrix}U_{int}\begin{bmatrix}1 & 0 \\ 0 & e^{i\phi'}\end{bmatrix}U_p S\left(\frac{\pi}{4}\right)\sigma_x \right.$$

$$\left. \sigma_x S\left(\frac{\pi}{4}\right)U_q\begin{bmatrix}e^{i\phi} & 0 \\ 0 & 1\end{bmatrix}U_{int}\begin{bmatrix}1 & 0 \\ 0 & e^{i\phi'}\end{bmatrix}U_p S\left(\frac{\pi}{4}\right)\right\rangle$$

In general, this quantity is nonzero. However, the phases $(\phi,\phi')$ are uniformly distributed over $[0,2\pi)$ for Haar-random unitaries. Therefore, in the ensemble average over the Haar measure, the phase-dependent terms in the inner product cancel out. This means that each path from splitter p to q, which has a separate phase dependence, can be considered separately in the inner product. Consider the path from output $i \in \{1,2\}$ to input $j \in \{1,2\}$ (i=j=1 shown in FIG. 19B). Focusing on a single path, we can ignore $(\phi,\phi')$ and replace $U_{int} \to \vec{e}_j\vec{e}_i^T$:

$$\left\langle\frac{\partial U}{\partial p}\bigg|\frac{\partial U}{\partial q}\right\rangle_{ij} \propto \left\langle S\left(\frac{\pi}{4}\right)U_q\hat{e}_j\hat{e}_i^T U_p S\left(\frac{\pi}{4}\right)\sigma_x \bigg\| \sigma_x S\left(\frac{\pi}{4}\right)U_q\hat{e}_j\hat{e}_i^T U_p S\left(\frac{\pi}{4}\right)\right\rangle =$$

$$\left(\hat{e}_j^T U_q^\dagger \sigma U_q \hat{e}_j\right)\left(\hat{e}_i^T U_p \sigma U_p^\dagger \hat{e}_i\right)$$

Figure 19B:
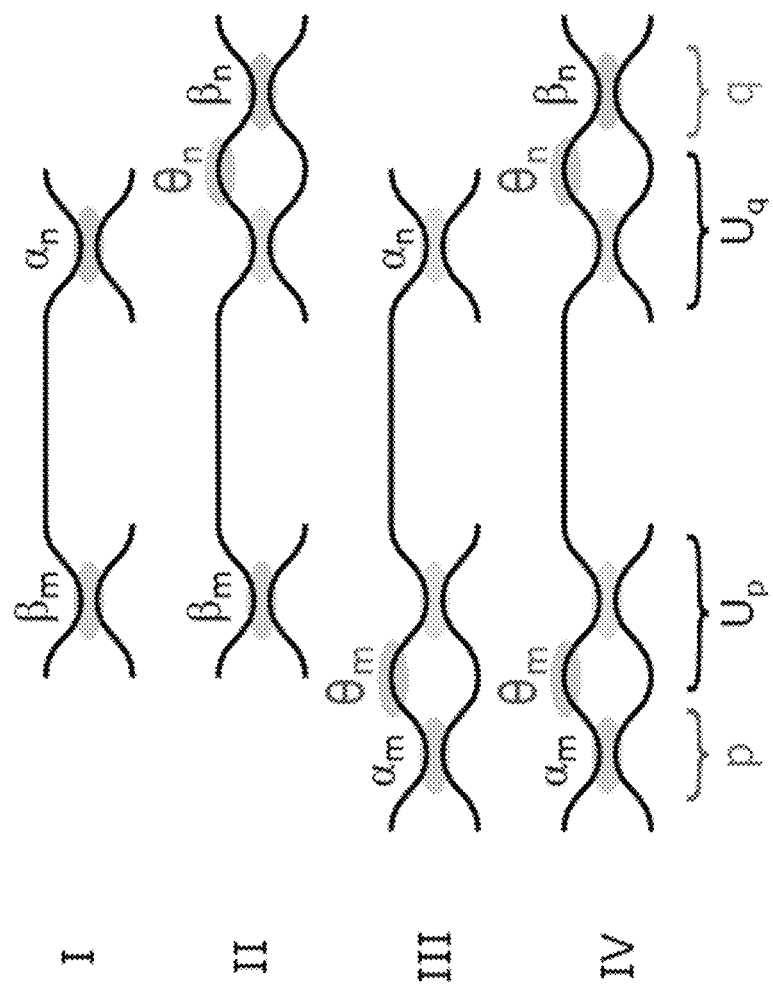
FIG. 19B shows four inter-MZI correlation types.

FIG. 19B shows that there are four cases to be considered. If p is directly adjacent to the connecting path (cases I-II), then $U_p$ is the identity and $\hat{e}_i^T U_p \sigma U_p^\dagger \hat{e}_i = \vec{e}_i^T \sigma \hat{e}_i = 0$. Likewise, if q is adjacent to the path (cases I and III), $\hat{e}_j^T U_q^\dagger \sigma U_q \hat{e}_j = 0$. Only in case IV yields a nontrivial inner product:

$$\left\langle\frac{\partial U}{\partial p}\bigg|\frac{\partial U}{\partial q}\right\rangle_{ij} \propto \sin(\theta_m)\sin(\theta_n)$$

This is very small for the majority of MZIs, where the splitter angles $(\theta_m, \theta_n)$ cluster tightly around zero. Moreover, while it is always possible to find a matrix decomposition with only positive $\theta$, one can also sample from the Haar measure employing both positive and negative $\theta$ with equal probability; in this case, under the ensemble average, the inter-MZI correlations are zero.

On the other hand, correlations within an MZI, i.e., between $\alpha_n$ and $\beta_n$, matter. The matrix error of a single MZI is:

$$\|\Delta U\|^2 = 2\left[\langle\alpha_n^2\rangle + \langle\beta_n^2\rangle + 2\cos(\theta_n)\langle\alpha_n\beta_n\rangle\right]$$

$$= 2\left[\cos^2(\theta_n/2)\langle(\alpha_n+\beta_n)^2\rangle\right.$$

$$\left.+\sin^2(\theta_n/2)\langle(\alpha_n-\beta_n)^2\rangle\right]$$

For the majority of MZIs, $\theta_n \approx 0$ and the symmetric error dominates $\|\Delta U\|^2$. The normalized error for the whole mesh is approximately:

$$\varepsilon \approx \sqrt{N}\langle(\alpha+\beta)\rangle_{rms}$$

which in the case of uncorrelated $(\alpha, \beta)$ reduces to the form derived above: $\varepsilon = \sqrt{2N}\sigma$.

For completeness, we now consider the case of fully correlated splitter errors, i.e., $\alpha_n = \beta_n = \mu$, where $\mu$ is a constant. Systematic effects such as imperfect coupler design or fabrication errors with long correlation length can lead to this situation, as can operating the mesh away from the coupler design wavelength. The uncorrected error amplitude is:

$$\varepsilon = 2\sqrt{N}\mu$$

The coverage of unitary space is:

$$\text{cov}(N) = e^{-(2/3)N^3\mu^2}$$

In the presence of error correction, the matrix error becomes:

$$\varepsilon_{corr} = \sqrt{8/9}\, N\mu^2 = \frac{1}{\sqrt{18}}\varepsilon^2$$

Figures 20A, 20B:
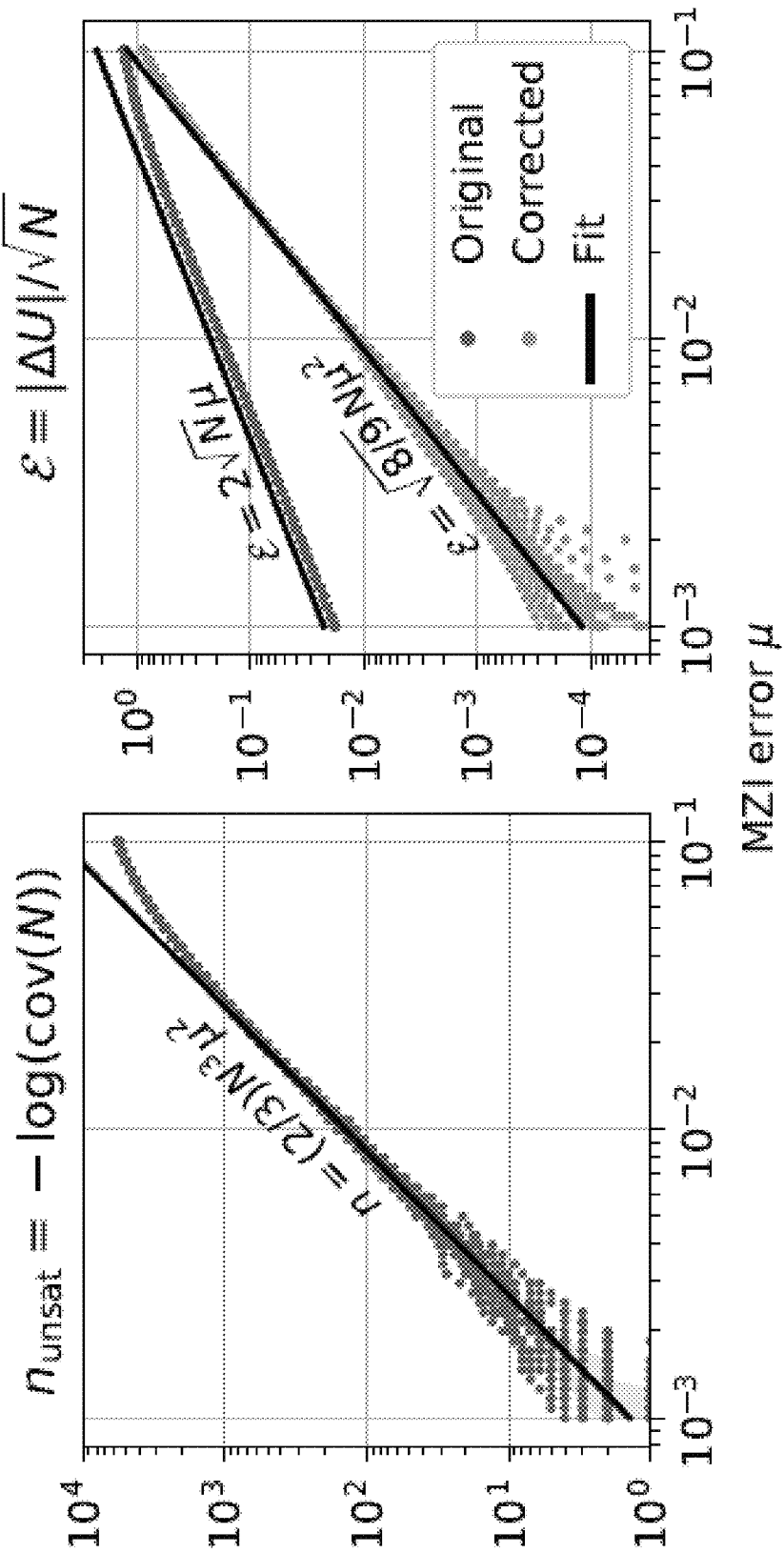
FIG. 20A is a plot of unsatisfied MZI fraction as a function of splitter error pt.
FIG. 20B is a plot of matrix error E as a function of splitter error pt.

FIG. 20 shows the uncorrected error amplitude, coverage of unitary space, and matrix error in the presence of error correction plotted against numerical data. The theory slightly overestimates the uncorrected error, possibly due to small residual correlations in the inner product, while the estimates for the coverage and corrected error are very accurate.

3. Infinitely Scalable Multiport Interferometers

Two modified mesh architectures can address the component errors that limit the scaling of multiport interferometers based on MZI meshes: (1) a three-splitter MZI for generic errors, and (2) a broadband MZI+Crossing design for correlated errors. Because these designs allow for perfect realization of the cross state, the matrix fidelity is rendered independent of mesh size, allowing scaling to arbitrarily large meshes. These architectures support progressive self-configuration, are more compact than other MZI-doubling schemes, and do not require additional phase shifters. This eliminates a major obstacle to the development of very-large-scale linear photonic circuits.

3.1. Alternative Mesh Architectures to Overcome Scaling Limitations

Figures 21A, 21B, 21C, 21D, 21E:
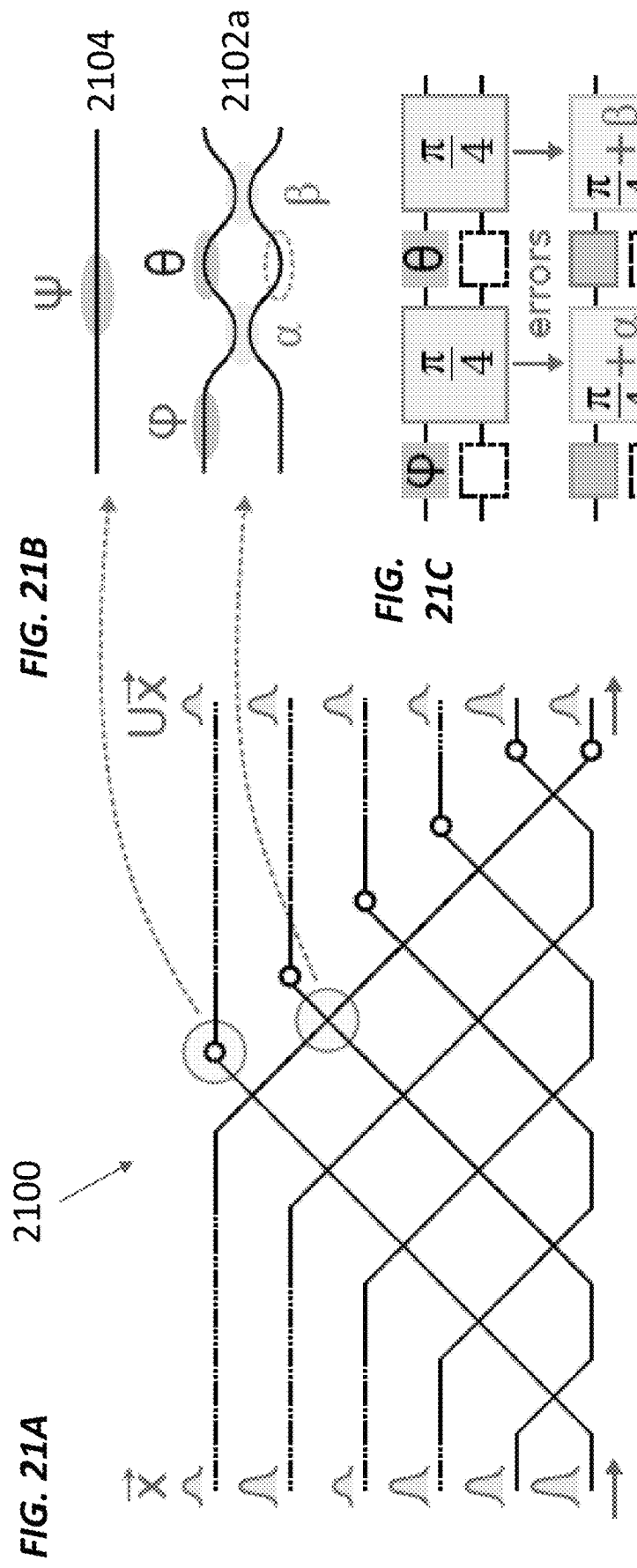
FIG. 21A shows a 6×6 triangular mesh composed of a phase screen and tunable MZI crossings θ, φ.
FIG. 21B shows a phase screen and MZI crossing from the triangular mesh in FIG. 21A.
FIG. 21C shows how fabrication imperfections lead to splitting-ratio errors α, β in the MZI crossing.
FIG. 21D illustrates a three-splitter MZI suitable for use in a mesh (multiport interferometer).
FIG. 21E illustrates design of an MZI+Crossing suitable for use in a mesh (multiport interferometer).

FIG. 21A shows a universal multiport interferometer 2100 that functions as an N×N programmable linear circuit. FIG. 21B shows the MZIs 2102 and phase shifters 2104 (e.g., thermos-optic, electro-optic, or MEMS phase shifters) that make up the circuit. These devices can be integrated with waveguides into a common substrate as described above with respect to FIGS. 1A-1C. This interferometer 2100, usually constructed from a dense mesh of MZIs 2102, is widely employed in applications ranging from spatially multiplexed optical communications to machine learning and quantum computing.

FIG. 21C illustrate component errors that limit the size of the interferometer 2100. Since the circuit depth of MZI meshes scales as O(N), the effect of errors grows with mesh size, meaning that, in practice, it may be challenging to program even modestly sized circuits to high accuracy. For conventional MZI meshes, correction reduces errors by a quadratic factor; however, the effect of errors still grows with mesh size and poses a fundamental limit to the scaling of these circuits.

Alternative mesh architectures may overcome this scaling limitation. Non-compact structures such as binary trees avoid the extreme splitting-ratio requirements but occupy large chip areas and have many crossings. A complementary approach is to stick to conventional mesh geometries but insert redundant MZIs to realize the full range of splitting ratios even in imperfect hardware. This solves the scaling problem, but at the cost of a 1.5-2× increase in the number of MZIs and phase shifters. The resulting effect on chip area and pad count makes this option unappealing.

FIGS. 21D and 21E show two mesh architectures that can achieve perfect scaling without significant added complexity. FIG. 21D shows a 3-splitter MZI 2102' that corrects all hardware errors. The 3-splitter MZI 2102' includes three concatenated 2×2 beam splitters, with nominal 50:50 splitting ratios and errors of $\gamma$, $\alpha$, and $\beta$, in series. The beam splitters are formed by waveguides that come close enough to each other for light to couple evanescently between them. The outputs of the first beam splitter are coupled to the inputs of the second beam splitter, and the outputs of the second beam splitter are coupled to the inputs of the third beam splitter. The 3-splitter MZI 2102' also includes two phase shifters: a first phase shifter that implements a variable phase shift $\varphi$ in light propagating from an output of the first beam splitter to an input of the second beam splitter, and a second phase shifter that implements a variable phase shift $\theta$ in light propagating from an output of the second beam splitter to an input of the third beam splitter.

FIG. 21E shows an MZI+Crossing (MZI+X) design 2102" that corrects correlated errors and has the added advantage of broader bandwidth. It includes a crossing of two waveguides (indicated by a dot) in series with a pair of beam splitters arranged in a Mach-Zehnder interferometer. Unlike a multimode interference (MMI) or beam splitter, the crossing of the two waveguides is extremely robust to fabrication imperfections. The waveguides cross couple to the inputs of the first beam splitter; the outputs of the first beam splitter are coupled to the inputs of the second beam splitter. Like the 3-splitter MZI 2102', the MZI+Crossing 210" includes two phase shifters: a first phase shifter that implements a variable phase shift $\varphi$ in light propagating to an input of the first beam splitter, and a second phase shifter that implements a variable phase shift $\theta$ in light propagating from an output of the first beam splitter to an input of the second beam splitter.

Both the 3-splitter MZI 2102' and the MZI+Crossing 2102" take up significantly less chip area than the "perfect" redundant MZIs, and do not require additional phase shifters. Moreover, they support progressive self-configuration, allowing for error correction even when the hardware errors are unknown. This enables the development of freely scalable, broadband, and compact linear photonic circuits.

Splitting ratios can be visualized as points on the Riemann sphere, where hardware imperfections lead to forbidden regions around the poles (bar- and cross-state), where the probability density is at a maximum. To avoid this unfortunate coincidence, the architectures in FIGS. 21D and 21E "rotate" the Riemann sphere to move the forbidden regions away from this peak, so that a larger fraction of MZIs are perfectly realized. More specifically, the 3-splitter MZI 2102' in FIG. 21D can correct arbitrary errors by rotating the forbidden regions to the equator. The MZI+Crossing 2102" in FIG. 21E flips the poles of the Riemann sphere. Comparing the matrix fidelity of these architectures to the standard MZI demonstrate their scaling advantage.

3.2. Error Correction Formalism

Figures 22A, 22B, 22C:
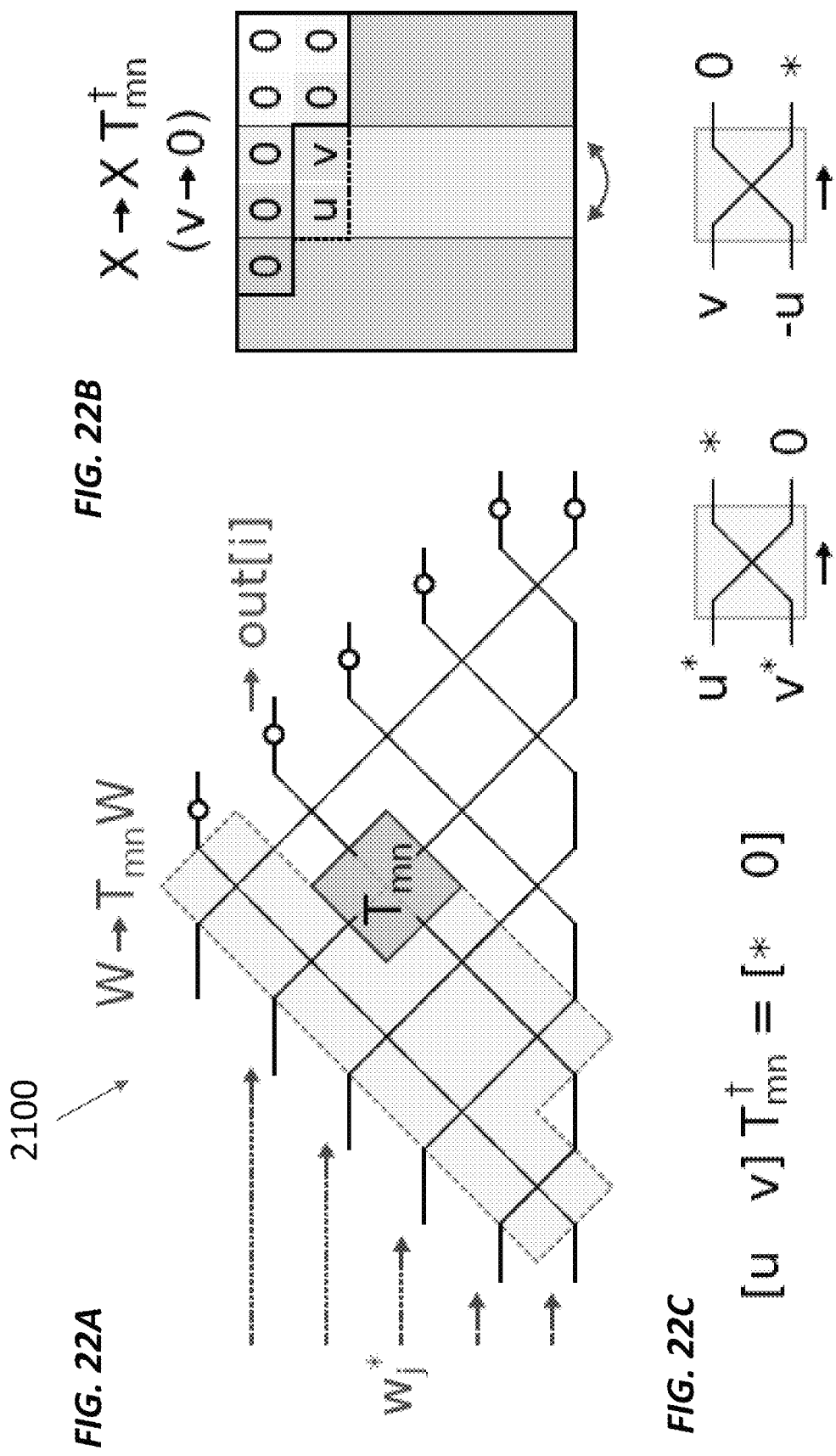
FIG. 22A illustrates configuring an MZI $T_{mn}$ updates matrix W as part of a Nulling method of self-configuration.
FIG. 22B illustrates a nulling update to $X=UW^\dagger$ corresponding to the configuration in FIG. 22A.
FIG. 22C illustrates zeroing an output of $T_{mn}$ given a fixed input.

FIG. 22A illustrates how to correctly configure the MZI mesh 2100 in the presence of errors using a nulling method based on physical measurements. The transfer matrix for this system is a product of a phase screen and a sequence of 2×2 unitaries:

$$U = D((T_{N-1,1}) \ldots (T_{2,N-2} \ldots T_{21})(T_{1,N-1} \ldots T_{11}))$$

where $T_{mn}$ is the $n^{th}$ MZI of the $m^{th}$ diagonal. We configure the mesh by building up matrix W in a sequence of steps designed to diagonalize a target matrix $X = UW^\dagger$. In each step, we add one crossing to W, performing the update $W \to T_{mn}W$, which right-multiplies the target matrix $X \to XT_{mn}^\dagger$ as shown in FIG. 22B. The phase shifts $(\theta, \phi)$ are chosen to zero a particular matrix element $v \to 0$, satisfying the equation (indices m, n suppressed for notational simplicity):

$$T^\dagger = [*0] \Leftrightarrow T_{11}/T_{12} = u/v$$

This is illustrated in FIG. 21C. Nulling physically corresponds to injecting $w_j^*$ (the $j^{th}$ column of $W^\dagger$) and zeroing the power at the $i^{th}$ output. If all nulling steps are performed exactly, the mesh should perfectly realize the target matrix U.

Mathematically, nulling corresponds to matching the complex splitting ratio $s \equiv T_{11}/T_{12} = -(T_{22}/T_{21})^*$ to a target value $\hat{s} \equiv u/v$. This is not always possible in practice, as the range of splitting ratios is constrained by hardware imperfections like those in FIG. 21C:

$$\tan|\alpha+\beta| \le |s| \le \cot|\alpha-\beta|$$

Here $\alpha, \beta$ are the splitting angle errors for the splitters in a standard MZI. These imperfections lead to forbidden regions, shown in FIG. 22A, for small and large s, where nulling cannot be achieved perfectly. FIG. 22B shows this chart on the Riemann sphere, where these forbidden regions are centered around the poles.

If nulling cannot be achieved perfectly, the "zero" region of matrix X is left with a residual of magnitude:

$$r = |T_{11}v - T_{12}u| = \sqrt{|u|^2 + |v|^2}\, \frac{d(s, \hat{s})}{2}$$

where $\hat{s}$ is the target splitting ratio, s is the closest physically realizable value, and $d(s, \hat{s})$ is the Euclidean distance on the Riemann sphere with stereographic projection $s = (x + iy)/(1 + z)$. As a fidelity metric, we consider the normalized matrix error $\varepsilon_c = \langle \|\Delta U\|_{rms} \rangle / \sqrt{N}$, which is approximately the quadrature sum of these residuals:

$$(\varepsilon_c)^2 = \frac{\langle \|\Delta U\|^2 \rangle}{N} = \frac{2}{N} \sum_{mn} \langle r_{mn}^2 \rangle$$

Here, $\langle \ldots \rangle$ refers to the ensemble average over Haar-distributed unitaries U. The residual post-correction error is highly sensitive to this distribution, since $r_{mn}$ is nonzero only within the forbidden regions. For large meshes, this distribution clusters tightly near the cross state, or the upper pole of the Riemann sphere as shown in FIG. 23C. The distribution depends on the MZI's location in the mesh; for a given $T_{mn}$ it takes the form:

$$P_{mn}(s) = \frac{n}{4\pi}\left(\frac{z+1}{2}\right)^{n-1}$$

This is uniform for the lowest row of crossings and becomes increasingly concentrated as one approaches the triangle's apex.

We calculate the mean residual $\langle r^2 \rangle$ by averaging the residual over the distribution P(s). This is simplified in the case of small hardware errors, because the forbidden region is correspondingly small and where we can assume P(s) is approximately constant:

$$\langle r_{mn}^2 \rangle = \langle \underbrace{|u|^2 \pm |v|^2}_{q_{mn}} \rangle P_{mn}(s_0) \frac{\pi R_0^4}{24}$$

where $s_0$ and $R_0$ are the center and radius of the forbidden region. Consider the forbidden region near the upper pole (the lower region plays a negligible role for large meshes), where $s_0 = 0$ and $R_0 = 2|\alpha+\beta|$. The residual is also proportional to the quantity $q_{mn} = \langle |u|^2 + |v|^2 \rangle$. Following the Gaussian elimination procedure of a Haar matrix, this evaluates to $q_{mn} = (n+1)/(N+1-m)$, yielding:

$$\langle r_{mn}^2 \rangle \to \frac{n(n+1)}{N+1-m} \frac{\langle |\alpha + \beta|^4 \rangle}{6}$$

Assuming an uncorrelated Gaussian perturbation model with $\langle \alpha \rangle_{rms} = \langle \beta \rangle_{rms} = \sigma$, the resulting matrix error is:

$$\varepsilon_c = \left(\frac{N^2}{27} \langle |\alpha + \beta|^4 \rangle\right)^{1/2} \to \frac{2}{3} N \sigma^2$$

In contrast, if the mesh were straightforwardly programmed without taking any account of the imperfections ("uncorrected" error), the error under an uncorrelated perturbation model would be $\varepsilon_0 = \sqrt{2N}\sigma$. Self-configuration therefore leads to a quadratic suppression of errors: $\varepsilon_c = (\varepsilon_0)^2/3$. However, $\varepsilon_c$ still increases with mesh size, so fabrication imperfections will still set a limit on the scaling of meshes based on this architecture.

Some matrices can be exactly realized even with an imperfect mesh. Again, the coverage is the fraction of such unitaries under the Haar measure. This is computed by summing up the probabilities that individual MZIs fall within the forbidden region:

$$\text{cov}(N) = \exp\left(-\sum_{mn} P_{mn}(0) \pi R_0^2\right) = e^{-N^3 \sigma^2 / 3}$$

In practice, even moderately sized meshes will have vanishingly small coverage, so the error metric $\varepsilon$ is usually more relevant.

3.3. Three-Splitter MZI

Figure 24A:
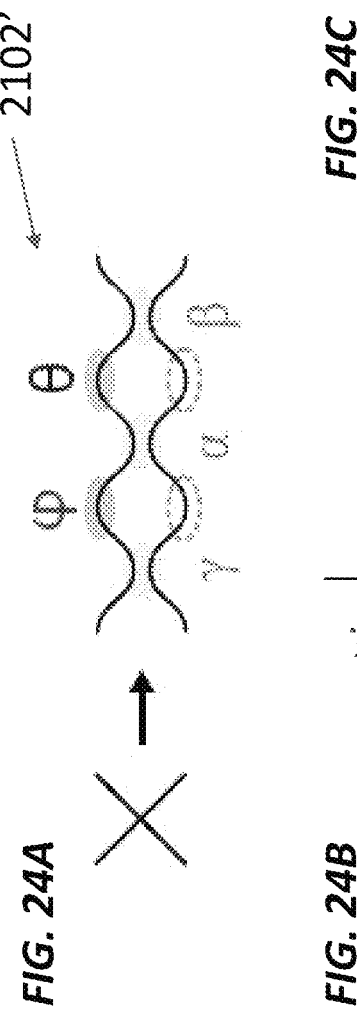
FIG. 24A illustrates a three-splitter MZI design.

One challenge to error correction in multiport interferometers is that the forbidden regions overlap with the peak of the probability distribution (cross state s=0). Adding redundant components (e.g., MZI doubling) solves this problem by eliminating the forbidden regions altogether, but at the cost of added optical and electrical complexity. An alternative approach is to displace the forbidden regions away from the cross state rather than eliminating them altogether. This can be performed by placing a third splitter at the input of the MZI, as shown in FIG. 24A. The extra splitter performs a Möbius transformation on s:

$$s \rightarrow \frac{s + i\tan(\eta)}{1 + is\tan(\eta)}$$

Figure 24B:
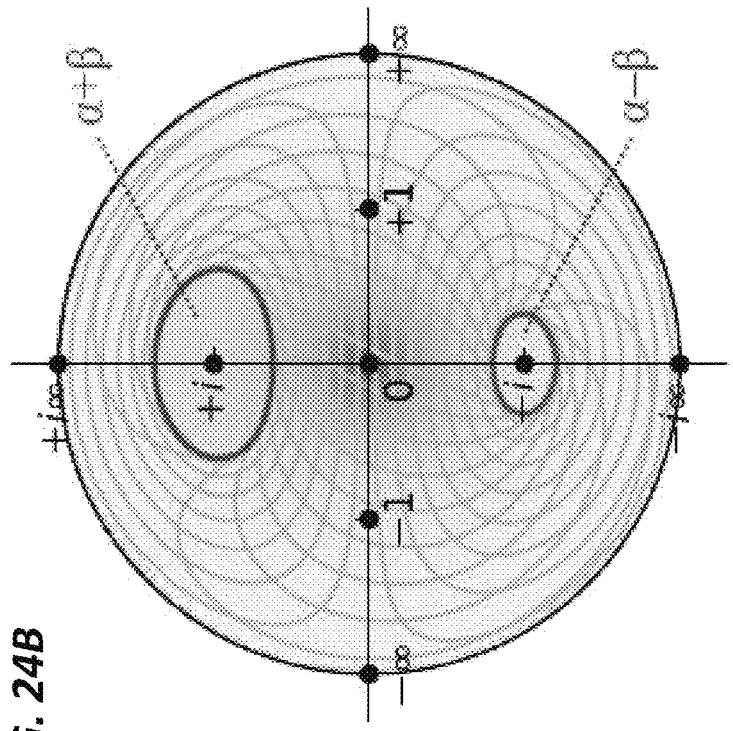
FIG. 24B is a plot of the three-splitter MZI Möbius transformation on $s\in\mathbb{C}$, which pushes the forbidden regions away from s={0, ∞}.
Figure 24C:
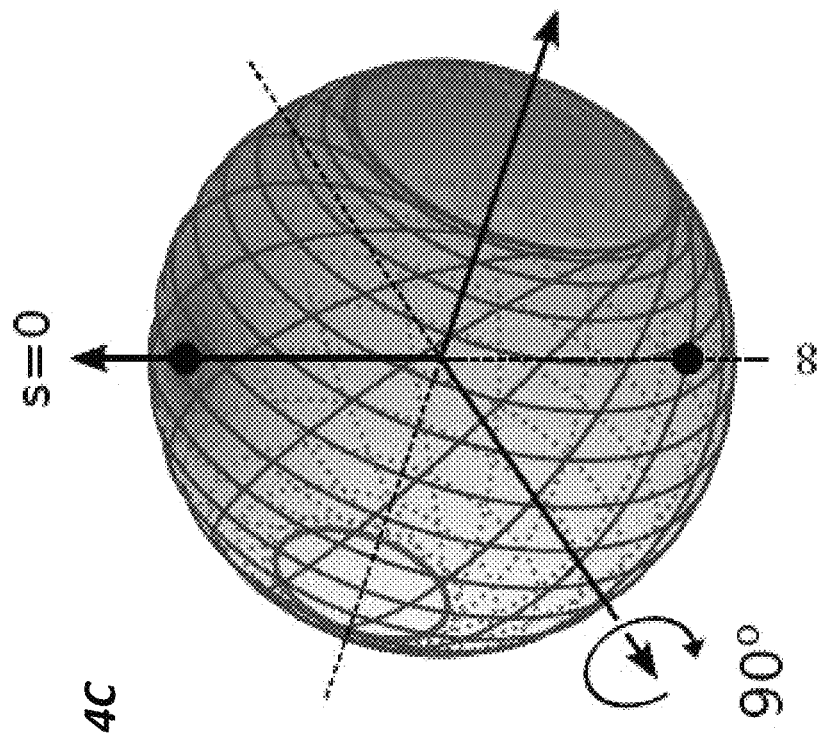
FIG. 24C is a plot of a Riemann sphere rotation equivalent to the plot in FIG. 24B.

For a 50:50 splitting ratio ($\eta=\pi/4$), the extra splitter maps the bar and cross states to $s=\pm i$ as shown in FIG. 24B. FIG. 24C shows that this can be visualized as a 90° rotation on the Riemann sphere, which pushes the forbidden regions to the equator, while the probability density is still concentrated at the poles.

The 3-splitter MZI can realize the full range of (absolute value) splitting ratios $|s| \in [0, \infty)$, and for certain parameter choices, this ratio is wavelength-independent. However, the presence of forbidden regions means that the relative phase of this splitter cannot be fully controlled; which means that errors can still occur when programming the mesh. However, with the 3-splitter structure, MZIs fall into the forbidden regions only rarely; consequently, the error metric of the 3-splitter MZI is much lower than the standard MZI, and perhaps more strikingly, does not increase with mesh size N.

The mean residual left by MZI $T_{mn}$ is:

$$\langle r_{mn}^2 \rangle = 2 \times \underbrace{\frac{n+1}{N+1-m}}_{q_{mn}} \underbrace{\frac{n}{2^{n+1}\pi}}_{P_{mn}(\pm i)} \underbrace{\frac{\pi}{24}(192\sigma^4)}_{\langle R_0^4 \rangle}$$

Figure 25A:
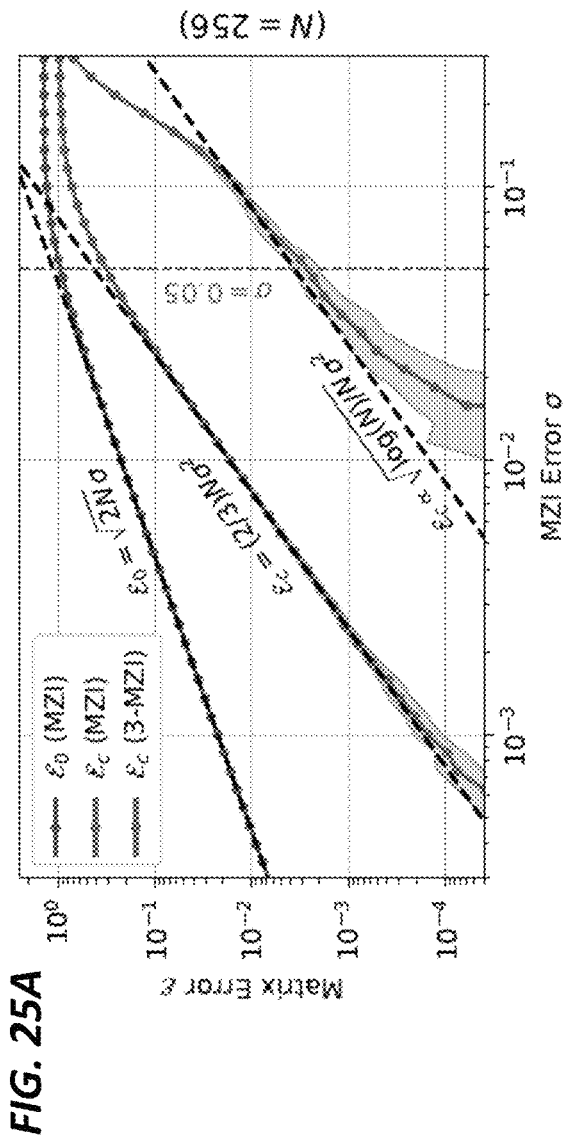
FIG. 25A is a plot of matrix error $\varepsilon_0$, $\varepsilon_c$ as a function of splitter variation σ (fixed N=256) for two- (standard; upper and middle traces) and three-splitter MZIs (lower trace).
Figure 25B:
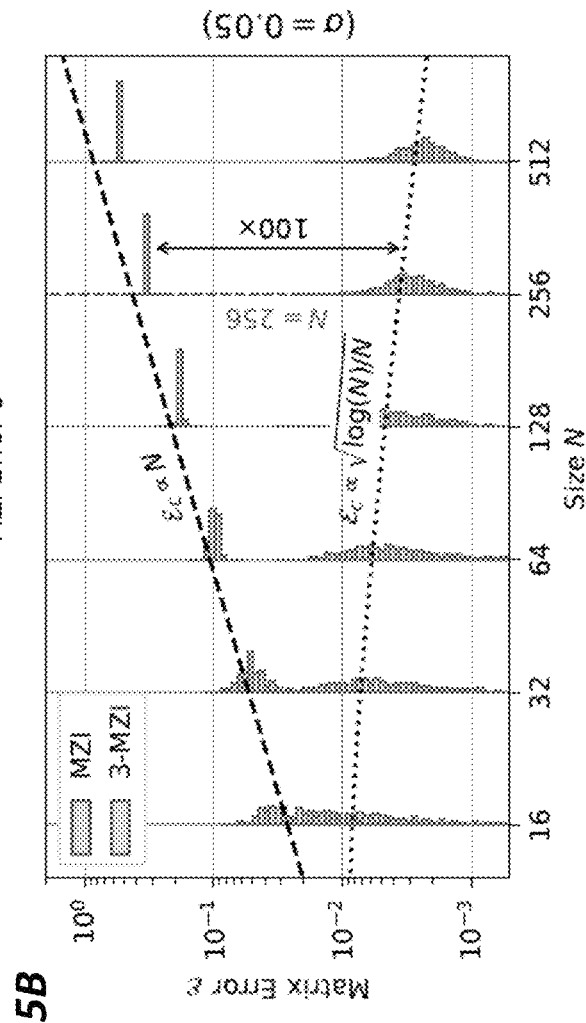
FIG. 25B is a plot of the matrix error scaling with mesh size N (fixed σ=0.05) two- and three-splitter MZIs (upper and lower traces, respectively).

The factor of two above arises because both forbidden regions contribute equally. FIGS. 25A and 25B show the results when summing over all MZIs in the mesh:

$$\mathcal{E}_c = \left(\frac{128\sigma^4}{N}\left[\sum_{n=1}^{N}\frac{1}{n} - \frac{5}{4} - \log(2)\right]\right)^{1/2} \approx 8\sigma^2 \left[2\frac{\log(N) + \gamma_e - \frac{5}{4} - \log(2)}{n}\right]^{1/2}$$

where $\gamma_e \approx 0.5772$ is the Euler-Mascheroni constant. For most mesh sizes, the matrix error $\mathcal{E}_c$ is 1-2 orders of magnitude smaller for the 3-MZI design. Remarkably, the error actually decreases with increasing mesh size, scaling as $\mathcal{E}_c \propto \sqrt{\log(N)/N}$. In the asymptotic limit $N \rightarrow \infty$, matrices can be programmed perfectly.

This non-intuitive effect arises from the fact that, under the Haar measure, only a small fraction of MZIs have significant probability density near $s=\pm i$, where the forbidden regions are centered. This probability decreases exponentially with the distance from the triangle's base (or from the edge in the case of the rectangular mesh) due to the $2^{-n}$ dependence in the distribution of the residuals. Therefore, although the mesh has $N(N-1)/2$ MZIs, only $O(N)$ contribute significantly to the matrix error under self-configuration. A naïve estimate assuming uncorrelated errors would give $\|\Delta U\| \propto \sqrt{N}\sigma^2$, which would lead to a constant $\mathcal{E}_c$. However, during the self-configuration process, subsequent MZIs can partially correct for errors in earlier MZIs that cannot be properly configured. Only the residual terms remain, as these cannot be cancelled out by subsequent Givens rotations. The end result is to reduce the error of each MZI by a factor $q_{mn}=\langle |u|^2+|v|^2 \rangle$, which is often $\ll 1$. Properly accounting for this factor explains the further reduction to $\mathcal{E}_c \propto \sqrt{\log(N)/N}$.

Another advantage of the 3-splitter MZI is that the threshold for perfect error correction is higher. One obtains this threshold is found by computing the coverage:

$$\text{cov}(N) = \exp\left(-2\sum_{mn}P_{mn}(\pm i)\pi R_0^2\right) = e^{-16N\sigma^2}$$

Figure 26:
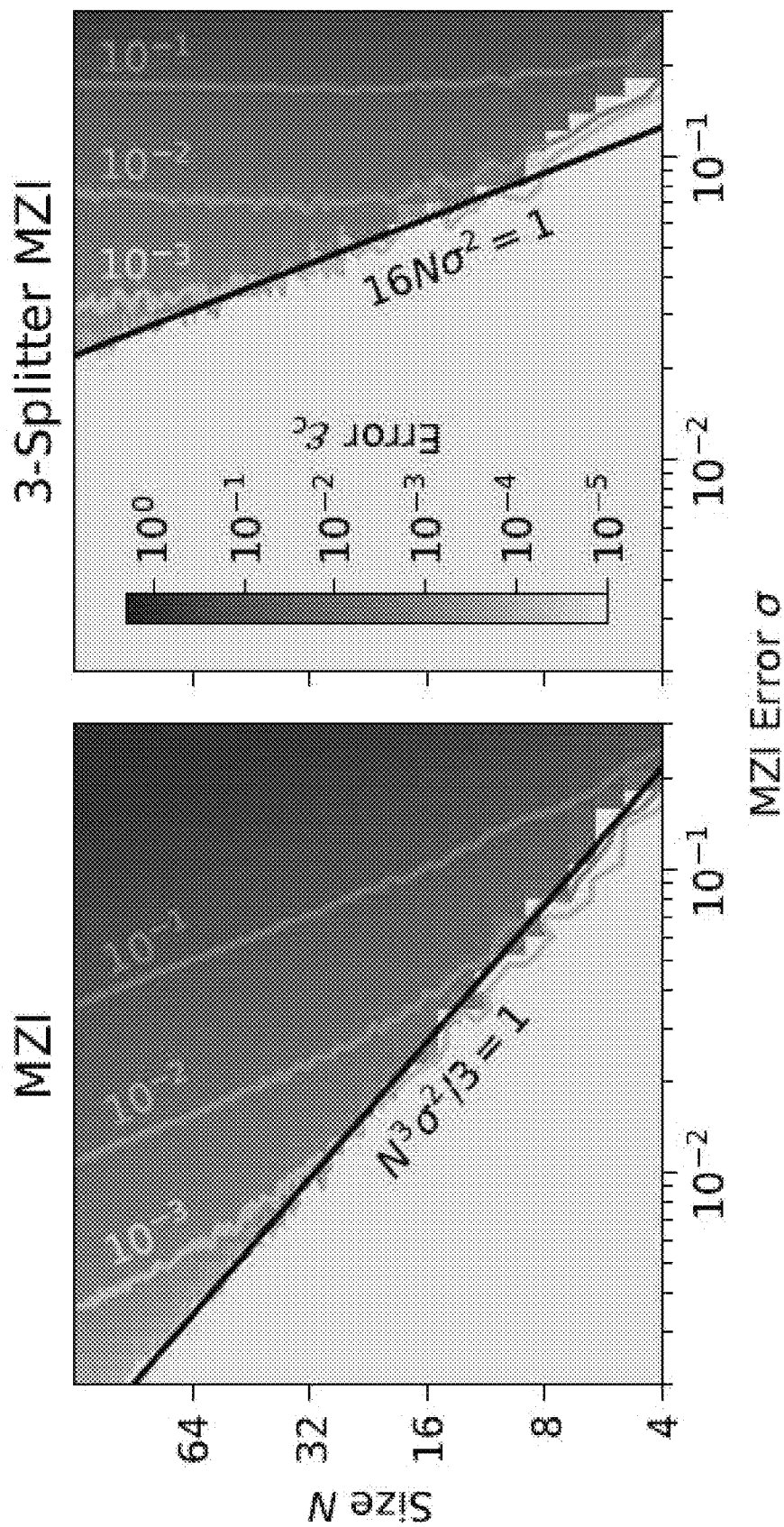
FIG. 26 shows matrix error as function of both N and σ for standard (left) and three-splitter (right) MZI.

The threshold scales as $\sigma_{th} \propto N^{1/2}$, as opposed to the $N^{3/2}$ scaling observed for a standard MZI. Consequently, perfect error correction is available under a much larger range of conditions as shown in FIG. 26.

3.4. MZI+Crossing

The 3-splitter MZI described above is well-suited to the case of generic, uncorrelated component errors. However, since the correlation lengths of process variations tend to be larger than a single MZI, errors are often correlated in practice. This is especially true for broadband couplers based on multimode interference (MMI), subwavelength gratings, and asymmetric designs, all of which are highly dependent on the device geometry, which can vary slightly from run to run. Moreover, even with perfect 50:50 couplers, the splitting ratios are still wavelength-dependent. Operating the mesh away from its design wavelength can lead to correlated device errors, so sensitivity to these errors is closely tied to the operational bandwidth of the device.

Figure 27A:
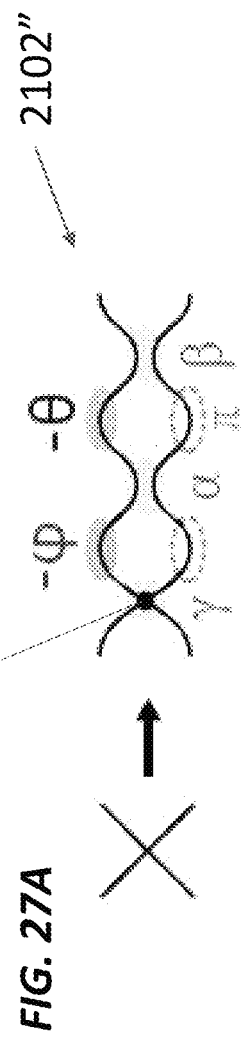
FIG. 27A illustrates an MZI+Crossing architecture.
Figure 27B:
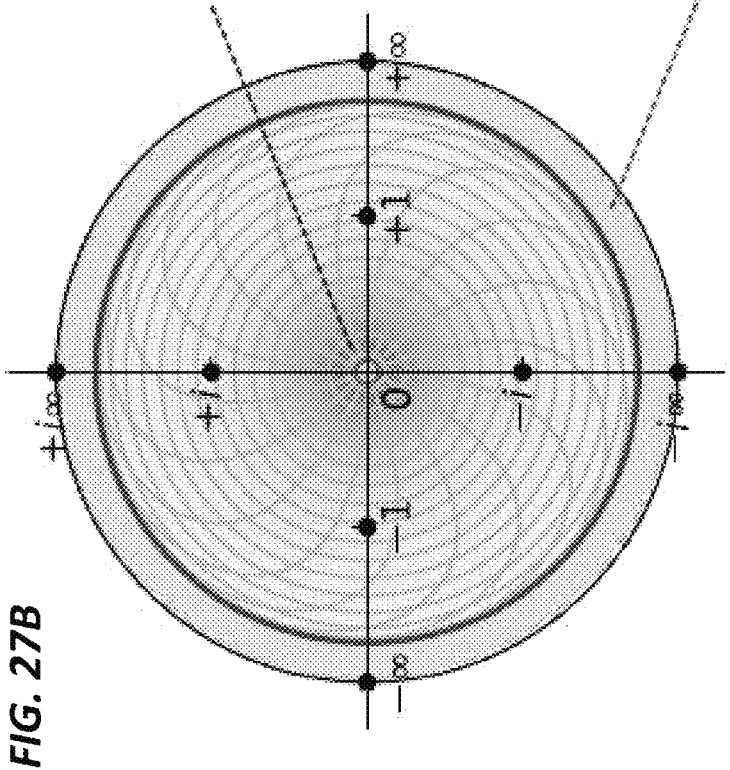
FIG. 27B shows that the crossing flips the s=0 and s=∞ forbidden regions. For correlated errors, the forbidden region around s=0 disappears.
Figure 27C:
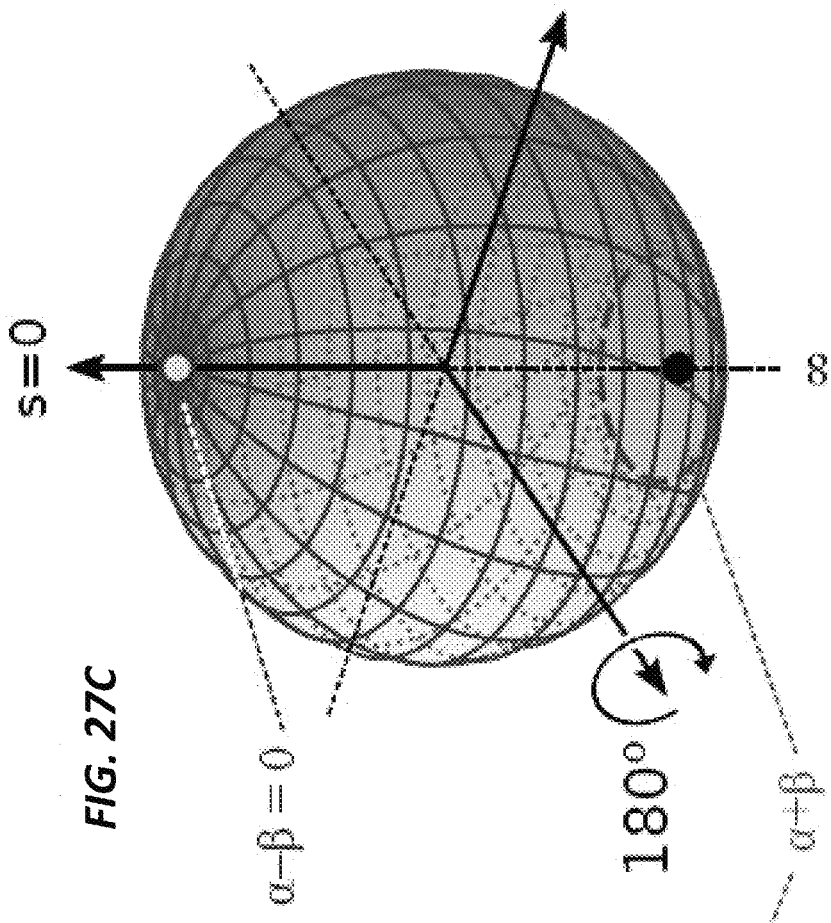
FIG. 27C is a Riemann sphere projection of the plot in FIG. 27B.

Consider the case of a constant offset $\mu$ for all splitting ratios: $\alpha=\beta=\mu$. In a standard MZI, the forbidden region near $s=\infty$ disappears since $|\alpha-\beta|=0$, while the region near $s=0$ (the peak of the probability distribution) remains in place as shown in FIGS. 23A-23C. This is consistent with the common observation that the extinction ratio in an MZI is much higher in the cross port than in the bar port. An optimal error reduction strategy, illustrated in FIG. 27A, has been previously proposed in the context of broadband optical switching: place a waveguide crossing (indicated by the dot) before the MZI. FIGS. 27B and 27C show that the added crossing performs the Möbius transformation $s \rightarrow 1/s$, rotating the Riemann sphere by 180° to move the forbidden region to the minimum of the probability distribution.

As above, we use the residual formula to calculate the matrix error. In this case, there is only one forbidden region, centered at $s_0=\infty$, with $R_0=4\mu$. Only the MZIs in the bottom row contribute to the sum because the probability distribution vanishes at $s=\infty$ for the upper rows. This yields:

$$\mathcal{E}_c = 4\mu^2\left[\frac{2}{3}\frac{\log(N)+\gamma-1}{N}\right]^{1/2}$$

FIG. 28 is a plot of this result. As in the 3-MZI design, this metric scales as $\mathcal{E}_c \propto \sqrt{\log(N)/N}\mu^2$, in contrast to the trend $\mathcal{E}_c=(4/3^{3/2})N\mu^2$ observed for the standard MZI under correlated errors. The coverage also increases:

$$\text{cov}(N) = \begin{cases} e^{-(2/3)N^3\mu^2} & (MZI) \\ e^{-4N\mu^2} & (MZI + \text{Crossing}) \end{cases}$$

As an added bonus, the MZI+Crossing design also reduces the effect of errors in the absence of correction. To see how, consider the transfer matrix of the standard MZI:

$$T_{\alpha,\beta}(\theta,\phi) = S(\pi/4+\beta)\begin{bmatrix} e^{i\theta} & 0 \\ 0 & 1 \end{bmatrix} S(\pi/4+\alpha)\begin{bmatrix} e^{i\phi} & 0 \\ 0 & 1 \end{bmatrix}$$

where $S(\eta)=e^{i\sigma_x\eta}$ is the transfer matrix for a symmetric crossing, and $\sigma_x=[[0,1],[1,0]]$ is a Pauli matrix. To first order in $(\alpha, \beta)$, the norm of the matrix error is:

$$\|\Delta T\|_{MZI}^2 = 2[\cos^2(\theta/2)(\alpha+\beta)+\sin^2(\theta/2)(\alpha-\beta)^2]$$

The sensitivity to correlated errors $\alpha=\beta$ is maximized when the MZI is in the cross state $\theta=0$. Since most MZIs in large meshes are close to the cross state, the matrix error $\varepsilon_0=2\sqrt{N}\mu$ for the overall mesh is larger by a factor of $\sqrt{2}$ compared to the uncorrelated case. Assuming a perfect crossing, for the MZI+Crossing, the transfer matrix is:

$$T_{\alpha,\beta}^{(X)}(\theta,\phi) = S(\pi/4+\beta)\begin{bmatrix} e^{-i\theta} & 0 \\ 0 & -1 \end{bmatrix} S(\pi/4+\alpha)\begin{bmatrix} e^{-i\phi} & 0 \\ 0 & 1 \end{bmatrix} S(\pi/2) =$$
$$e^{-i(\theta+\phi)}\begin{bmatrix} 1 & 0 \\ 0 & -1 \end{bmatrix} T_{\alpha,-\beta}(\theta,\phi)$$

Up to some irrelevant output phases, the effect of the crossing is to flip the relative sign of $\alpha$ and $\beta$, so the component errors appear anticorrelated. As a result, $\|\Delta T\|_{MZI+X} \propto \sin(\theta/2)\mu$, which is zero for the cross state. Of course, the MZIs in a realistic mesh are not exactly in the cross state, to the actual error will be nonzero. Adding the errors $\|\Delta T_{mn}\|$ in quadrature and averaging over the probability distribution $P_{mn}(\theta)=n\sin(\theta/2)\cos(\theta/2)^{2n-1}$ gives:

$$\varepsilon_0 = 2\sqrt{2(\log N + \gamma_e - 2)}\mu$$

Correlated errors (both corrected and uncorrected) tend to be important because they are tightly connected to the operational bandwidth of the mesh. Directional couplers are generally dispersive, and this dispersion leads to a correlated wavelength-dependent splitter error, which can usually be expanded to first order $\mu \approx (d\mu/d\lambda)\Delta\lambda$. Two useful wavelength-dependent figures of merit are (1) the bandwidth and (2) the tuning ranage.

The bandwidth is related to the number of wavelength channels that can be simultaneously processed by the mesh. Since the mesh is usually programmed at a specific wavelength (the center channel), the other channels usually have distorted matrices. Given a target error $\varepsilon_{max}$, the bandwidth is the range over which $\varepsilon_o(\lambda) < \varepsilon_{max}$:

$$\lambda_{BW} = \frac{\varepsilon_{max}}{|d\lambda/d\mu|} \begin{cases} \frac{1}{\sqrt{N}} & MZI \\ \frac{1}{\sqrt{2(\log N - 1.42)}} & (MZI+X) \end{cases}$$

The tuning range refers to the range of $\lambda$ over which the mesh can be programmed to a given accuracy. This is governed by the condition $\varepsilon_c(\lambda) < \varepsilon_{max}\$$, which yields:

$$\lambda_{TR} = \frac{\sqrt{\varepsilon_{max}}}{|d\lambda/d\mu|} \begin{cases} \frac{3^{3/4}}{\sqrt{N}} & MZI \\ \sqrt{\frac{3N}{2(\log N - 0.42)}} & (MZI+X) \end{cases}$$

Figure 29A:
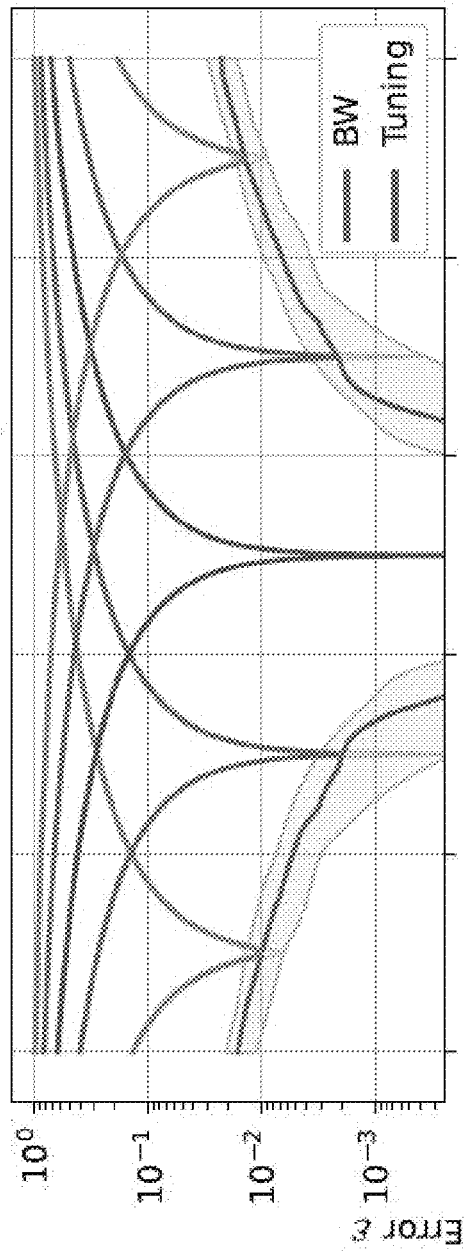
FIG. 29A is a plot of bandwidth and tuning range for an MZI+Crossing MZI mesh, N=64 (500×220 nm Si: $SiO_2$ coupler with 200 nm gap, dμ/dλ≈3.27 μm).
Figure 29B:
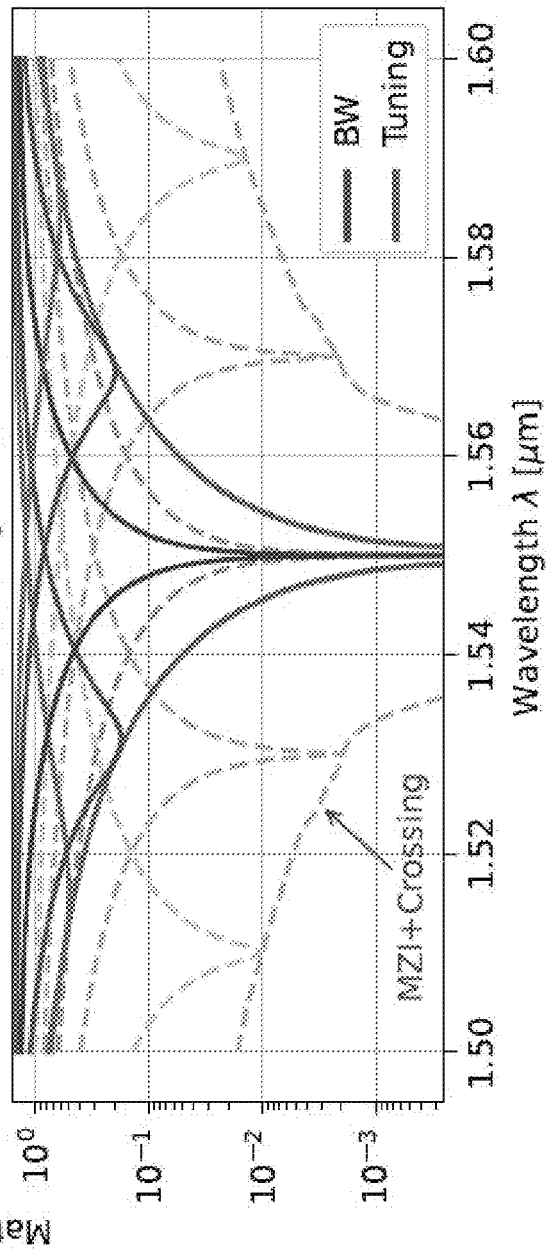
FIG. 29B is a plot of bandwidth and tuning range for a standard MZI mesh, N=64 (500×220 nm Si: $SiO_2$ coupler with 200 nm gap, dμ/dλ≈3.27 μm).

As FIG. 29 illustrates, the MZI+Crossing architecture enjoys a significantly larger tuning range than a conventional MZI, in addition to modestly greater bandwidth. The respective "enhancement factors", which scale as $F_{BW} \propto \sqrt{N/\log N}$ and $F_{TR} \propto (N^3/\log N)^{1/4}$, are tabulated in the following table:

| $N=$ | 16 | 32 | 64 | 128 | 256 |
|---|---|---|---|---|---|
| $F_{BW} = \$$ | 2.4× | 2.8× | 3.4× | 4.3× | 5.6× |
| $F_{TR} = \$$ | 5.6× | 10× | 18× | 33× | 61× |

Real crossings have a small amount of nonzero crosstalk, quantified by the S-matrix element $S_{21}$; scattering into the forward=facing port leads to a perturbation $S(\pi/2) \to S(\pi/2+\gamma)$ in the transfer matrix, where $$\gamma = 10^{-S_{21}[dB]/20}$$

This does not degrade the effectiveness of self-configuration, since the additional scattering angle merely rotates the Riemann sphere, shown in FIG. 27C, by an additional angle $\gamma \ll 1$, and the forbidden region is still far from s=0. In-plane crossings in silicon can achieve sub-40 dB crosstalk suppression ($\gamma < 0.01$) with insertion losses well below 0.1 dB. Unlike directional couplers, crossings are broadband; the insertion loss and crosstalk depend only very weakly on $\lambda$, so any crossing imperfections can be treated as (correctable) wavelength-independent errors that do not affect the bandwidth enhancements of the MZI+Crossing scheme.

In addition to the forward-scattered light, a 90° crossing can scatter light into the backward-facing port. Back-reflected light can be subsequently reflected in other crossings, leading to a spurious signal that interferes with the forward-propagating light. Provided that the phases of reflected beams are random, these add in quadrature: with amplitude $\gamma^2$ and $O(N^2)$ scattering paths, this can induce an $O(N\gamma^2)$ error, which may be uncorrectable and set a limit on scaling. However, if this effect is small, gradient-based methods or iterative self-configuration may enable correction of these errors.

Adding a single passive component (either a splitter or a waveguide crossing) to the MZI makes it possible to recover behavior that is asymptotically perfect—that is, the average normalized matrix error decreases with size. The design choices are motivated by the elegant theory of self-configuration by matrix diagonalization, where splitting ratios are set to successively zero the off-diagonal elements of the target unitary. By visualizing the MZI state on the Bloch sphere, we can intuitively understand the increased error robustness of our designs in terms of "rotating" the forbidden regions away from the peak probability density. This leads to a several-orders-of-magnitude reduction in post-correction errors, compared to the standard MZI mesh. The ability to achieve near-perfect and freely scalable MZI meshes with less complexity than the MZI-doubled designs (especially with respect to the number of active components and pads) removes a major obstacle to the realization of very-large-scale photonic circuits.

4. Modular Photonic Architecture Based on the FFT Butterfly Fractal

The block singular-value decomposition of a unitary matrix can be used as the basis for a linear photonic circuit architecture. This decomposition splits a size-N mesh into four size-(N/2) quadrants connected by a central crossing layer, and when applied recursively yields a generalized fast Fourier transform (FFT) butterfly fractal. In addition to the benefit of modularity, the butterfly fractal exhibits greater robustness to hardware errors due to its more uniform distribution of coupler angles. Numerical simulations confirm this intuition, demonstrating reduced (post-correction) matrix error and improved scaling compared to the conventional mesh. A truncated butterfly can implement weight pruning in optical neural networks.

As photonic circuits grow larger, modularity and robustness to error become paramount architectural concerns. In modern process nodes, device yield limits the practical reticle size, necessitating multi-chip-module (MCM) architectures for high-end processors. Photonic MCMs are traditionally employed for heterogeneous integration of III/V lightsources; however, as MZI meshes grow in size, even these passive circuits may use a multi-chiplet architecture, so modularity is useful.

Hardware errors also limit the scaling of MZI meshes. With a fixed MZI error $O(\sigma)$ and a circuit depth that scales as $O(N)$, the overall matrix error scales as $O(\sqrt{N}\sigma)$ (assuming uncorrelated errors). Even for medium-sized meshes, errors noticeably degrade the performance in quantum and machine-learning applications. Errors can be corrected or compensated by a variety of techniques including global optimization, local correction, and self-configuration; however, for large meshes these corrections may be at best approximate and can lead to a matrix error that scales as $O(N\sigma^2)$, which is at most a quadratic reduction. The limits to error correction are closely tied to the (in)ability of physical MZIs to realize the splitting ratios demanded by the mesh. This problem is severe in standard mesh geometries, where the distribution of target coupler angles clusters tightly around the "cross" state, which is not realizable in an imperfect MZI. MZI pairing and MZI+Crossing designs like those disclosed above can circumvent this difficulty, but at the cost of additional hardware complexity.

Figure 30A:
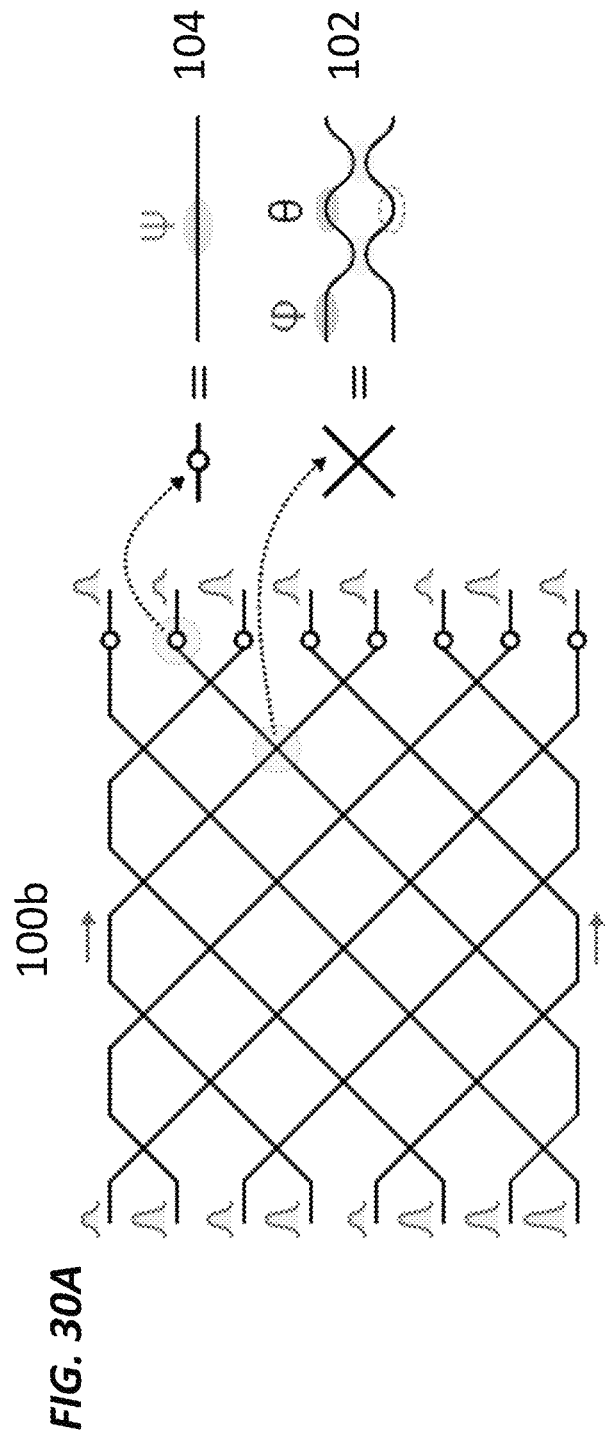
FIG. 30A illustrates a 8×8 Clements mesh.
Figure 30B:
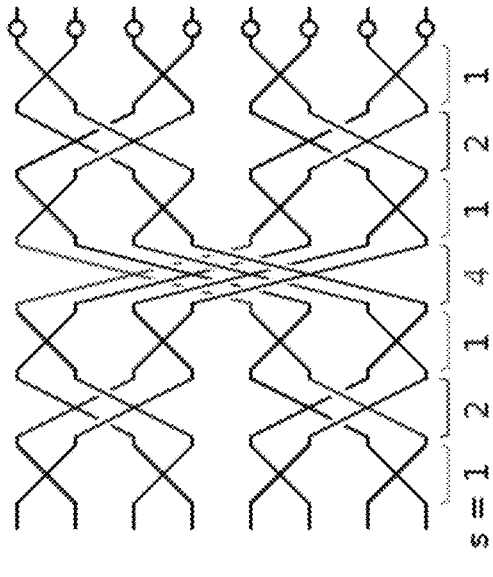
FIG. 30B illustrates a top-layer block decomposition of the mesh of FIG. 30A broken into 4×4 quadrants.
Figure 30C:
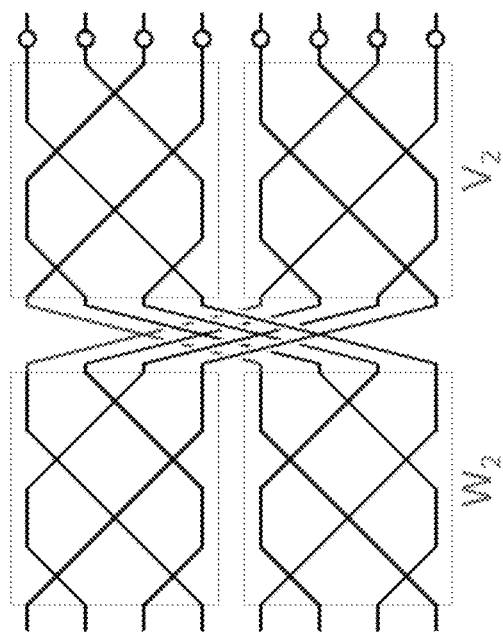
FIG. 30C shows a butterfly fractal structure resulting from decomposing the mesh of FIG. 30A.

FIGS. 30A-30C illustrate an architecture for multiport interferometers based on the Fast Fourier Transform (FFT) butterfly fractal. FIG. 30A shows a Clements mesh 100b formed of interconnected MZIs 102 and external phase shifters. FIG. 30B illustrates a top-layer block decomposition of the mesh of FIG. 30A broken into 4×4 quadrants. FIG. 30C shows a butterfly fractal structure resulting from decomposing the mesh of FIG. 30A.

The butterfly fractal is a generalization of the standard FFT butterfly. Like the FFT, it has a self-similar (and therefore modular) structure. As a result of this structure, the fractal has a much more uniform distribution of coupler angles, which facilitates effective error correction even in very large meshes. On the other hand, while the FFT and its photonic analogs can represent only restricted unitaries, the butterfly fractal is a universal N×N coupler. Based on this observation, the butterfly and its fractal variant are extreme cases of a spectrum of MZI meshes. Truncating the fractal is a way of trading off efficiency and generality, analogous to pruning or dropout in conventional neural networks.

4.1. The FFT Butterfly Fractal

The transfer matrix for an MZI mesh is the product of a diagonal phase screen and a sequence of 2×2 block matrices, where, by convention, the phase screen is usually placed at the output of the mesh as in FIG. 30A:

$$U = D\prod_m T_m$$

In the Reck and Clements meshes, the MZIs couple nearest-neighbor waveguide pairs, i.e., they have a stride of one. Projected to the waveguide mode set being coupled, each waveguide transfer matrix $T_m$ takes the form:

$$T = \frac{1}{2}\begin{bmatrix} 1 & i \\ i & 1 \end{bmatrix}\begin{bmatrix} e^{i\theta} & 0 \\ 0 & 1 \end{bmatrix}\begin{bmatrix} 1 & i \\ i & 1 \end{bmatrix}\begin{bmatrix} e^{i\phi} & 0 \\ 0 & 1 \end{bmatrix}$$

$$= ie^{i\theta/2}\begin{bmatrix} e^{i\phi}\sin(\theta/2) & \cos(\theta/2) \\ e^{i\phi}\cos(\theta/2) & \sin(\theta/2) \end{bmatrix}$$

If N is even, the matrix U can be divided into size-(N/2) quadrants $U_{ij}$, $(i,j) \in \{1,2\}$. For unitary U, the matrices $U_{ij}$ share singular vectors, so U admits a block singular-value decomposition (SVD) of the form:

$$U = \begin{bmatrix} V_1 & \\ & V_2 \end{bmatrix}\begin{bmatrix} D_{11} & D_{12} \\ D_{21} & D_{22} \end{bmatrix}\begin{bmatrix} W_1 & \\ & W_2 \end{bmatrix}$$

This equation divides a size-N Clements mesh into four size-(N/2) blocks, each realizing one of the matrices $V_{1,2}$, $W_{1,2}$. These blocks are joined by a central layer of stride-(N/2) MZIs, implementing the matrix $$\begin{bmatrix} D_{11} & D_{12} \\ D_{21} & D_{22} \end{bmatrix} = ie^{i\Theta/2}\begin{bmatrix} e^{i\Phi}\sin(\Theta/2) & \cos(\Theta/2) \\ e^{i\Phi}\cos(\Theta/2) & \sin(\Theta/2) \end{bmatrix}$$

where $(\Theta,\Phi)$ are size-(N/2) diagonal matrices that encode the phase shifts of the central layer. (Technically the SVD returns real-valued $D_{ij}$; however, this can be put into the form immediately above by propagating the unwanted phases to the matrices $V_{1,2}$, $W_{1,2}$).

The block SVD is over-parameterized, with a total of $$2\underbrace{(N/2)^2}_{V_1,V_2} + 2\underbrace{(N/2)}_{\Theta,\Phi} + 2\underbrace{(N/2)^2}_{W_1,W_2} = N^2 + N$$

degrees of freedom. The redundant variables come from the output phase screens of $W_{1,2}$, which lie in the interior of the mesh. These can be eliminated by propagating the phases to the output, following the rule:

$$T(\theta, \phi)\begin{bmatrix} e^{i\psi_1} & \\ & e^{i\psi_2} \end{bmatrix} = \begin{bmatrix} e^{i\psi_2} & \\ & e^{i\psi_2} \end{bmatrix}T(\theta, \phi + \psi_1 - \psi_2)$$

FIG. 30B shows the resulting mesh, which has exactly $N^2$ degrees of freedom.

This process can be applied recursively to the blocks $V_{1,2}$, $W_{1,2}$, constructing a self-similar fractal. For a radix-2 mesh size, the fractal terminates at N=2, yielding the generalized FFT butterfly, which is shown in FIG. 30C.

Like the Clements mesh, the butterfly fractal has O(N) depth and can represent all unitaries. One difference between the butterfly fractal and the Clements mesh is the presence of MZIs with stride s>1. There are $N/2^{k+1}$ layers of stride $s=2^k$, interleaved between layers of ordinary (s=1) MZIs. The large number of waveguide crossings is a liability of this scheme, since crossings have nonzero loss and crosstalk. One way to mitigate the effects of imperfect crossings is to terminate the fractal at a reasonable $N_{blk}>2$ (for instance, splitting a 256×256 mesh into an 8×8 grid of 32×32 Clements blocks). In this case, the crossings are dealt with as follows:
1. Within each block, there are no crossings because the standard Clements geometry is employed, FIG. 30A. Since large Clements meshes are difficult to program in light of the $O(N_{blk}^2)$ (corrected) error scaling, the blocks are kept to a reasonable size.
2. Use escalators and out-of-plane crossings for the large-stride (inter-block) MZI layers. These crossings can have much lower loss and crosstalk compared to in-plane crossings. In an MCM, the layers with largest stride can connect distinct chiplets, so out-of-plane crossings can be written straightforwardly in polymer or glass. The main downside to out-of-plane techniques is the interlayer coupling loss (e.g., through waveguide escalators), but since large-stride MZI layers are relatively infrequent, these losses may be tolerable.

The tradeoff between intra-block errors (which favors small $N_{blk}$ and inter-block escalator losses (which favors large $N_{blk}$) sets the optimum block size for this partial butterfly fractal.

4.2. Error Correction

Component imperfections lead to perturbations in the transfer matrix for each MZI. On most integrated platforms, splitter and phase errors dominate. For a fully programmable device, phase errors can be absorbed into the phase shifter values $(\theta,\phi)$. Splitter errors can be a more fundamental problem, since they limit the range of MZI splitting ratios, which can lead to uncorrectable errors in the mesh. Splitter errors can perturb the MZI transfer matrix as follows:

$$T = \begin{bmatrix} \cos(\pi/4+\beta) & i\sin(\pi/4+\beta) \\ i\sin(\pi/4+\beta) & \cos(\pi/4+\beta) \end{bmatrix} \begin{bmatrix} e^{i\theta} & 0 \\ 0 & 1 \end{bmatrix}$$
$$\times \begin{bmatrix} \cos(\pi/4+\alpha) & i\sin(\pi/4+\alpha) \\ i\sin(\pi/4+\alpha) & \cos(\pi/4+\alpha) \end{bmatrix} \begin{bmatrix} e^{i\phi} & 0 \\ 0 & 1 \end{bmatrix}$$

This relationship limits the effective splitting angle of an MZI to the range:

$$\underbrace{2|\alpha+\beta|}_{\theta_{min}} \leq \theta \leq \underbrace{\pi - 2|\alpha-\beta|}_{\theta_{max}}$$

The performance of error correction is fundamentally limited by "uncorrectable" errors arising whenever this inequality is violated.

To analyze the effectiveness of error correction, we must first specify (1) an error distribution and (2) a distribution for the target unitary. For simplicity, consider the case of uncorrelated Gaussian errors: $\alpha,\beta \sim N(0,\sigma)$. (The case of correlated errors is qualitatively similar since the effects of most correlations vanish over the Haar measure). Following Refs., this note uses an error metric based on the Frobenius norm $\varepsilon = \|\Delta U\|/\sqrt{N}$, which quantifies the average relative error per matrix element. Target unitaries are sampled over the Haar measure. In the absence of error correction, the matrix error for both meshes (Clements and FFT) is:

$$\varepsilon_0 = \sqrt{2N}\sigma$$

Since the uncorrected error is too large for many applications, error correction techniques should be employed in large meshes. The effects of error correction are twofold:
1. Sufficiently small errors can be corrected exactly, while large errors may be corrected only approximately. The threshold for exact correction is related to the coverage of unitary space, i.e., the fraction of unitaries that can be realized in an imperfect mesh. This is given by:

$$\text{cov}(N) = \exp\left(-\sum_n P_n(\theta < \theta_{min})\right) \times \exp\left(-\sum_n P_n(\theta > \theta_{max})\right)$$

2. The sum in the exponential is taken over the MZIs of the mesh (indexed by n), whose target splitting ratios $\theta$ are independent random variables when unitaries are sampled over the Haar measure.
3. The residual post-correction error, arising from the MZIs that cannot be perfectly programmed, is:

$$(\mathcal{E}_c)^2 = \frac{1}{2N}\sum_n\left[\int_0^{\theta_{min}} P_n(\theta)(\theta-\theta_{min})^2 d\theta + \int_{\theta_{max}}^{\pi} P_n(\theta)(\theta-\theta_{max})^2 d\theta\right]$$

These equations for the coverage and residual post-correction error reveal that the effectiveness of error correction is strongly dependent on the splitting-angle probability distribution $P_n(\theta)$, especially its behavior near the poles $\{0,\pi\}$. Because the Jacobian in polar coordinates vanishes at the poles, $P(0)=P(\pi)=0$. Expanding to first order around these points, the coverage and corrected error are:

$$\text{cov}(N) = \exp\left[-2\sum_n (|P'_n(0)|\langle(\alpha_n+\beta_n)^2\rangle + |P'_n(\pi)|\langle(\alpha_n-\beta_n)^2\rangle)\right] \to$$

$$\exp\left[-4\sigma^2\sum_n(|P'_n(0)|+|P'_n(\pi)|)\right]$$

$$(\varepsilon_c)^2 = \frac{2}{3N}\sum_n(|P'_n(0)|\langle(\alpha+\beta)^4\rangle + |P'_n(\pi)|\langle(\alpha-\beta)^4\rangle) \to$$

$$\frac{8\sigma^4}{N}\sum_n(|P'_n(0)|+P'_n(\pi)|)$$

For the Reck triangle and Clements rectangle, $P(\theta)=k\sin(\theta/2)\cos(\theta/2)^{2k-1}$ where $k\in\{1,\ldots,N-1\}$ is the MZI's "rank", and there are $(N-k)$ MZIs of rank k. The larger the mesh, the higher the rank of the average MZI, and the tighter $P(\theta)$ clusters around the cross state $\theta=0$. This gives a coverage of:

$$\text{cov}(N) = e^{-N_3\sigma^{2/3}}, \varepsilon_c = \sqrt{2/3}N\sigma^2$$

Unlike the Reck and Clements meshes, the FFT butterfly fractal is configured from a top-down block decomposition of the matrix. If the matrix U is sampled over the Haar measure, the singular-vector matrices $V_{1,2}$, $W_{1,2}$ are also Haar-random and independent of each other. As a result, the distribution $P_n(\theta)$ depends only on the MZI's stride, not on its location in the mesh.

Figure 31:
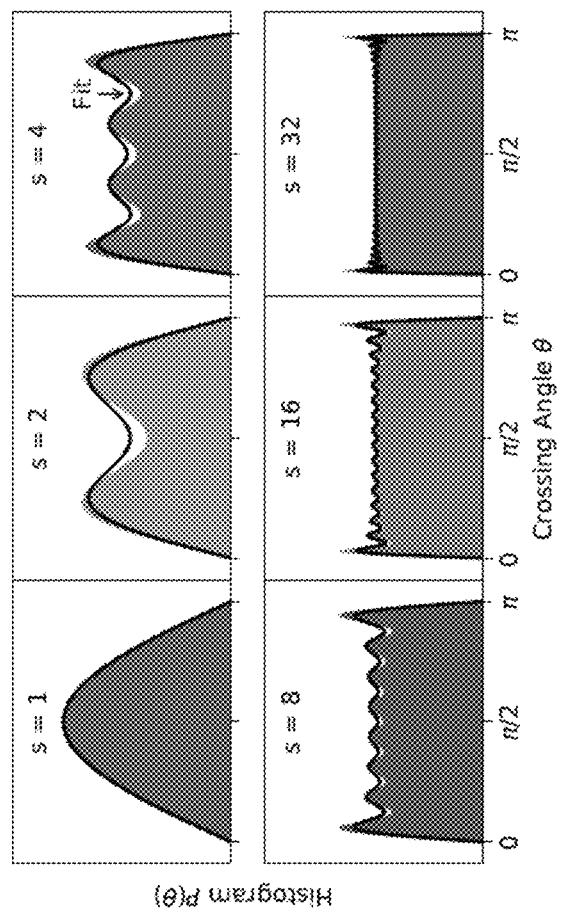
FIG. 31 is a plot of the distribution of MZI crossing angles as a function of stride in the FFT butterfly fractal.

FIG. 31 shows the distribution of angles for MZIs of strides of 1, 2, 4, 8, 16, and 32. The majority of MZIs have unit stride and $P(\theta) \propto \sin(\theta)$. As the stride increases, $P(\theta)$ comes to resemble a uniform distribution. Empirically, $P(\theta)$ fits well (but not exactly) to the normalized finite Fourier series of a constant:

$$P_n(\theta) \approx \frac{1}{2\sum_{n=1}^S (2n-1)^{-2}} \sum_{n=1}^S \frac{\sin((2n-1)\theta)}{2n-1}$$

The partial sum in the denominator converges very quickly to $\pi^2/8$. Approximating the sum by this value leads to $|P'_n(0)|=|P'_n(\pi)|\approx 4\ s/\pi^2$. Substituting into the expressions above for the coverage and corrected error and summing over the mesh (there are $N^2/4\ s$ MZIs of stride s) leads to:

$$\text{cov}(N) = \exp\left(-\frac{8N^2 \log_2(N)}{\pi^2}\sigma^2\right)$$

$$\mathcal{E}_c = \frac{4}{\pi}\sqrt{N\log_2(N)}\,\sigma^2$$

The following table lists the uncorrected and corrected error $\varepsilon_0$, $\varepsilon_c$ for the Clements and FFT butterfly meshes over a range of mesh sizes.

| Size | Error (at σ = 0.02) | | | Ratio |
|---|---|---|---|---|
| N | $\varepsilon_0$ | $\varepsilon_c^{(clem)}$ | $\varepsilon_c^{(fft)}$ | $\varepsilon_c^{(clem)}/\varepsilon_c^{(fft)}$ |
| 16 | 0.11 | 0.005 | 0.004 | 1.3× |
| 64 | 0.23 | 0.021 | 0.010 | 2.1× |
| 256 | 0.45 | 0.084 | 0.023 | 3.6× |
| 1024 | 0.91 | 0.33 | 0.051 | 6.5× |
| 4096 | 1.8 | 1.3 | 0.11 | 11× |

Figure 32A:
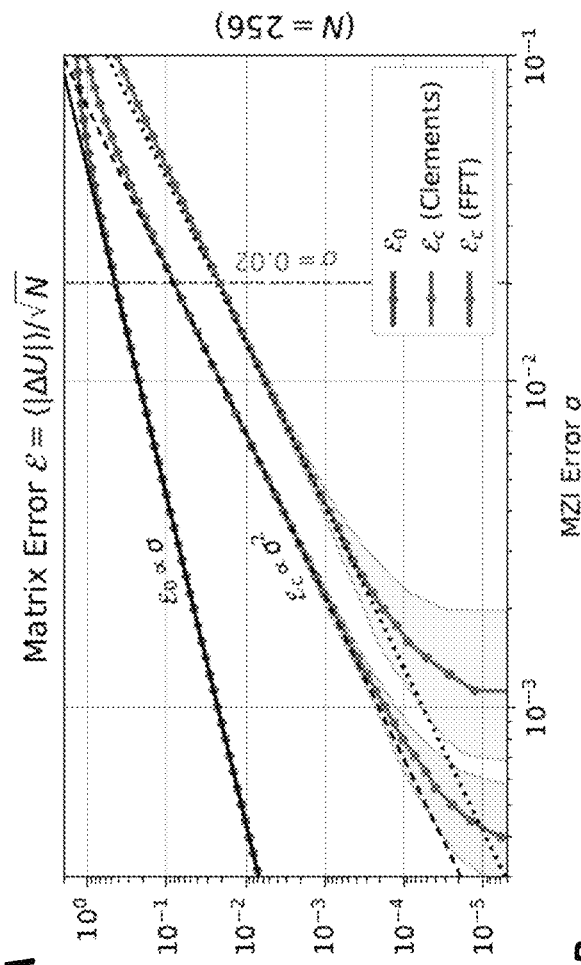
FIG. 32A is a plot of the scaling of matrix error with process variation σ.
Figure 32B:
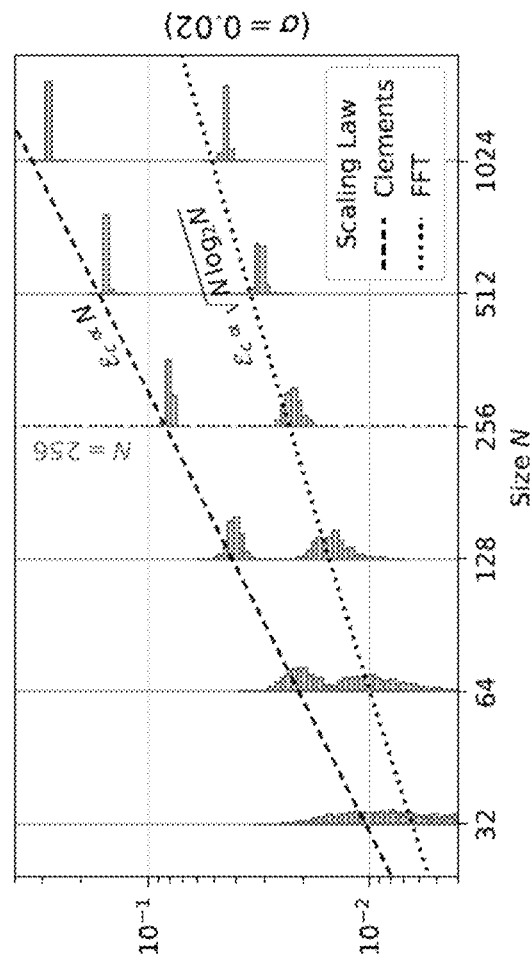
FIG. 32B is a plot of the scaling of matrix error with mesh size N, showing the advantage of the FFT butterfly for large mesh sizes.

To test the validity of the above expressions, FIGS. 32A and 32B show the results of numerical studies performing local error correction on the two meshes. Without correction, both meshes have uncorrected errors that scale as $\varepsilon_0 \propto \sigma$. For a 256×256 mesh, error correction on both meshes improves this figure by at least an order of magnitude when a $\sigma \leq 0.01$, and $\varepsilon_c \propto \sigma^2$ in both cases as shown in FIG. 32A. The FFT butterfly mesh shows a modest error reduction corresponding improvement in the perfect error-correction threshold $\sigma^{th}$. The ration of corrected errors for the Clements and FFT butterfly meshes is:

$$\frac{\mathcal{E}_c^{(clem)}}{\mathcal{E}_c^{(fft)}} = \frac{\sigma_{th}^{(fft)}}{\sigma_{th}^{(clem)}} = \sqrt{\frac{\pi^2}{24}\frac{N}{\log_2(N)}}$$

which is a factor of 3.6× for N=256. This factor, while modest, grows as $\sqrt{N/\log_2(N)}$, suggesting that the FFT butterfly mesh enjoys improved scaling under error correction compared to Reck and Clements. Intuitively, the improved scaling results from the more uniform distribution of phase angles (shown in FIG. 31), which do not cluster tightly near θ=0.

FIG. 32B plots the corrected error as a function of N for a fixed σ=0.02 (a typical value for directional couplers under wafer-scale process variance), with values listed above. While the benefits for the FFT architecture are small for mesh sizes N≤64 and may not outweigh its costs, the O(N) vs. $O(\sqrt{N\log_2(N)})$ scaling difference opens up a significant accuracy gap in the large-scale regime N≥1024. Since circuits of this scale may help reach the ~fJ/MAC energy-efficiency targets for photonic deep neural network (DNN) accelerators, and since the conventional Clements mesh suffers unacceptably high errors $\varepsilon_c \geq 0.2$ even in the presence of error correction (below the 4-8 bits of precision targeted for DNN accelerators), the FFT butterfly fractal may prove indispensable for such devices. Moreover, the reduced scaling with N means that the maximum size of the FFT butterfly is more sensitive to process improvements. Reducing σ by 2× corresponds to a 4× increase in the maximum mesh size for Reck and Clements meshes owing to the $O(N\sigma^{-2})$ scaling; for the butterfly fractal, the corresponding increase would be sixteen-fold.

5. Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method comprising:
    configuring a multiport interferometer comprising a mesh of Mach-Zehnder interferometers characterized by a transfer matrix U=VDW and hardware component errors, where W is a first matrix representing a first portion of the mesh of Mach-Zehnder interferometers, V is a second matrix representing a second portion of the mesh of Mach-Zehnder interferometers, and D is a phase screen, the configuring comprising, for each Mach-Zehnder interferometer in the mesh of Mach-Zehnder interferometers:
        performing Givens rotations that diagonalize a matrix X=V'UW';
        iteratively updating the first matrix based on the Givens rotations; and
        for each column of the first matrix, setting a variable internal phase and a variable external phase of a corresponding Mach-Zehnder interferometer in the mesh of Mach-Zehnder interferometers to reduce effects of the hardware component errors and direct light to a predetermined port of the corresponding Mach-Zehnder interferometer.

2. The method of claim 1, wherein the mesh of Mach-Zehnder interferometers is a rectangular mesh of Mach-Zehnder interferometers, and further comprising:
    iteratively updating the second matrix based on the Givens rotations; and
    for each column of the second matrix, setting the variable internal phase and the variable external phase to direct light to a given port of that Mach-Zehnder interferometer.

3. The method of claim 1, wherein the mesh of Mach-Zehnder interferometers is a triangular mesh of Mach-Zehnder interferometers and one of the first matrix or the second matrix is equal to the identity matrix I.

4. The method of claim 1, wherein performing the Givens rotations comprises performing a first Givens rotation that zeros a first element of the matrix X.

5. The method of claim 1, wherein setting the variable internal phase and the variable external phase comprises:
    inputting a signal to the mesh of Mach-Zehnder interferometers representing a corresponding column of one of the first matrix or the second matrix;
    measuring an output of the mesh of Mach-Zehnder interferometers; and
    setting the variable internal phase and the variable external phase based on the output.

6. The method of claim 5, wherein inputting the signal to the mesh of Mach-Zehnder interferometers comprises directing 100% of the signal coupled to a first Mach-Zehnder interferometer in the mesh of Mach-Zehnder interferometers out of one port of the first Mach-Zehnder interferometer.

7. The method of claim 5, wherein setting the variable internal phase and the variable external phase comprises selecting the variable internal phase and the variable external phase such that an inner product of the output and of a corresponding column of a matrix V representing a second portion of the mesh of Mach-Zehnder interferometers equals zero.

8. The method of claim 1, further comprising, before performing the Givens rotations:
    initializing each Mach-Zehnder interferometer in the mesh of Mach-Zehnder interferometers to an approximate cross state.

9. The method of claim 1, further comprising, after setting the variable internal phase and the variable external phase for each Mach-Zehnder interferometer in the mesh of Mach-Zehnder interferometers, for each column in the second matrix:
    injecting a signal representing a corresponding column of the second matrix;
    measuring an output of the mesh of Mach-Zehnder interferometers; and
    adjusting the variable internal phase shifts of the Mach-Zehnder interferometers based on the output.

10. The method of claim 1, wherein each Mach-Zehnder interferometer in the mesh of Mach-Zehnder interferometers comprises three beam splitters.

11. The method of claim 1, wherein each Mach-Zehnder interferometer in the mesh of Mach-Zehnder interferometers comprises two beam splitters and a waveguide crossing.

12. A multiport interferometer configured according to the method of claim 1.

13. A method comprising:
configuring a multiport interferometer comprising a mesh of Mach-Zehnder interferometers characterized by hardware component errors by:
setting an internal phase of a first Mach-Zehnder interferometer in a diagonal of Mach-Zehnder interferometers to produce a desired power ratio at an output of the mesh of Mach-Zehnder interferometers;
setting an internal phase of at least one second Mach-Zehnder interferometer in the diagonal of Mach-Zehnder interferometers to align phases of partial output vectors at the output of the mesh of Mach-Zehnder interferometers; and
setting an internal phase of a last Mach-Zehnder interferometer in the diagonal of Mach-Zehnder interferometers to produce a desired global phase at the output of the mesh of Mach-Zehnder interferometers,
wherein setting the internal phases of the first Mach-Zehnder interferometer, the at least one second Mach-Zehnder interferometer, and the last Mach-Zehnder interferometer reduces effects of the hardware component errors.

14. The method of claim 13, wherein setting the internal phase of the first Mach-Zehnder interferometer comprises:
measuring, at the output of the mesh of Mach-Zehnder interferometers, a combination of light that bypasses the first Mach-Zehnder interferometer, light that exits a first output port of the first Mach-Zehnder interferometer, and light that exits a second output port of the first Mach-Zehnder interferometer.

15. The method of claim 13, wherein the mesh of Mach-Zehnder interferometers is a triangular mesh.

16. The method of claim 13, wherein the mesh of Mach-Zehnder interferometers is a rectangular mesh with a diagonal of drop ports.

17. The method of claim 13, wherein the mesh of Mach-Zehnder interferometers includes N Mach-Zehnder interferometers characterized by an error with a magnitude $\sigma$ and the method corrects the error with a stability following an asymptotic form proportional to $N\sigma^2$.

18. The method of claim 13, wherein the mesh of Mach-Zehnder interferometers includes N Mach-Zehnder interferometers and is characterized by a transfer matrix U and a normalized matrix error $\varepsilon = \langle \|U\| \rangle_{rms}/\sqrt{N}$ and the method suppresses the normalized matrix error by a factor of $\varepsilon^2/\sqrt{6}$.

19. A multiport interferometer configured according to the method of claim 13.

* * * * *

UNITED STATES PATENT AND TRADEMARK OFFICE
CERTIFICATE OF CORRECTION

PATENT NO. : 12,174,018 B2
APPLICATION NO. : 17/711640
DATED : December 24, 2024
INVENTOR(S) : Hamerly et al.

Page 1 of 1

It is certified that error appears in the above-identified patent and that said Letters Patent is hereby corrected as shown below:

In the Claims

In Claim 1, Column 40, Line 2, replace "X=V`UV`" with -- $X = V^{\dagger}UW^{\dagger}$ --

Signed and Sealed this
Eleventh Day of February, 2025

Coke Morgan Stewart
*Acting Director of the United States Patent and Trademark Office*